US012469650B2

(12) United States Patent
Daigle et al.

(10) Patent No.: US 12,469,650 B2
(45) Date of Patent: Nov. 11, 2025

(54) IONIC PLASTIC CRYSTALS, COMPOSITIONS COMPRISING SAME, METHODS FOR MANUFACTURING SAME AND USES THEREOF

(71) Applicant: HYDRO-QUÉBEC, Montréal (CA)

(72) Inventors: Jean-Christophe Daigle, St-Bruno-de-Montarville (CA); Francis Barray, Saint-Simon de Bagot (CA); Abdelbast Guerfi, Brossard (CA); Benoit Fleutot, Boucherville (CA); Emmanuelle Garitte, Montréal (CA); Sergey Krachkovskiy, Boucherville (CA); Ki Seok Koh, Longueuil (CA)

(73) Assignee: HYDRO-QUÉBEC, Montréal (CA)

( * ) Notice: Subject to any disclaimer, the term of this patent is extended or adjusted under 35 U.S.C. 154(b) by 225 days.

(21) Appl. No.: 18/263,618

(22) PCT Filed: Feb. 4, 2022

(86) PCT No.: PCT/CA2022/050159
§ 371 (c)(1),
(2) Date: Jul. 31, 2023

(87) PCT Pub. No.: WO2022/165598
PCT Pub. Date: Aug. 11, 2022

(65) Prior Publication Data
US 2024/0170228 A1 May 23, 2024

Related U.S. Application Data

(60) Provisional application No. 63/260,710, filed on Aug. 30, 2021, provisional application No. 63/146,356, filed on Feb. 5, 2021.

(51) Int. Cl.
*H01G 11/56* (2013.01)
*H01G 11/24* (2013.01)
(Continued)

(52) U.S. Cl.
CPC ............ *H01G 11/56* (2013.01); *H01G 11/24* (2013.01); *H01G 11/28* (2013.01); *H01G 11/46* (2013.01);
(Continued)

(58) Field of Classification Search
None
See application file for complete search history.

(56) References Cited

U.S. PATENT DOCUMENTS

| 5,356,553 A | 10/1994 | Kono et al. |
| 7,897,674 B2 | 3/2011 | Zaghib et al. |

(Continued)

FOREIGN PATENT DOCUMENTS

| CN | 105409032 | | 3/2016 | |
| CN | 108886175 B | * | 8/2022 | .......... H01M 50/562 |

(Continued)

OTHER PUBLICATIONS

International Search Report for international application No. PCT/CA2022/050159, mailed on Apr. 26, 2022.
(Continued)

*Primary Examiner* — Dion R. Ferguson
(74) *Attorney, Agent, or Firm* — Womble Bond Dickinson (US) LLP

(57) ABSTRACT

The present technology relates to an ionic plastic crystal comprising at least one delocalized anion paired with at least one an organic guanidine, amidine or phosphazene organic superbase-derived cation for use in electrochemical applications, particularly in electrochemical accumulators such as batteries, electrochromic devices, and supercapacitors. The present technology also relates to an ionic plastic crystal composition, an ionic plastic crystal-based solid electrolyte composition, an ionic plastic crystal-based solid electrolyte, an electrode material comprising the ionic plastic crystal or
(Continued)

* Plastic crystal
** Carbon and binder slurry the ionic plastic crystal composition. Their uses in electrochemical cells and electrochemical accumulators as well as their processes of manufacturing and an NHO-stabilized intermediary ion-neutral complex are also described.

36 Claims, 21 Drawing Sheets

(51) Int. Cl.
| | |
|---|---|
| H01G 11/28 | (2013.01) |
| H01G 11/46 | (2013.01) |
| H01G 11/86 | (2013.01) |
| H01M 4/04 | (2006.01) |
| H01M 4/505 | (2010.01) |
| H01M 4/525 | (2010.01) |
| H01M 4/62 | (2006.01) |
| H01M 10/0525 | (2010.01) |
| H01M 10/056 | (2010.01) |

(52) U.S. Cl.
CPC .......... *H01G 11/86* (2013.01); *H01M 4/0404* (2013.01); *H01M 4/0435* (2013.01); *H01M 4/505* (2013.01); *H01M 4/525* (2013.01); *H01M 4/623* (2013.01); *H01M 4/625* (2013.01); *H01M 10/0525* (2013.01); *H01M 10/056* (2013.01)

(56) References Cited

U.S. PATENT DOCUMENTS

| 8,482,839 B2 | 7/2013 | Zaghib et al. | |
|---|---|---|---|
| 9,249,353 B2 | 2/2016 | Posset et al. | |
| 10,320,029 B2 | 6/2019 | Zaghib et al. | |
| 2017/0256820 A1 | 9/2017 | Matsumoto et al. | |
| 2023/0246192 A1* | 8/2023 | Jang ...................... | H01M 10/44 429/218.1 |
| 2024/0170228 A1* | 5/2024 | Daigle ................... | H01G 11/24 |

FOREIGN PATENT DOCUMENTS

| JP | 2013 161660 A | | 8/2013 | |
|---|---|---|---|---|
| KR | 20170046698 A | * | 5/2017 | ........... C07C 211/63 |
| WO | 2008/138110 | | 11/2008 | |
| WO | 2016/209920 | | 12/2016 | |
| WO | WO-2023220116 A1 | * | 11/2023 | ........ H01M 10/0565 |

OTHER PUBLICATIONS

Braddock, D. Christopher, et al. "The reaction of aromatic dialdehydes with enantiopure 1, 2-diamines: an expeditious route to enantiopure tricyclic amidines." Tetrahedron: Asymmetry 21.24 (2010): 2911-2919.
Dong, Jiajia, et al. "SuFEx-Based Synthesis of Polysulfates." Angewandte Chemie International Edition 53.36 (2014):9466-9470.
Dong, Jiajia, et al. "SuFEx-Based Synthesis of Polysulfates." Angewandte Chemie International Edition 53.36 (2014):9466-9470 (Supplementary Materials).
Shan, Weida, et al. "New class of type III porous liquids: a promising platform for rational adjustment of gas sorption behavior." ACS applied materials & interfaces 10.1 (2018): 32-36.
Ghorbani, Mahdi, and Michela I. Simone. "Developing new inexpensive room-temperature ionic liquids with high thermal stability and a greener synthetic profile." ACS omega 5.22 (2020): 12637-12648.
Miran, Muhammed Shah, et al. "Physicochemical properties determined by ∆p K a for protic ionic liquids based on an organic super-strong base with various Brønsted acids." Physical Chemistry Chemical Physics 14.15 (2012): 5178-5186.
Triolo, Alessandro, et al. "Structural features of selected protic ionic liquids based on a super-strong base." Physical Chemistry Chemical Physics 21.45 (2019): 25369-25378.
Wang, Zhi, et al. "Organic superbase derived ionic liquids based on the TFSI anion: synthesis, characterization, and electrochemical properties." New Journal of Chemistry 41.12 (2017): 5091-5097.
Yunis, Ruhamah, et al. "Plastic crystals utilising small ammonium cations and sulfonylimide anions as electrolytes for lithium batteries." Journal of The Electrochemical Society 167.7 (2020): 070529.
Polenz, Ingmar, et al. "Thermally cleavable imine base/isocyanate adducts and oligomers suitable as initiators for radical homo-and copolymerization." Polymer Chemistry 5.23 (2014): 6678-6686.
Pringle, Jennifer M., et al. "Organic ionic plastic crystals: recent advances." Journal of Materials Chemistry 20.11 (2010): 2056-2062.
Wang, Changhong, et al. "Solid-state plastic crystal electrolytes: effective protection interlayers for sulfide-based all-solid-state lithium metal batteries." Advanced Functional Materials 29.26 (2019): 1900392.
Yoshizawa-Fujita, Masahiro, et al. "Synthesis and Characteristics of Pyrrolidinium-Based Organic Ionic Plastic Crystals with Various Sulfonylamide Anions." Batteries & Supercaps 3.9 (2020): 884-891.
Yunis, Ruhamah, et al. "Organic salts utilising the hexamethylguanidinium cation: the influence of the anion on the structural, physical and thermal properties." Physical Chemistry Chemical Physics 21.23 (2019): 12288-12300.
Hayamizu, Kikuko, and Shiro Seki. "Long-range Li ion diffusion in NASICON-type Li1.5Al0.5Ge1.5(PO4)3 (LAGP) (LAGP) studied by 7Li pulsed-gradient spin-echo NMR." Physical Chemistry Chemical Physics 19.34 (2017): 23483-23491.
Arbi, K., et al. "Lithium mobility in Li1.2Ti1.8R0.2(PO4)3 compounds (R=Al, Ga, Sc, In) as followed by NMR and impedance spectroscopy." Chemistry of materials 16.2 (2004): 255-262.
Supplementary International Search Report for international patent application PCT/CA2022/050159 mailed on Sep. 6, 2023.
Matanovic, Ivana, et al. "Energetics of base-acid pairs for the design of high-temperature fuel cell polymer electrolytes." The Journal of Physical Chemistry B, 2020, vol. 124, No. 35, p. 7725-7734.
Ressmann, Anna K., et al. "Design and synthesis of basic ionic liquids for the esterification of triterpenic acids." Monatshefte für Chemie—Chemical Monthly, Springer, Vienna, 2016, vol. 148, p. 139-148.
CNIPA, Office Action for Chinese Patent Application No. 202280013197.5, Aug. 1, 2025.

* cited by examiner

A

Intensity (counts) vs. mass-to-charge ratio (m/z)

B

Intensity (counts) vs. mass-to-charge ratio (m/z)

A

Intensity (counts) vs. mass-to-charge ratio (m/z)

B

Intensity (counts) vs. mass-to-charge ratio (m/z)

A

B

C

IONIC PLASTIC CRYSTALS, COMPOSITIONS COMPRISING SAME, METHODS FOR MANUFACTURING SAME AND USES THEREOF

RELATED APPLICATIONS

This application is a U.S. National Phase Under 35 U.S.C. § 371 of International Application No. PCT/CA2022/050159, titled "IONIC PLASTIC CRYSTALS, COMPOSITIONS COMPRISING SAME, METHODS FOR MANUFACTURING SAME AND USES THEREOF," filed Feb. 4, 2022, which claims priority under applicable law to U.S. Provisional Patent Application No. 63/146,356 filed on Feb. 5, 2021, and U.S. Provisional Patent Application No. 63/260,710 filed on Aug. 30, 2021, the contents of which are incorporated herein by reference in their entirety and for all purposes.

TECHNICAL FIELD

The present application relates to the field of ionic plastic crystals and their use in electrochemical applications. More particularly, the present application relates to the field of ionic plastic crystals, compositions comprising them, their methods of manufacture and their uses as a solid-state electrolyte in electrochemical cells, electrochromic devices, supercapacitors, electrochemical accumulators and, in particular in all-solid-state batteries.

BACKGROUND

Ionic plastic crystals are considered as promising materials for solid-state electrolytes. Although this technology is still in its infancy, plastic crystal-based ionic conductors exhibit significant advantages over conventional solid-state electrolyte materials, including high flexibility and plasticity, non-flammability, exceptional ionic conductivity, as well as good thermal and electrochemical properties.

Despite their significant advantages, the conduction mechanisms and the relationship between cations or anions and the physical properties of these materials are not well understood. It is thus not trivial to forecast whether the combination of a cation and an anion is likely to form an ionic melt or liquid at a specific temperature or to form a plastic crystal.

Accordingly, there is a need for the development of new solid-state electrolytes based on ionic plastic crystals excluding one or more of the disadvantages of conventional solid-state electrolytes or offering one or more advantages over them.

SUMMARY

According to a first aspect, the present technology relates to an ionic plastic crystal comprising at least one delocalized anion paired with at least one guanidine, amidine or phosphazene organic superbase-derived cation.

According to one embodiment, the ionic plastic crystal is a multicationic ionic plastic crystal comprising at least two delocalized anions paired with at least two guanidine, amidine or phosphazene organic superbase-derived cations.

According to another embodiment, the delocalized anion is selected from the group consisting of trifluoromethane-sulfonate (or triflate) [TfO]$^-$, bis(trifluoromethanesulfonyl) imide [TFSI]$^-$, bis(fluorosulfonyl)imide [FSI]$^-$, 2-trifluoromethyl-4,5-dicyanoimidazolate [TDI]$^-$, hexafluorophosphate [PF$_6$]$^-$ and tetrafluoroborate [BF$_4$]$^-$ anions. According to an example, the delocalized anion is [TFSI]$^-$. According to another example, the delocalized anion is [FSI]$^-$.

According to another embodiment, the guanidine, amidine or phosphazene organic superbase is selected from the group consisting of 1,8-diazabicyclo[5.4.0]undec-7-ene (DBU), 1,5-diazabicyclo[4.3.0]non-5-ene (DBN), 7-methyl-1,5,7-triazabicyclo[4.4.0]dec-5-ene (MTBD), 2-tert-butyl-imino-2-diethylamino-1,3-dimethylperhydro-1,3,2-diazaphosphorine (BEMP), tert-butylimino-tri(pyrrolidino)phosphorane (BTPP) and tert-butylimino-tris(dimethylamino)phosphorane (P$_1$-t-Bu).

According to another embodiment, the cation is selected from the group consisting of guanidine, amidine or phosphazene organic superbase-derived cations of Formulae 2 to 8:

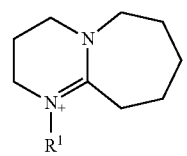

Formula 2

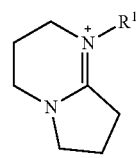

Formula 3

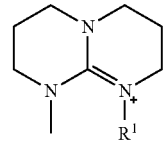

Formula 4

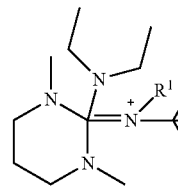

Formula 5

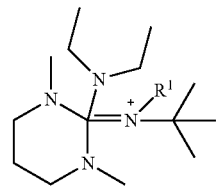

Formula 6

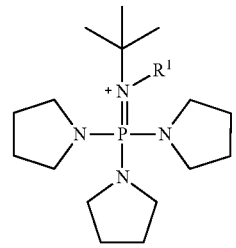

Formula 7

Formula 8

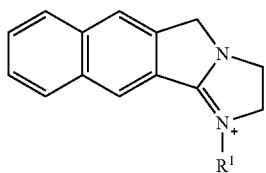

wherein, the ionic plastic crystal is a monocationic ionic plastic crystal and $R^1$ is a hydrogen atom or a linear or branched substituent selected from a $C_1$-$C_{10}$alkyl-acrylate, a $C_1$-$C_{10}$alkyl-methacrylate, a carbonylamino-$C_1$-$C_{10}$alkyl-methacrylate, a carbonylamino-$C_1$-$C_{10}$alkyl-acrylate, a carbonyloxy-$C_1$-$C_{10}$alkyl-methacrylate and a carbonyloxy-$C_1$-$C_{10}$alkyl-acrylate; or the ionic plastic crystal is a multicationic ionic plastic crystal and $R^1$ is an optionally substituted organic bridging group separating at least two of the cations and is selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, a linear or branched polyether, a linear or branched polyester, a $C_6$-$C_{12}$arylene, a $C_5$-$C_{12}$heteroarylene, a $C_3$-$C_{12}$cycloalkylene and a $C_3$-$C_{12}$heterocycloalkylene.

In some embodiments, $R^1$ is a hydrogen atom, and the ionic plastic crystal is a protic ionic plastic crystal.

In some other embodiments, $R^1$ is a linear or branched substituent selected from a $C_1$-$C_{10}$alkyl-acrylate, a $C_1$-$C_{10}$alkyl-methacrylate, a carbonylamino-$C_1$-$C_{10}$alkyl-methacrylate and a carbonylamino-$C_1$-$C_{10}$alkyl-acrylate, and the ionic plastic crystal is a crosslinked ionic plastic crystal.

According to some preferred embodiments, the ionic plastic crystal is selected from ionic plastic crystals of Formulae 10 to 16:

Formula 10

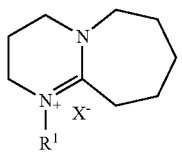

Formula 11

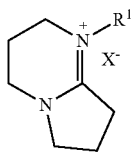

Formula 12

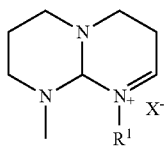

Formula 13

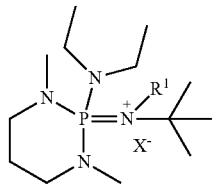

Formula 14

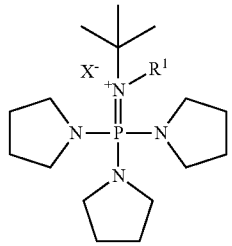

Formula 15

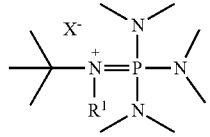

Formula 16

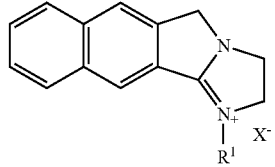

wherein,

X⁻ is a delocalized anion selected from the group consisting of [TfO]⁻, [TFSI]⁻, [FSI]⁻, [TDI]⁻, [PF$_6$]⁻ and [BF$_4$]⁻; and the ionic plastic crystal is a monocationic ionic plastic crystal and $R^1$ a hydrogen atom or a linear or branched substituent selected from a $C_1$-$C_{10}$alkyl-acrylate, a $C_1$-$C_{10}$alkyl-methacrylate, a carbonylamino-$C_1$-$C_{10}$alkyl-methacrylate, a carbonylamino-$C_1$-$C_{10}$alkyl-acrylate, a carbonyloxy-$C_1$-$C_{10}$alkyl-methacrylate and a carbonyloxy-$C_1$-$C_{10}$alkyl-acrylate; or the ionic plastic crystal is a multicationic ionic plastic crystal and $R^1$ is an optionally substituted organic bridging group separating at least two of the cations and is selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, a linear or branched polyether, a linear or branched polyester, a $C_6$-$C_{12}$arylene, a $C_5$-$C_{12}$heteroarylene, a $C_3$-$C_{12}$cycloalkylene and a $C_3$-$C_{12}$heterocycloalkylene.

According to some preferred embodiments, the delocalized anion is selected from the group consisting of [TFSI]⁻ and [FSI]⁻ anions, and preferably [FSI]⁻.

According to another aspect, the present technology relates to an ionic plastic crystal composition comprising at least one ionic plastic crystal as herein defined and at least one additional component and/or at least one polymer.

According to one embodiment, the additional component is selected from the group consisting of solvents, ionic conductors, inorganic particles, glass particles, ceramic particles, plasticizing agents and a combination of at least two thereof.

In some embodiments, the inorganic particle comprises a compound having a garnet, NASICON, LISICON, thio-LISICON, LIPON, perovskite, anti-perovskite, or argyrodite type structure, or comprises a compound of the M-P—S, M-P—S—O, M-P—S—X, M-P—S—O—X type (where M is an alkali or alkaline earth metal, and X is F, Cl, Br, I or a combination of at least two thereof) in crystalline phase, amorphous phase and/or glass-ceramic phase, or a mixture of at least two thereof.

In some preferred embodiments, the inorganic particle comprises at least one of the following compounds: MLZO (e.g., $M_7La_3Zr_2O_{12}$, $M_{(7-a)}La_3Zr_2Al_bO_{12}$, $M_{(7-a)}La_3Zr_2Ga_bO_{12}$, $M_{(7-a)}La_3Zr_{(2-b)}Ta_bO_{12}$ and $M_{(7-a)}La_3Zr_{(2-b)}Nb_bO_{12}$); MLTaO (e.g., $M_7La_3Ta_2O_{12}$, $M_5La_3Ta_2O_{12}$ and $M_6La_3Ta_{1.5}Y_{0.5}O_{12}$); MLSnO (e.g., $M_7La_3Sn_2O_{12}$); MAGP (e.g., $M_{1+a}Al_aGe_{2-a}(PO_4)_3$); MATP (e.g., $M_{1+a}Al_aTi_{2-a}(PO_4)_3$); MLTiO (e.g., $M_{3a}La_{(2/3-a)}TiO_3$); MZP (e.g., $M_aZr_b(PO_4)_c$); MCZP (e.g., $M_aCa_bZr_c(PO_4)_d$); MGPS (e.g., $M_aGe_bP_cS_d$ such as $M_{10}GeP_2S_{12}$); MGPSO (e.g., $M_aGe_bP_cS_dO_e$); MSiPS (e.g., $M_aSi_bP_cS_d$ such as $M_{10}SiP_2S_{12}$); MSiPSO (e.g., $M_aSi_bP_cS_dO_e$); MSnPS (e.g., $M_aSn_bP_cS_d$ such as $M_{10}SnP_2S_{12}$); MSnPSO (e.g., $M_aSn_bP_cS_dO_e$); MPS (e.g., $M_aP_bS_c$ such as $M_7P_3S_{11}$); MPSO (e.g., $M_aP_bS_cO_d$); MZPS (e.g., $M_aZn_bP_cS_d$); MZPSO (e.g., $M_aZn_bP_cS_dO_e$); $xM_2S$-$yP_2S_5$; $xM_2S$-$yP_2S_5$-zMX; $xM_2S$-$yP_2S_5$-$zP_2O_5$; $xM_2S$-$yP_2S_5$-$zP_2O_5$-wMX; $xM_2S$-$yM_2O$-$zP_2S_5$; $xM_2S$-$yM_2O$-$zP_2S_5$-wMX; $xM_2S$-$yM_2O$-$zP_2S_5$-$wP_2O_5$; $xM_2S$-$yM_2O$-$zP_2S_5$-$wP_2O_5$-vMX; $xM_2S$-$ySiS_2$; MPSX (e.g., $M_aP_bS_cX_d$ such as $M_7P_3S_{11}X$, $M_7P_2S_8X$ and $M_6PS_5X$); MPSOX (e.g., $M_aP_bS_cO_dX_f$); MGPSX (e.g., $M_aGe_bP_cS_dX_f$); MGPSOX (e.g., $M_aGe_bP_cS_dO_eX_f$); MSIPSX (e.g., $M_aSi_bP_cS_dX_f$); MSiPSOX (e.g., $M_aSi_bP_cS_dO_eX_f$); MSnPSX (e.g., $M_aSn_bP_cS_dX_f$); MSnPSOX (e.g., $M_aSn_bP_cS_dO_eX_f$); MZPSX (e.g., $M_aZn_bP_cS_dX_f$); MZPSOX (e.g., $M_aZn_bP_cS_dO_eX_f$); $M_3OX$; $M_2HOX$; $M_3PO_4$; $M_3PS_4$; and $M_aPO_bN$, (where a=2b+3c−5); in crystalline phase, amorphous phase, glass-ceramic phase, or a combination thereof;

wherein,
M is an alkali metal ion, an alkaline earth metal ion or a combination thereof, and wherein when M comprises an alkaline earth metal ion, then the number of M is adjusted to achieve electroneutrality;
X is selected from F, Cl, Br, I or a combination thereof;
a, b, c, d, e and f are numbers other than zero and are, independently in each formula, selected to achieve electroneutrality; and
v, w, x, y and z are numbers other than zero and are, independently in each formula, selected to obtain a stable compound.

In some other embodiments, the inorganic particle is a ceramic or glass-ceramic. According to an example, the ceramic or glass-ceramic is an oxide-based ceramic, a sulfide-based ceramic, an oxysulfide-based ceramic or a combination of at least two thereof. For example, the sulfide-based ceramic is selected from $Li_{10}GeP_2S_{12}$, $Li_6PS_5Cl$, $Li_2S$—$P_2S_5$, $Li_7P_3S_{11}$, $Li_{9.54}Si_{1.74}P_{1.44}S_{11.7}Cl_{0.3}$, $Li_{9.6}P_3S_{12}$ and $Li_3O_{2.5}P_{0.95}S_4$. According to a variant of interest, the sulfide-based ceramic is $Li_6PS_5Cl$.

In some other embodiments, the ceramic or glass-ceramic is present in the ionic plastic crystal composition at a concentration of at least 50 wt. %. For example, the ceramic or glass-ceramic is present in the ionic plastic crystal composition at a concentration in the range of from about 50 wt. % to about 95 wt. %, or from about 55 wt. % to about 95 wt. %, or from about 60 wt. % and about 95 wt. %, or from about 65 wt. % to about 95 wt. %, or from about 70 wt. % to about 95 wt. %, or from about 75 wt. % to about 95 wt. %, or from about 80 wt. % to about 95 wt. %, or from about 85 wt. % to about 95 wt. %, or from about 90 wt. % to about 95 wt. %, upper and lower limits included. According to a variant of interest, the ceramic or glass-ceramic is present in the ionic plastic crystal composition at a concentration of about 90 wt. %. According to another variant of interest, the plastic crystal is present in the ionic plastic crystal composition at a concentration of about 10 wt. %.

In some other preferred embodiments, the inorganic particle is a filler additive selected from the group consisting of titanium dioxide ($TiO_2$), alumina ($Al_2O_3$) and silicon dioxide ($SiO_2$) particles or nanoparticles.

In some embodiments, the polymer is linear or branched.
In some embodiments, the polymer is crosslinked.
In some embodiments, the polymer is present in the ionic plastic crystal composition at a concentration of at least 10 wt. %. For example, the polymer is present in the ionic plastic crystal composition at a concentration in the range of from about 5 wt. % to about 45 wt. %, or from about 10 wt. % to about 45 wt. %, or from about 15 wt. % to about 45 wt. %, or from about 20 wt. % to about 45 wt. %, or from about 25 wt. % to about 45 wt. %, or from about 30 wt. % to about 45 wt. %, or from about 35 wt. % to about 45 wt. %, or from about 40 wt. % to about 45 wt. %, upper and lower limits included.

In some preferred embodiments, the polymer is a polyether-type polymer. For example, the polyether-type polymer is a polyethylene oxide (PEO)-based polymer.

In some other preferred embodiments, the polymer is a block copolymer composed of at least one lithium-ion solvating segment and optionally at least one cross-linkable segment, the lithium-ion solvating segment being selected from homo- or copolymers having repeating units of Formula 32:

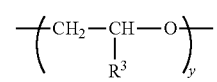

Formula 32 wherein,
$R^3$ is selected from a hydrogen atom, a $C_1$-$C_{10}$alkyl group or a —($CH_2$—O—$R^4R^5$) group;
$R^4$ is ($CH_2$—$CH_2$—O)$_m$;
$R^5$ is selected from a hydrogen atom and a $C_1$-$C_{10}$alkyl group;
y is an integer selected from the range of 10 to 200,000; and
m is an integer selected from the range of 0 to 10.

In some preferred embodiments, the cross-linkable segment of the copolymer is a polymer segment comprising at least one functional group that is cross-linkable multi-dimensionally by irradiation or thermal treatment.

According to another embodiment, the ionic plastic crystal composition is an ionic plastic crystal-based electrolyte composition.

According to another aspect, the present technology relates to a binder comprising an ionic plastic crystal composition as herein defined.

According to another aspect, the present technology relates to an electrochemical cell comprising an ionic plastic crystal composition as herein defined.

According to another aspect, the present technology relates to a supercapacitor comprising an ionic plastic crystal composition as herein defined.

According to one embodiment, the supercapacitor is a carbon-carbon supercapacitor.

According to another aspect, the present technology relates to an electrochromic material comprising an ionic plastic crystal composition as herein defined.

According to another aspect, the present technology relates to a solid electrolyte composition comprising an ionic plastic crystal as herein defined or an ionic plastic crystal composition as herein defined and at least one salt or at least one additional component.

In some embodiments, the salt is an ionic salt. For example, the ionic salt is selected from a lithium salt, a sodium salt, a potassium salt, a calcium salt and a magnesium salt, and preferably the ionic salt is a lithium salt. According to a variant of interest, the lithium salt is selected from the group consisting of lithium hexafluorophosphate ($LiPF_6$), lithium bis(trifluoromethanesulfonyl)imide (LiTFSI), lithium bis(fluorosulfonyl)imide (LiFSI), lithium (flurosulfonyl)(trifluoromethanesulfonyl)imide) (Li(FSI)(TFSI)), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium difluorophosphate (LiDFP), lithium tetrafluoroborate ($LiBF_4$), lithium bis(oxalato)borate (LiBOB), lithium nitrate ($LiNO_3$), lithium chloride (LiCl), lithium bromide (LiBr), lithium fluoride (LiF), lithium perchlorate ($LiClO_4$), lithium hexafluoroarsenate ($LiAsF_6$), lithium trifluoromethanesulfonate ($LiSO_3CF_3$) (LiOTf), lithium fluoroalkylphosphate $Li[PF_3(CF_2CF_3)_3]$ (LiFAP), lithium tetrakis(trifluoroacetoxy)borate $Li[B(OCOCF_3)_4]$ (LiTFAB), lithium bis(1,2-benzenediolato(2-)—O,O')borate $Li[B(C_6O_2)_2]$ (LiBBB), lithium difluoro(oxalato)borate ($LiBF_2(C_2O_4)$) (LiFOB), a salt of formula $LiBF_2O_4R^x$ (where $R^x=C_{2-4}$alkyl), and a combination of at least two thereof.

In some embodiments, the additional component is selected from the group consisting of ionically conductive materials, inorganic particles, glass particles, ceramic particles, plasticizing agents, other similar components and a combination of at least two thereof. For example, the ceramic particles are nanoceramics. According to a variant of interest, the additional component is selected from NASICON, LISICON, thio-LiSICON type compounds, garnets, in crystalline and/or amorphous form, and a combination of at least two thereof.

According to another aspect, the present technology relates to a solid electrolyte comprising a solid electrolyte composition as herein defined, wherein the solid electrolyte is optionally crosslinked.

According to another aspect, the present technology relates to a solid electrolyte comprising an ionic plastic crystal as herein defined, wherein the solid electrolyte is optionally crosslinked.

According to another aspect, the present technology relates to an electrode material comprising an electrochemically active material and an ionic plastic crystal composition as herein defined, wherein the ionic plastic crystal composition is optionally crosslinked.

According to another aspect, the present technology relates to an electrode material comprising an electrochemically active material and an ionic plastic crystal as herein defined wherein the ionic plastic crystal is optionally crosslinked.

According to one embodiment, the ionic plastic crystal or the ionic plastic crystal composition is a binder.

In some embodiments, the electrochemically active material is in the form of particles.

In some embodiments, the electrochemically active material is selected from the group consisting of metal oxides, lithium metal oxides, metal phosphates, lithium metal phosphates, titanates, lithium titanates, metal fluorophosphates, lithium metal fluorophosphates, metal oxyfluorophosphates, lithium metal oxyfluorophosphates, metal sulfates, lithium metal sulfates, metal halides (e.g., metal fluorides), lithium metal halides (e.g., lithium metal fluorides), sulfur, selenium and a combination of at least two thereof. For example, the metal of the electrochemically active material is selected from the group consisting of titanium (Ti), iron (Fe), magnesium (Mg), manganese (Mn), vanadium (V), nickel (Ni), cobalt (Co), aluminum (Al), zirconium (Zr), zinc (Zn), niobium (Nb) and a combination of at least two thereof.

In some embodiments, the electrode material further comprises at least one electronically conductive material. For example, the electronically conductive material is selected from carbon black, acetylene black, graphite, graphene, carbon fibers, carbon nanofibers, carbon nanotubes and a combination of at least two thereof. According to a variant of interest, the electronically conductive material is acetylene black.

In some embodiments, the electrode material has an electrochemically active material ionic plastic crystal ratio of less than about 6, or less than about 5, or less than about 4, or less than about 3, and preferably less than about 4.

In some embodiments, the electrode material has a porosity of less than about 8%, or less than about 7%, or less than about 6%, or less than about 5%, or less than about 4%, or less than about 3%, or less than about 2%, or less than about 1%, and preferably less than about 5%.

According to another aspect, the present technology relates to an electrode comprising an electrode material as herein defined on a current collector.

According to another aspect, the present technology relates to an electrochemical cell comprising a negative electrode, a positive electrode and an electrolyte, wherein at least one of the negative electrode, the positive electrode and the electrolyte comprises at least one ionic plastic crystal as herein defined, wherein the ionic plastic crystal is optionally crosslinked.

According to another aspect, the present technology relates to an electrochemical cell comprising a negative electrode, a positive electrode and an electrolyte, wherein at least one of the negative electrode, the positive electrode, and the electrolyte comprises the ionic plastic crystal composition as herein defined, wherein the ionic plastic crystal composition is optionally crosslinked.

According to another aspect, the present technology relates to an electrochemical cell comprising a negative electrode, a positive electrode, and an electrolyte, wherein at least one of the negative electrode and the positive electrode is as herein defined.

According to another aspect, the present technology relates to an electrochemical cell comprising a negative electrode, a positive electrode and a solid electrolyte as herein defined.

According to another aspect, the present technology relates to an electrochemical accumulator comprising at least one electrochemical cell as herein defined.

According to one embodiment, the electrochemical accumulator is a battery selected from a lithium battery, a lithium-ion battery, a sodium battery, a sodium-ion battery, a magnesium battery, and a magnesium-ion battery. According to a variant of interest, the battery is a lithium battery or a lithium-ion battery.

According to another aspect, the present technology relates to a process for the preparation of an ionic plastic crystal as herein defined or an ionic plastic crystal composition as herein defined, the process comprising the following steps:
(i) reacting at least one guanidine, amidine or phosphazene organic superbase with at least one proton source to form at least one complex including a protonated guanidine, amidine or phosphazene organic superbase-derived cation and a counterion; and
(ii) reacting the complex including a protonated guanidine, amidine or phosphazene organic superbase-derived cation and a counterion with at least one ionic salt.

According to one embodiment, the guanidine, amidine or phosphazene organic superbase is selected from the group consisting of DBU, DBN, MTBD, BEMP, BTPP and P-t-Bu.

According to a variant of interest, the guanidine, amidine or phosphazene organic superbase is BEMP. According to another variant of interest, the guanidine, amidine or phosphazene organic superbase is DBU.

According to another embodiment, the ionic salt comprises a delocalized anion selected from the group consisting of [TfO]⁻, [TFSI]⁻, [FSI]⁻, [TDI]⁻, [PF$_6$]⁻ and [BF$_4$]⁻ anions. According to a variant of interest, the delocalized anion is [TFSI]⁻. According to another variant of interest, the delocalized anion is [FSI]⁻.

According to another embodiment, the ionic salt is an alkali or alkaline earth metal salt.

For example, the alkali or alkaline earth metal salt is a lithium salt, a sodium salt, a potassium salt, a calcium salt or a magnesium salt, and preferably a lithium salt.

According to another embodiment, steps (i) and (ii) are carried out sequentially, simultaneously or partially overlapping in time with each other. For example, steps (i) and (ii) are carried out sequentially, and the step of reacting the guanidine, amidine or phosphazene organic superbase with the proton source is carried out before the step of reacting the complex including a protonated guanidine, amidine or phosphazene organic superbase-derived cation and a counterion with the ionic salt.

In another embodiment, the guanidine, amidine or phosphazene organic superbase, the proton source and the ionic salt are mixed together and left to react.

According to another embodiment, steps (i) and (ii) are carried out in the presence of a solvent. For example, the solvent is selected from the group consisting of dichloromethane, dimethyl carbonate, acetonitrile, ethanol and a miscible combination of at least two thereof. According to another variant of interest, the solvent is acetonitrile.

In some embodiments, the solvent is the proton source of step (i).

According to another embodiment, the proton source of step (i) is a first proton source and steps (i) and (ii) are carried out in the presence of a second proton source. For example, the second proton source is an acid selected from the group consisting of carboxylic acids (e.g., formic acid, acetic acid, propionic acid, lactic acid and trifluoroacetic acid), p-toluenesulfonic acid, sulfuric acid, hydroiodic acid, hydrobromic acid, hydrochloric acid, nitric acid and hydrofluoric acid.

According to another embodiment, steps (i) and (ii) are carried out in the presence of an activator and/or stabilizer and the process further comprises forming a stabilized intermediary ion-neutral complex.

In some embodiments, the activator and/or stabilizer is a bis-silylated compound of Formula 17:

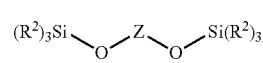

Formula 17 wherein,
Z is a substituted or unsubstituted organic group selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, a linear or branched polyether, a linear or branched polycarbonate, a linear or branched polythiocarbonate, a linear or branched polyamide, a linear or branched polyimide, a linear or branched polyurethane, a linear or branched polysiloxane, a linear or branched thioether, a linear or branched polyphosphazene, a linear or branched polyester, and a linear or branched polythioester; and
$R^2$ is independently and in each occurrence selected from the group consisting of an alkyl group, an aryl group, and an arylalkyl group.

According to another embodiment, the process further comprises a step of preparing the bis-silylated compound of Formula 17.

In some embodiments, the step of preparing the bis-silylated compound of Formula 17 is carried out by a silylation reaction of a compound comprising at least two hydroxyl groups with a silylation reagent. For example, the compound comprising at least two hydroxyl groups is selected from the group consisting of glycerol, 1,3-propanediol, 1,4-butanediol, 1,5-pentanediol, 1,6-hexanediol, 1,8-octanediol, 1,2-propanediol, 1,2-butanediol, 2,3-butanediol, 1,3-butanediol, 1,2-pentanediol, etohexadiol, p-menthane-3,8-diol, 2-methyl-2,4-pentanediol, polycaprolactone diol, ethylene glycol, diethylene glycol, triethylene glycol, tetraethylene glycol, pentaethylene glycol, polyethylene glycol, 2,2,3,3,4,4,5,5-octafluoro-1,6-hexanediol and a combination of at least two thereof. According to a variant of interest, the bis-silylated compound of Formula 17 is a bis-silylated diethylene glycol. According to another variant of interest, the bis-silylated compound of Formula 17 is a bis-silylated glycerol.

In some embodiments, the silylation reaction is carried out by a base-catalyzed silylation reaction and involves the replacement of an acidic hydrogen or an active hydrogen on a hydroxyl group with an ($R^2$)$_3$Si— group.

In some embodiments, the silylation reaction is carried out in the presence of a base. According to a variant of interest, the base is 4-dimethylaminopyridine. According to another variant of interest, the base is imidazole.

In some embodiments, the silylation reaction is carried out in the presence of an aprotic solvent. According to a variant of interest, the aprotic solvent is dichloromethane. According to another variant of interest, the aprotic solvent is tetrahydrofuran.

In some embodiments, the silylation reagent is selected from the group consisting of trialkylsilyl chloride, trimethylsilyl chloride (TMS-Cl), triethylsilyl chloride (TES-Cl), isopropyldimethylsilyl chloride (IPDMS-Cl), diethylisopropylsilyl chloride (DEIPS-Cl), tert-butyldimethylsilyl chloride (TBDMS-Cl or TBS-Cl), tert-butyldiphenylsilyl chloride (TBDPS-Cl or TPS-Cl), and triisopropylsilyl chloride (TIPS-Cl), nitrogen-containing silyl ethers, N,O-bis(tert-butyldimethylsilyl)acetamide (BSA), N-methyl-N-(trimethylsilyl)trifluoroacetamide (MSTFA), N-(trimethylsilyl)dimethylamine (TMSDEA), N-(trimethylsilyl)imidazole (TMSI or TSIM), N,O-bis(trimethylsilyl)trifluoroacetamide (BSTFA), and N-methyl-N-(trimethylsilyl)acetamide (MSA). According to a variant of interest, the silylation reagent is trimethylsilyl chloride (TMS-Cl). According to another variant of interest, the silylation reagent is tert-butyldimethylsilyl chloride (TBDMS-Cl or TBS-Cl).

In some embodiments, the silylation reagent is added in a "—OH group to be derivatized: silyl group" molar ratio of about 1:0.9.

In some other embodiments, the silylation reagent is added in a "—OH group to be derivatized: silyl group" molar ratio of about 1:1.

In some other embodiments, the silylation reagent is added in excess with respect to the number of hydroxyl groups on the compound comprising at least two hydroxyl groups. According to an example, the amount of silylation reagent is in the range of from about 2 equivalents to about 5 equivalents per equivalent of the compound comprising at least two hydroxyl groups, upper and lower limits included. For example, the amount of silylation reagent is in the range of from about 2 equivalents to about 4.5 equivalents, or from about 2 equivalents to about 4 equivalents, or from about 2 equivalents to about 3.75 equivalents, or from about 2 equivalents to about 3.5 equivalents per equivalent of the compound comprising at least two hydroxyl groups, upper and lower limits included.

In some embodiments, the silylation reaction is carried out at room temperature.

In some embodiments, steps (i) and (ii) are carried out at a temperature in the range of from about 20° C. to about 200° C., upper and lower limits included. For example, steps (i) and (ii) are carried out at a temperature in the range of from about 40° C. to about 80° C., or from about 45° C. to about 75° C., or from about 50° C. to about 70° C., or from about 55° C. to about 65° C., upper and lower limits included.

In some embodiments, steps (i) and (ii) are carried out for at least 4 days.

According to another embodiment, the process further comprises a purification step. For example, the purification step is carried out by extraction, distillation, or evaporation. According to another embodiment, the process further comprises a functionalization step. According to an example, the functionalization step is carried out by a reaction between the —NH functional group of the protonated guanidine, amidine or phosphazene organic superbase-derived cation and at least one precursor of a cross-linkable functional group. For example, the cross-linkable functional group is selected from the group consisting of $C_1$-$C_{10}$alkyl-acrylate, $C_1$-$C_{10}$alkyl-methacrylate, carbonyloxy-$C_1$-$C_{10}$alkyl-methacrylate, carbonyloxy-$C_1$-$C_{10}$alkyl-acrylate, carbonylamino-$C_1$-$C_{10}$alkyl-methacrylate, and carbonylamino-$C_1$-$C_{10}$alkyl-acrylate groups.

According to another embodiment, the process further comprises a step of coating the ionic plastic crystal composition or a suspension comprising the ionic plastic crystal on a substrate. For example, the coating step is carried out by at least one of a doctor blade coating method, a comma coating method, a reverse-comma coating method, a printing method such as gravure coating, or a slot-die coating method. According to a variant of interest, the coating step is carried out by at least one of a doctor blade coating method or a slot-die coating method.

According to another embodiment, the process further comprises drying the composition or suspension. According to an example, the drying and coating steps are carried out simultaneously.

According to another embodiment, the process further comprises a crosslinking step. According to an example, the crosslinking step is carried out by UV irradiation, by heat treatment, by microwave irradiation, under an electron beam, by gamma irradiation, or by X-ray irradiation. According to a variant of interest, the crosslinking step is carried out by UV irradiation, heat treatment, or under an electron beam. In some embodiments, the crosslinking step is carried out in the presence of a crosslinking agent, a thermal initiator, a photoinitiator, a catalyst, a plasticizing agent, or a combination of at least two of thereof. According to a variant of interest, the photoinitiator is 2,2-dimethoxy-2-phenylacetophenone (Irgacure™ 651).

According to another aspect, the present technology relates to a stabilized intermediary ion-neutral complex obtained by reacting at least one guanidine, amidine or phosphazene organic superbase-derived cation and at least one bis-silylated compound of Formula 17:

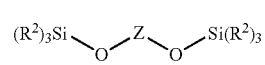

Formula 17 wherein,
Z is a substituted or unsubstituted organic group selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, a linear or branched polyether, a linear or branched polycarbonate, a linear or branched polythiocarbonate, a linear or branched polyamide, a linear or branched polyimide, a linear or branched polyurethane, a linear or branched polysiloxane, a linear or branched thioether, a linear or branched polyphosphazene, a linear or branched polyester, and a linear or branched polythioester; and $R^2$ is independently and in each occurrence selected from the group consisting of an alkyl group, an aryl group, and an arylalkyl group.

According to one embodiment, the guanidine, amidine or phosphazene organic superbase-derived cation is selected from the group consisting of protonated 1,8-diazabicyclo[5.4.0]undec-7-ene [H-DBU]+, protonated 1,5-diazabicyclo[4.3.0]non-5-ene [H-DBN]+, protonated 7-methyl-1,5,7-triazabicyclo[4.4.0]dec-5-ene [H-MTBD]+, protonated 2-tert-butylimino-2-diethylamino-1,3-dimethylperhydro-1,3,2-diazaphosphorine [H-BEMP]+, protonated tert-butylimino-tri(pyrrolidino)phosphorane [H-BTPP]+, and protonated tert-butylimino-tris(dimethylamino)phosphorane [$P_1$-t-Bu]+.

In some embodiments, the stabilized intermediary ion-neutral complex is of Formulae 25 to 31:

Formula 25

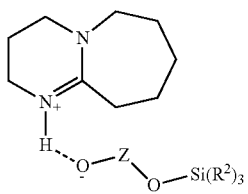

Formula 26

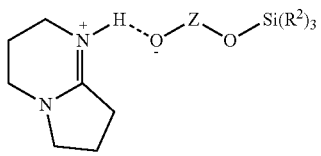

Formula 27

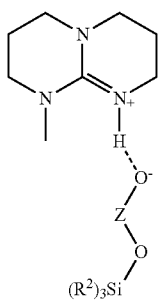

Formula 28

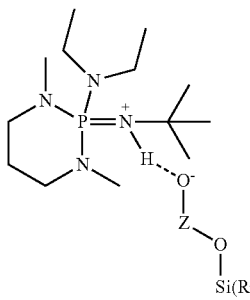

Formula 29

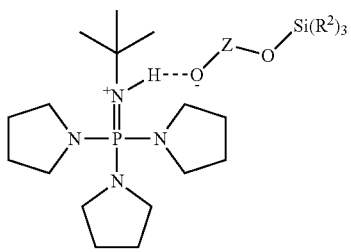

Formula 30

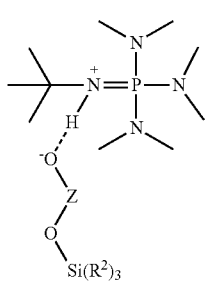

Formula 31

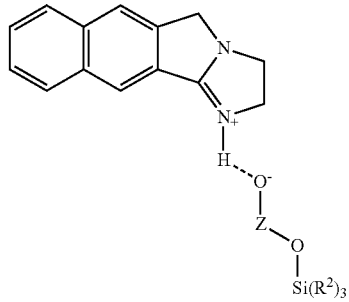

wherein,
Z and $R^2$ are as herein defined; and
$X^-$ is a delocalized anion selected from the group consisting of [TfO]$^-$, [TFSI]$^-$, [FSI]$^-$, [TDI]$^-$, [PF$_6$]$^-$ and [BF$_4$]$^-$.

According to another aspect, the present technology relates to a process for the preparation of an ionic plastic crystal as herein defined or an ionic plastic crystal composition as herein defined, the process comprising the following steps:

(i) reacting a guanidine, amidine or phosphazene organic superbase with an organic bridging compound to form a multicationic complex comprising at least two organic superbase-based cationic moieties separated by an optionally substituted organic bridging group and paired with a counterion; and (ii) reacting the multicationic complex with at least one ionic salt.

According to one embodiment, the guanidine, amidine or phosphazene organic superbase is selected from the group consisting of DBU, DBN, MTBD, BEMP, BTPP, and P$_1$-t-Bu. According to a variant of interest, the guanidine, amidine or phosphazene organic superbase is BEMP. According to another variant of interest, the guanidine, amidine or phosphazene organic superbase is DBU.

According to another embodiment, the organic bridging compound comprises the optionally substituted organic bridging group and at least two anionic leaving groups. For example, the anionic leaving group is a halide. According to a variant of interest, the halide is selected from F$^-$, Cl$^-$, Br$^-$ and I$^-$. According to another variant of interest, the halide is Br$^-$.

According to another embodiment, the optionally substituted organic bridging group is selected from the group consisting of a linear or branched C$_1$-C$_{10}$alkylene, a linear or branched C$_1$-C$_{10}$alkyleneoxyC$_1$-C$_{10}$alkylene, a linear or branched poly(C$_1$-C$_{10}$alkyleneoxy)C$_1$-C$_{10}$alkylene, a linear or branched polyether, a linear or branched polyester, a C$_6$-C$_{12}$arylene, a C$_5$-C$_{12}$heteroarylene, a C$_3$-C$_{12}$cycloalkylene, and a C$_3$-C$_{12}$heterocycloalkylene.

In some embodiments, the organic bridging group is 1,2,4,5-tetrakis(bromomethyl)benzene.

According to another embodiment, the ionic salt comprises a delocalized anion selected from the group consisting of [TfO]$^-$, [TFSI]$^-$, [FSI]$^-$, [TDI]$^-$, [PF$_6$]$^-$ and [BF$_4$]$^-$. According to a variant of interest, the delocalized anion is [TFSI]$^-$. According to another variant of interest, the delocalized anion is [FSI]$^-$.

According to another embodiment, the ionic salt is an alkali or alkaline earth metal salt. For example, the alkali or alkaline earth metal salt is a lithium salt, a sodium salt, a potassium salt, a calcium salt, or a magnesium salt. Preferably, the alkali or alkaline earth metal salt is a lithium salt.

According to another embodiment, steps (i) and (ii) are carried out sequentially, simultaneously or partially overlapping in time with each other. According to an example, steps (i) and (ii) are carried out sequentially, and the step of reacting the guanidine, amidine or phosphazene organic superbase with the organic bridging compound is carried out before the step of reacting the multicationic complex with the ionic salt.

In another embodiment, the guanidine, amidine or phosphazene organic superbase, the organic bridging compound, and the ionic salt are mixed together and left to react.

According to another embodiment, steps (i) and (ii) are carried out in the presence of a solvent. For example, the solvent is selected from the group consisting of dichloromethane, dimethyl carbonate, acetonitrile, ethanol, and a miscible combination of at least two thereof. According to a variant of interest, the solvent is dichloromethane.

According to another embodiment, the step of reacting the guanidine, amidine or phosphazene organic superbase with the organic bridging compound is carried out in the presence of a base. According to a variant of interest, the base is triethylamine ($Et_3N$).

In some embodiments, steps (i) and (ii) are carried out at room temperature.

In some embodiments, the step of reacting the guanidine, amidine or phosphazene organic superbase with the organic bridging compound is carried out for about 4 days.

In some embodiments, the step of reacting the multicationic complex with the ionic salt is carried out for about 3 days.

According to another embodiment, the process further comprises a purification step. For example, the purification step is carried out by extraction, distillation or evaporation. According to another embodiment, the process further comprises a step of coating the ionic plastic crystal composition or a suspension comprising the ionic plastic crystal on a substrate. For example, the coating step is carried out by at least one of a doctor blade coating method, a comma coating method, a reverse-comma coating method, a printing method such as gravure coating, or a slot-die coating method. According to a variant of interest, the coating step is carried out by at least one of a doctor blade coating method or a slot-die coating method.

According to another embodiment, the process further comprises a step of drying the composition or suspension.

In some embodiments, the drying and coating steps are carried out simultaneously.

According to another aspect, the present technology relates to a process for the production of an electrode material as herein defined, the process comprising the following steps:
(i) preparing a carbon and binder slurry;
(ii) preparing an ionic plastic crystal-based catholyte solution; and
(iii) preparing an ionic plastic crystal, carbon, and binder slurry.

According to one embodiment, the step of preparing a carbon and binder slurry comprises dispersing the carbon in a binder composition.

According to another embodiment, the process further comprises preparing the binder composition.

In some embodiments, the carbon comprises carbon black.

In some embodiments, the carbon comprises vapor grown carbon fibers.

According to another embodiment, the binder composition comprises a binder and optionally a solvent and/or a carbon dispersing agent.

In some embodiments, the binder comprises a fluorine-containing polymer. For example, the fluorine-containing polymer is polytetrafluoroethylene, polyvinylidene fluoride, or poly(vinylidene fluoride-co-hexafluoropropylene). According to a variant of interest, the fluorine-containing polymer is polyvinylidene fluoride.

In some embodiments, the solvent is N-methyl-2-pyrrolidone.

In some embodiments, the carbon dispersing agent is polyvinylpyrrolidone.

According to another embodiment, the step of preparing the binder composition is carried out by mixing the binder with the solvent and/or the carbon dispersing agent. For example, the mixing step is carried out by a roll-milling process.

According to another embodiment, the step of preparing the ionic plastic crystal catholyte solution comprises diluting the ionic plastic crystal and an ionic salt in a solvent. For example, the solvent is N-methyl-2-pyrrolidone.

According to another embodiment, the step of preparing the ionic plastic crystal, carbon, and binder slurry comprises the progressive addition of the ionic plastic crystal-based catholyte solution to the carbon and binder slurry.

According to another embodiment, the process further comprises adding an electrochemically active material to the ionic plastic crystal, carbon, and binder slurry. For example, the electrochemically active material is lithium nickel manganese cobalt oxide (NMC).

According to another embodiment, the process further comprises coating the ionic plastic crystal, carbon, and binder slurry on a current collector to obtain an ionic plastic crystal, carbon, and binder electrode film on a current collector. For example, the coating step is carried out by at least one of a doctor blade coating method, a comma coating method, a reverse-comma coating method, a printing method such as gravure coating, or a slot-die coating method. According to a variant of interest, the coating step is carried out by the doctor blade coating method.

According to another embodiment, the process further comprises drying the ionic plastic crystal, binder, and carbon electrode film.

According to another embodiment, the process further comprises calendering the ionic plastic crystal, binder, and carbon electrode film. For example, the calendering step is carried out by a roll pressing method.

DETAILED DESCRIPTION

Figure 1:
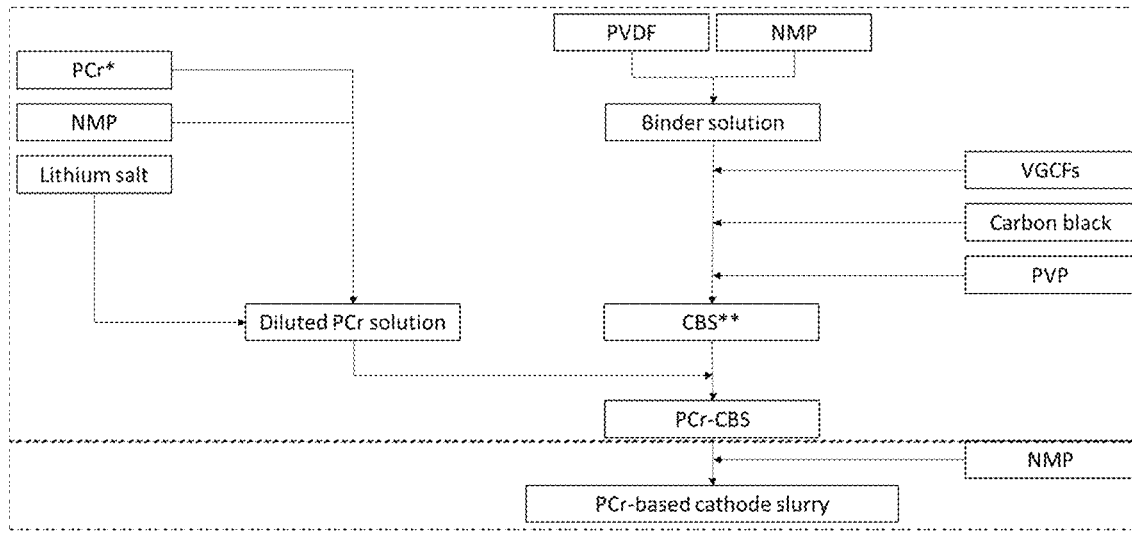
FIG. 1 is a flow diagram of a process for producing an electrode material according to one embodiment.

The following detailed description and examples are for illustrative purposes only and should not be construed as further limiting the scope of the invention. On the contrary, they are intended to cover all alternatives, modifications and equivalents that may be included as defined by the present description. The objects, advantages and other features of the present ionic plastic crystals, ionic plastic crystal-based solid electrolyte compositions, ionic plastic crystal-based solid electrolytes and electrode materials comprising said ionic plastic crystals, their preparation processes and uses will be more apparent and better understood upon reading the following non-restrictive description and references made to the accompanying figures.

Where applicable, although process flow diagrams may be used to describe embodiments, the invention is not limited to those diagrams or to the corresponding descriptions. Furthermore, for the sake of simplicity and clarity, in particular so as to not unduly burden the figures with steps, reactants and/or products, not all figures contain all the steps, reactants and/or products. Some steps, reactants and/or products may be found in a single figure, and those steps, reactants and/or products of the present disclosure which are illustrated in other figures may be easily inferred therefrom.

All technical and scientific terms and expressions used herein have the same definitions as those generally understood by the person skilled in the art when relating to the present technology. The definition of some terms and expressions used herein is nevertheless provided below.

When the term "about" is used herein, it means approximately, in the region of, or around. For example, when the term "about" is used in relation to a numerical value, it modifies it above and below by a variation of 10% from its nominal value. This term may also take into account, for example, the experimental error of a measuring device or rounding.

When a range of values is mentioned in the present application, the lower and upper limits of the range are, unless otherwise indicated, always included in the definition. When a range of values is mentioned in the present application, then all intermediate ranges and subranges, as well as the individual values included in the ranges of values, are included in the definition.

When the article "a" is used to introduce an element in the present application, it does not have the meaning of "only one", but rather of "one or more". Of course, where the description states that a particular step, component, element or feature "may" or "could" be included, that particular step, component, element or feature is not required to be included in each embodiment.

The chemical structures described herein are drawn according to the conventions of the field. Also, when an atom, such as a carbon atom, as drawn seems to include an incomplete valence, then the valence is assumed to be satisfied by one or more hydrogen atoms even if they are not explicitly drawn.

The term "alkyl" as used herein refers to saturated hydrocarbons having between one and ten carbon atoms, including linear or branched alkyl groups. Non-limiting examples of alkyl groups may include methyl, ethyl, propyl, butyl, pentyl, hexyl, heptyl, octyl, nonyl, decyl, isopropyl, tert-butyl, sec-butyl, isobutyl, and so on. When the alkyl group is located between two functional groups, then the term alkyl also includes alkylene groups such as methylene, ethylene, propylene, and so on. The terms "$C_m$-$C_n$alkyl" and "$C_m$-$C_n$alkylene" respectively refer to an alkyl or alkylene group having from the indicated number "m" to the indicated number "n" of carbon atoms.

The terms "cycloalkyl" or "cycloalkylene" as used herein refer to a group comprising one or more saturated or partially unsaturated (non-aromatic) carbocyclic rings comprising from three to twelve members in a monocyclic or polycyclic system, including spiro (sharing an atom) or fused (sharing at least one bond) carbocycles and may be optionally substituted. Examples of cycloalkyl groups include, without limitation, cyclopropyl, cyclobutyl, cyclopentyl, cyclopenten-1-yl, cyclopenten-2-yl, cyclopenten-3-yl, cyclohexyl, cyclohexen-1-yl, cyclohexen-2-yl, cyclohexen-3-yl, cycloheptyl and so on. When the cycloalkyl group is located between two functional groups, the term cycloalkylene may also be used. The terms "$C_m$-$C_n$cycloalkyl" and "$C_m$-$C_n$cycloalkylene" respectively refer to a cycloalkyl or cycloalkylene group having from the indicated number "m" to the indicated number "n" of carbon atoms in the ring structure.

As used herein, the terms "heterocycloalkyl" or "heterocycloalkylene" refer to a group comprising a saturated or partially unsaturated (non-aromatic) carbocyclic ring comprising from three to twelve members in a monocyclic or polycyclic system, including spiro (sharing one atom) or fused (sharing at least one bond) carbocycles, and may be optionally substituted, where one or more atoms in the ring structure are substituted or unsubstituted heteroatoms (e.g., N, O, S or P) or groups containing such heteroatoms (e.g., NH, $NR_x$ ($R_x$ is an alkyl, acyl, aryl, heteroaryl or cycloalkyl group), $PO_2$, SO, $SO_2$, and other similar groups). Heterocycloalkyl groups may be linked to a carbon atom or a heteroatom (e.g., via a nitrogen atom) where such is possible. The term heterocycloalkyl includes both unsubstituted and substituted heterocycloalkyl groups. When the heterocycloalkyl group is located between two functional groups, the term heterocycloalkylene may also be used. The terms "$C_m$-$C_n$heterocycloalkyl" and "$C_m$-$C_n$heterocycloalkylene" respectively refer to a heterocycloalkyl or heterocycloalkylene group having from the indicated number "m" to the indicated number "n" of carbon atoms and heteroatoms in the ring structure.

As used herein, the terms "aryl" or "aromatic" refer to an aromatic group having 4n+2π(pi) electrons where n is an integer from one to three, in a monocyclic or conjugated polycyclic ring system (fused or not) and having a total of six to twelve ring members. A polycyclic system comprises at least one aromatic ring. This group may be directly linked or attached via a $C_1$-$C_3$alkyl group. The term "aryl" or "aromatic" also includes substituted and unsubstituted groups. Examples of aryl groups include, without limitation, phenyl, benzyl, phenethyl, 1-phenylethyl, tolyl, naphthyl, biphenyl, terphenyl, indenyl, benzocyclooctenyl, benzocycloheptenyl, azulenyl, acenaphthylenyl, fluorenyl, phenanthrenyl, anthracenyl, perylenyl and so on. When the aryl group is located between two functional groups, the term arylene may also be used. The terms "$C_m$-$C_n$aryl" or "$C_m$-$C_n$aromatic" and "$C_m$ $C_n$arylene" respectively refer to an aryl or aromatic and arylene group having from the indicated number "m" to the indicated number "n" of carbon atoms in the ring structure.

The terms "heteroaryl", "heteroarylene", or "heteroaromatic" refer to aromatic groups having 4n+2 Π(pi) electrons, where n is an integer from one to three, in a monocyclic or conjugated polycyclic ring system (fused or not) and having five to twelve ring members, including from one to six substituted or unsubstituted heteroatoms (e.g., N, O or S) or groups comprising such heteroatoms (e.g., NH, $NR_x$ ($R_x$ is an alkyl, acyl, aryl, heteroaryl or cycloalkyl group), SO, and other similar groups). A polycyclic system comprises at least one heteroaromatic ring. Heteroaryls may be directly linked or attached via a $C_1$-$C_3$alkyl group (also referred to as heteroarylalkyl or heteroaralkyl). Heteroaryl groups may be linked to a carbon atom or a heteroatom (e.g., via a nitrogen atom), where such is possible. The term "$C_m$-$C_n$heteroaryl" refers to a heteroaryl group having from the indicated number "m" to the indicated number "n" of carbon atoms and heteroatoms in the ring structure.

As used herein, the term "substituted" means that one or more hydrogen atom(s) on the designated group is replaced by a suitable substituent. Examples of substituents include halogen atoms (i.e., F, Cl, Br or 1) and cyano, amide, nitro, trifluoromethyl, lower alkyl, cycloalkyl, heterocycloalkyl, aryl, heteroaryl, lower alkoxy, aryloxy, benzyloxy, benzyl, alkoxycarbonyl, sulfonyl, sulfonate, silane, siloxane, phosphonato, phosphinato and other similar groups. These substituents may also be substituted where possible, for example, if the group contains an alkyl group, an alkoxy group, an aryl group, etc.

The present technology relates to an ionic plastic crystal including at least one delocalized anion paired with at least one guanidine, amidine or phosphazene organic superbase-derived cation. For example, the ionic plastic crystal may be monocationic or multicationic.

According to a variant of interest, the ionic plastic crystal may be a monocationic ionic plastic crystal including a delocalized anion paired with a guanidine, amidine or phosphazene organic superbase-derived cation. The guanidine, amidine or phosphazene organic superbase-derived cation may be a guanidine, amidine or phosphazene organic superbase-derived protic cation and the ionic plastic crystal may be a protic monocationic ionic plastic crystal.

According to another variant of interest, the ionic plastic crystal may be a multicationic ionic plastic crystal including at least two delocalized anions, each paired with a cationic moiety of the guanidine, amidine or phosphazene organic superbase-derived cation. For example, the multicationic ionic plastic crystal may be a dicationic, tricationic, tetracationic, pentacationic or hexacationic ionic plastic crystal. It is to be understood that the cationic moieties are linked together by an organic bridging group which separates said cationic moieties.

According to an example, the delocalized anion may be selected from the group consisting of trifluoromethanesulfonate (or triflate) [TfO]⁻, bis(trifluoromethanesulfonyl)imide [TFSI]⁻, bis(fluorosulfonyl)imide [FSI]⁻, 2-trifluoromethyl-4,5-dicyanoimidazolate [TDI]⁻, hexafluorophosphate [PF$_6$]⁻ and tetrafluoroborate [BF$_4$]⁻. According to an example, the delocalized anion may be selected from the group consisting of [TFSI]⁻ and [FSI]⁻. According to a variant of interest, the delocalized anion is [FSI]⁻.

According to another example, the guanidine, amidine or phosphazene organic superbase may be selected for its affinity for hydrogen ions in organic solvents and for its ability to delocalize charge in its protonated cationic form. For example, the guanidine, amidine or phosphazene organic superbase may bind a hydrogen cation to a nitrogen lone electron pair.

According to another example, the guanidine, amidine or phosphazene organic superbase may have an acyclic, monocyclic, or polycyclic structure.

According to another example, the guanidine, amidine or phosphazene organic superbase may be selected from the group consisting of 1,8-diazabicyclo[5.4.0]undec-7-ene (DBU), 1,5-diazabicyclo[4.3.0]non-5-ene (DBN), 7-methyl-1,5,7-triazabicyclo[4.4.0]dec-5-ene (MTBD), 2-tert-butyl-imino-2-diethylamino-1,3-dimethylperhydro-1,3,2-diazaphosphorine (BEMP), tert-butylimino-tri(pyrrolidino)phosphorane (BTPP), and tert-butylimino-tris(dimethylamino)phosphorane (P$_1$-t-Bu). According to a variant of interest, the organic superbase may be DBU or BEMP.

According to another example, the guanidine, amidine or phosphazene organic superbase-derived cation may be a protic cation.

According to another example, the guanidine, amidine or phosphazene organic superbase-derived cation may comprise at least one cross-linkable functional group. For example, the cross-linkable functional group may be selected from the group consisting of cyanate, acrylate, and methacrylate groups. According to a variant of interest, the cross-linkable functional group may be selected from the group consisting of C$_1$-C$_{10}$alkyl-acrylate, C$_1$-C$_{10}$alkyl-methacrylate, carbonyloxy-C$_1$-C$_{10}$alkyl-methacrylate, carbonyloxy-C$_1$-C$_{10}$alkyl-acrylate, carbonylamino-C$_1$-C$_{10}$alkyl-methacrylate, and carbonylamino-C$_1$-C$_{10}$alkyl-acrylate groups. Of course, the at least partially crosslinked version of these cross-linkable groups is also intended to be included in this definition. According to another example, the guanidine, amidine or phosphazene organic superbase-derived cation may be an amidine organic superbase-derived cation of Formula 1:

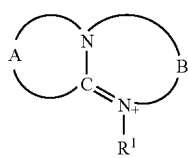

Formula 1 wherein,
A forms, with the C—N group to which it is linked, an optionally substituted saturated, unsaturated or aromatic ring comprising from 4 to 8 members;
B forms, with the amidino group to which it is linked, an optionally substituted unsaturated non-aromatic ring comprising from 4 to 8 elements; and wherein,
the ionic plastic crystal is a monocationic ionic plastic crystal and R$^1$ is a hydrogen atom or a linear or branched substituent selected from a C$_1$-C$_{10}$alkyl-acrylate, a C$_1$-C$_{10}$alkyl-methacrylate, a carbonylamino-C$_1$-C$_{10}$alkyl-methacrylate, a carbonylamino-C$_1$-C$_{10}$alkyl-acrylate, a carbonyloxy-C$_1$-C$_{10}$alkyl-methacrylate, and a carbonyloxy-C$_1$-C$_{10}$alkyl-acrylate; or
the ionic plastic crystal is a multicationic ionic plastic crystal and R$^1$ is an optionally substituted organic bridging group separating two or more of the cations and is selected from a linear or branched C$_1$-C$_{10}$alkylene, a linear or branched C$_1$-C$_{10}$alkyleneoxyC$_1$-C$_{10}$alkylene, a linear or branched poly(C$_1$-C$_{10}$alkyleneoxy)C$_1$-C$_{10}$alkylene, a linear or branched polyether, a linear or branched polyester, a C$_6$-C$_{12}$arylene, a C$_5$-C$_{12}$heteroarylene, a C$_3$-C$_{12}$cycloalkylene, and a C$_3$-C$_{12}$heterocycloalkylene.

According to another example, A may include heteroatoms or heteroatom-containing groups. A may further be fused to a C$_6$-C$_{12}$arylene, a C$_5$-C$_{12}$heteroarylene, a C$_3$-C$_{12}$cycloalkylene, or a C$_3$-C$_{12}$heterocycloalkylene.

According to another example, B may be monounsaturated or polyunsaturated and may further be fused to a C$_5$-C$_{12}$arylene, a C$_5$-C$_{12}$heteroarylene, a C$_3$-C$_{12}$cycloalkylene, or a C$_3$-C$_{12}$heterocycloalkylene.

According to another example, the guanidine, amidine or phosphazene organic superbase-derived cation may be one of the cations of Formulae 2 to 8:

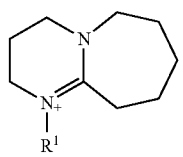

Formula 2

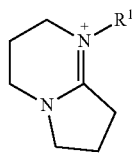

Formula 3

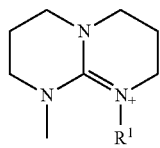

Formula 4

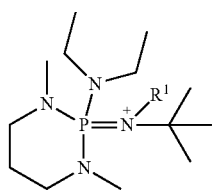

Formula 5

Formula 6

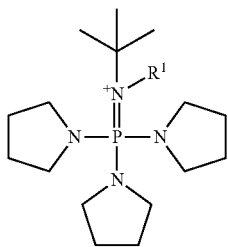

Formula 7

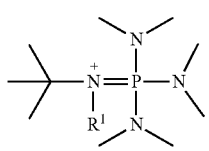

Formula 8

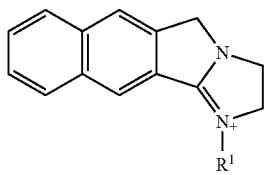

wherein,
the ionic plastic crystal is a monocationic ionic plastic crystal and $R^1$ is a hydrogen atom or a linear or branched substituent selected from a $C_1$-$C_{10}$alkyl-acrylate, a $C_1$-$C_{10}$alkyl-methacrylate, a carbonylamino-$C_1$-$C_{10}$alkyl-methacrylate, a carbonylamino-$C_1$-$C_{10}$alkyl-acrylate, a carbonyloxy-$C_1$-$C_{10}$alkyl-methacrylate, and a carbonyloxy-$C_1$-$C_{10}$alkyl-acrylate; or
the ionic plastic crystal is a multicationic ionic plastic crystal and $R^1$ is an optionally substituted organic bridging group separating at least two of the cations and is selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, a linear or branched polyether, a linear or branched polyester, a $C_6$-$C_{12}$arylene, a $C_5$-$C_{12}$heteroarylene, a $C_3$-$C_{12}$cycloalkylene, and a $C_3$-$C_{12}$heterocycloalkylene.

According to another example, the guanidine, amidine or phosphazene organic superbase-derived cation may be selected from the group consisting of [$R^1$-DBU]+, [$R^1$-DBN]+, [$R^1$-MTBD]+, [$R^1$-BEMP]+, [$R^1$-BTPP]+ and [$R^1$—$P_1$-t-Bu]+. According to a variant of interest, the guanidine, amidine or phosphazene organic superbase-derived cation is [$R^1$-DBU]$^+$ or [$R^1$-BEMP]$^+$.

According to another example, the guanidine, amidine or phosphazene organic superbase-derived cation may be selected from the group consisting of [H-DBU]+, [H-DBN]+, [H-MTBD]+, [H-BEMP]+, [H-BTPP]+ and [H—$P_1$-t-Bu]+. According to a variant of interest, the guanidine, amidine or phosphazene organic superbase-derived cation is [H-DBU]$^+$ or [H-BEMP]$^+$.

According to another example, the ionic plastic crystal may be of Formula 9:

Formula 9

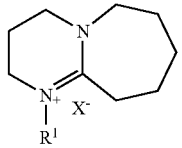

wherein,
A, B, and $R^1$ are as herein defined; and
$X^-$ is a delocalized anion as herein defined.

According to another example, the ionic plastic crystal may be one of the ionic plastic crystals of Formulas 10 to 16:

Formula 10

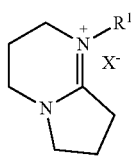

Formula 11

Formula 12

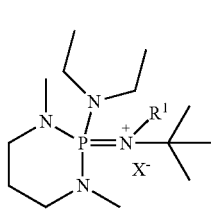

Formula 13

Formula 14

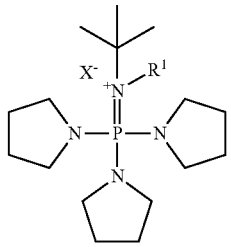

Formula 15

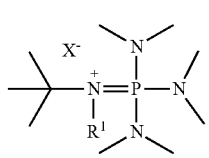

-continued

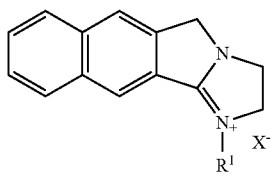

Formula 16 wherein,
R¹ is as herein defined; and
X⁻ is a delocalized anion as herein defined.

According to another example, the ionic plastic crystal may be selected from the group consisting of [R¹-DBU][OTf], [R¹-DBU][TFSI], [R¹-DBU][FSI], [R¹-DBU][TDI], [R¹-DBU][PF₆], [R¹-DBU][BF₄], [R¹-DBN][OTf], [R¹-DBN][TFSI], [R¹-DBN][FSI], [R¹-DBN][TDI], [R¹-DBN][PF₆], [R¹-DBN][BF₄], [R¹-MTBD][OTf], [R¹-MTBD][TFSI], [R¹-MTBD][FSI], [R¹-MTBD][TDI], [R¹-MTBD][PF₆], [R¹-MTBD][BF₄], [R¹-BEMP][OTf], [R¹-BEMP][TFSI], [R¹-BEMP][FSI], [R¹-BEMP][TDI], [R¹-BEMP][PF₆], [R¹-BEMP][BF₄], [R¹—P₁-t-Bu][OTf], [R¹—P₁-t-Bu][TFSI], [R¹—P₁-t-Bu][FSI], [R¹—P₁-t-Bu][TDI], [R¹—P₁-t-Bu][PF₆], [R¹—P₁-t-Bu][BF₄], [R¹-BTPP][OTf], [R¹-BTPP][TFSI], [R¹-BTPP][FSI], [R¹-BTPP][TDI], [R¹-BTPP][PF₆], and [R¹-BTPP][BF₄]. According to a variant of interest, the ionic plastic crystal is [R¹-DBU][FSI] or [R¹-BEMP][FSI].

According to another example, the ionic plastic crystal may be selected from the group consisting of [H-DBU][OTf], [H-DBU][TFSI], [H-DBU][FSI], [H-DBU][TDI], [H-DBU][PF₆], [H-DBU][BF₄], [H-DBN][OTf], [H-DBN][TFSI], [H-DBN][FSI], [H-DBN][TDI], [H-DBN][PF₆], [H-DBN][BF₄], [H-MTBD][OTf], [H-MTBD][TFSI], [H-MTBD][FSI], [H-MTBD][TDI], [H-MTBD][PF₆], [H-MTBD][BF₄], [H-BEMP][OTf], [H-BEMP][TFSI], [H-BEMP][FSI], [H-BEMP][TDI], [H-BEMP][PF₆], [H-BEMP][BF₄], [H—P₁-t-Bu][OTf], [H—P₁-t-Bu][TFSI], [H—P₁-t-Bu][FSI], [H—P₁-t-Bu][TDI], [H—P₁-t-Bu][PF₆], [H—P₁-t-Bu][BF₄], [H-BTPP][OTf], [H-BTPP][TFSI], [H-BTPP][FSI], [H-BTPP][TDI], [H-BTPP][PF₆], and [H-BTPP][BF₄]. According to a variant of interest, the ionic plastic crystal is [H-DBU][FSI] or [H-BEMP][FSI].

The present technology also relates to a stabilized intermediary ion-neutral complex obtained by the reaction of a guanidine, amidine or phosphazene organic superbase-derived cation as described herein, a proton source and a delocalized anion as described herein in the presence of a bis-silylated compound of Formula 17:

(R²)₃Si—O—Z—O—Si(R²)₃

Formula 17 wherein,
Z is a substituted or unsubstituted organic group selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, a linear or branched polyether, a linear or branched polycarbonate, a linear or branched polythiocarbonate, a linear or branched polyamide, a linear or branched polyimide, a linear or branched polyurethane, a linear or branched polysiloxane, a linear or branched thioether, a linear or branched polyphosphazene, a linear or branched polyester, and a linear or branched polythioester; and R² is independently and in each occurrence selected from the group consisting of an alkyl group, an aryl group, and an arylalkyl group.

According to an example, the bis-silylated compound of Formula 17 is a bis-silylated derivative of a compound including at least two hydroxyl groups selected from the group consisting of glycerol (glycerin), 1,3-propanediol, 1,4-butanediol, 1,5-pentanediol, 1,6-hexanediol, 1,8-octanediol, 1,2-propanediol (or propylene glycol (PG)), 1,2-butanediol, 2,3-butanediol (or dimethylene glycol), 1,3-butanediol (or butylene glycol), 1,2-pentanediol, etohexadiol, p-menthane-3,8-diol, 2-methyl-2,4-pentanediol, polycaprolactone diol, ethylene glycol (1,2-ethanediol), diethylene glycol (or ethylene diglycol), triethylene glycol, tetraethylene glycol, pentaethylene glycol, polyethylene glycol, 2,2,3,3,4,4,5,5-octafluorohexane-1,6-diol, and other similar glycols and diols, or a combination of at least two thereof. According to a variant of interest, the compound including at least two hydroxyl groups is diethylene glycol or glycerol.

According to another example, the stabilized intermediary ion-neutral complex may be one of the complexes of Formulae 18 to 24:

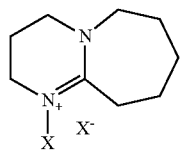

Formula 18

(R²)₃Si—O—Z—O—Si(R²)₃

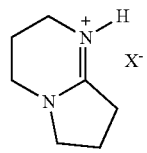

Formula 19

(R²)₃Si—O—Z—O—Si(R²)₃

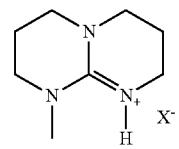

Formula 20

(R²)₃Si—O—Z—O—Si(R²)₃

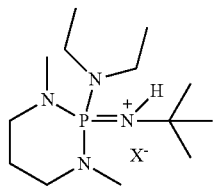

Formula 21

(R²)₃Si—O—Z—O—Si(R²)₃

Formula 22

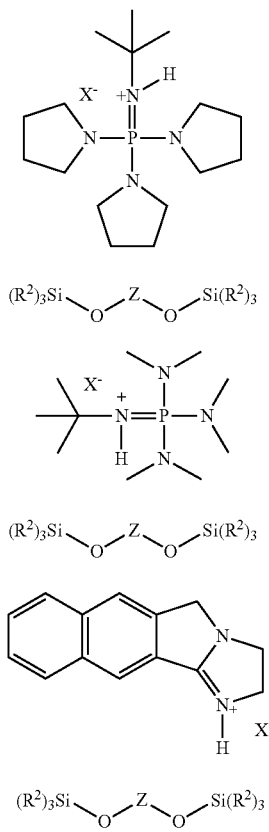

Formula 23

Formula 24 wherein,

Z, X⁻ and R² are as herein defined.

According to an example, a silane group of the bis-silylated compound of Formula 17 may be cleaved and the N—H proton of the guanidine, amidine or phosphazene organic superbase-derived cation may participate in hydrogen bonds to form a NHO-stabilized intermediary ion-neutral complex. For example, only about 1% of the bis-silylated compound of Formula 17 ends up with a cleaved silane group. For example, the NHO-stabilized intermediary ion-neutral complex is a by-product of the reaction.

According to another example, the NHO-stabilized intermediary ion-neutral complex may be one of the complexes of Formulae 25 to 31:

Formula 25

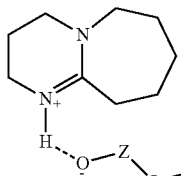

Formula 26

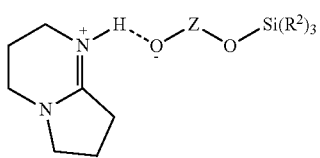

Formula 27

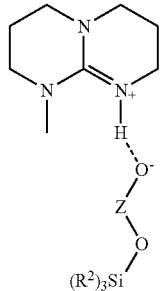

Formula 28

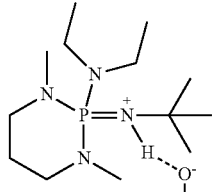

Formula 29

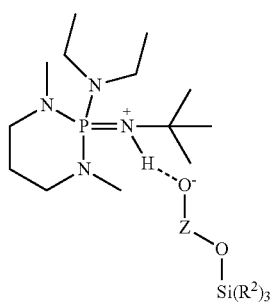

Formula 30

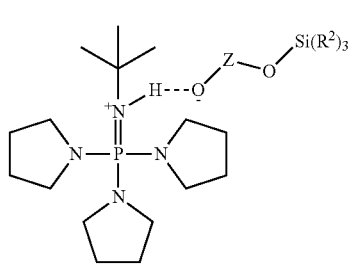

Formula 31

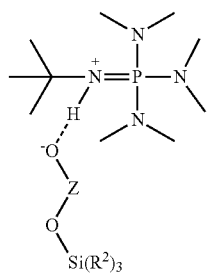

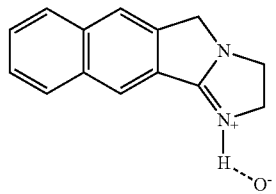

wherein,

Z and R² are as herein defined.

The present technology also relates to an ionic plastic crystal composition including at least one ionic plastic crystal as herein defined and at least one additional component, and/or at least one polymer.

According to an example, the additional component may be selected from the group consisting of solvents, ionic conductors, inorganic particles, glass particles, ceramic particles (e.g., nanoceramics), plasticizing agents, and other similar components, or a combination of at least two thereof. For example, the additional component may be a filler additive and may include metal oxide particles or nanoparticles. For example, the filler additive may include particles or nanoparticles of titanium dioxide ($TiO_2$), alumina ($Al_2O_3$) and/or silicon dioxide ($SiO_2$).

According to another example, the polymer may be a polymer such as those commonly used in solid polymer electrolytes (SPE). Solid polymer electrolytes may generally include one or more solid polar polymer(s), optionally crosslinked, and a salt (e.g., as defined above). Polyether-type polymers, such as those based on poly(ethylene oxide) (PEO), may be used, but several other compatible polymers are also known for the preparation of solid polymer electrolytes and are also contemplated. The polymer may be crosslinked. Examples of such polymers include branched polymers, for example, star polymers or comb polymers such as those described in U.S. Pat. No. 7,897,674 B2 (Zaghib et al.) (US'674).

According to some examples, the polymer may be a block copolymer composed of at least one lithium-ion solvating segment and optionally at least one cross-linkable segment. For example, the lithium-ion solvation segment is selected from homo- or copolymers having repeating units of Formula 32:

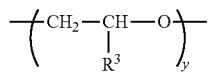

Formula 32 wherein,
R$^3$ is selected from a hydrogen atom, a $C_1$-$C_{10}$alkyl group or a —($CH_2$—O—R$^4$R$^5$) group;
R$^4$ is ($CH_2$—$CH_2$—O)$_m$;
R$^5$ is selected from a hydrogen atom and a $C_1$-$C_{10}$alkyl group;
y is an integer selected from the range of 10 to 200,000; and
m is an integer selected from the range of 0 to 10.

According to another example, the cross-linkable segment of the copolymer is a polymer segment comprising at least one functional group cross-linkable multi-dimensionally by means of irradiation or thermal treatment.

According to another example, the concentration of the polymer in the ionic plastic crystal composition may be of at least 10 wt. %. For example, the concentration of the polymer in the ionic plastic crystal composition may be in the range of from about 5 wt. % to about 45 wt. %, or from about 10 wt. % to about 45 wt. %, or from about 15 wt. % to about 45 wt. %, or from about 20 wt. % to about 45 wt. %, or from about 25 wt. % to about 45 wt. %, or from about 30 wt. % to about 45 wt. %, or from about 35 wt. % to about 45 wt. %, or from about 40 wt. % to about 45 wt. %, upper and lower limits included. According to a variant of interest, the ionic plastic crystal composition includes about 40 wt. % of the polymer and 60 wt. % of the ionic plastic crystal as described herein. It is to be understood that the optimum concentration of the polymer in the ionic plastic crystal composition depends on the polymer used.

According to another example, the additional component may be inorganic particles including a compound having a garnet, NASICON, LISICON, thio-LISICON, LIPON, perovskite, anti-perovskite, or argyrodite type structure, or including a compound of the M-P-S, M-P—S—O, M-P—S—X, M-P—S—O—X type (where M is an alkali or alkaline earth metal, and X is F, Cl, Br, I or a combination of at least two thereof) in crystalline phase, amorphous phase and/or glass-ceramic phase, or a mixture of at least two thereof.

According to another example, the additional component may be inorganic particles in crystalline phase, amorphous phase and/or glass-ceramic phase, or a mixture of at least two thereof and including at least one of the inorganic compounds of formulae MLZO (e.g., $M_7La_3Zr_2O_{12}$, $M_{(7-a)}La_3Zr_2Al_bO_{12}$, $M_{(7-a)}La_3Zr_2Ga_bO_{12}$, $M_{(7-a)}La_3Zr_{(2-b)}Ta_bO_{12}$ and $M_{(7-a)}La_3Zr_{(2-b)}Nb_bO_{12}$); MLTaO (e.g., $M_7La_3Ta_2O_{12}$, $M_5La_3Ta_2O_{12}$ and $M_6La_3Ta_{1.5}Y_{0.5}O_{12}$); MLSnO (e.g., $M_7La_3Sn_2O_{12}$); MAGP (e.g., $M_{1+a}Al_aGe_{2-a}(PO_4)_3$); MATP (e.g., $M_{1+a}Al_aTi_{2-a}(PO_4)_3$); MLTiO (e.g., $M_{3a}La_{(2/3-a)}TiO_3$); MZP (e.g., $M_aZr_b(PO_4)_c$); MCZP (e.g., $M_aCa_bZr_c(PO_4)_d$); MGPS (e.g., $M_aGe_bP_cS_d$ such as $M_{10}GeP_2S_{12}$); MGPSO (e.g., $M_aGe_bP_cS_dO_e$); MSiPS (e.g., $M_aSi_bP_cS_d$ such as $M_{10}SiP_2S_{12}$); MSiPSO (e.g., $M_aSi_bP_cS_dO_e$); MSnPS (e.g., $M_aSn_bP_cS_d$ such as $M_{10}SnP_2S_{12}$); MSnPSO (e.g., $M_aSn_bP_cS_dO_e$); MPS (e.g., $M_aP_bS_c$ such as $M_7P_3S_{11}$); MPSO (e.g., $M_aP_bS_cO_d$); MZPS (e.g., $M_aZn_bP_cS_d$); MZPSO (e.g., $M_aZn_bP_cS_dO_e$); xM$_2$S-yP$_2$S$_5$; xM$_2$S-yP$_2$S$_5$-zMX; xM$_2$S-yP$_2$S$_5$-zP$_2$O$_5$; xM$_2$S-yP$_2$S$_5$-zP$_2$O$_5$-wMX; xM$_2$S-yM$_2$O-zP$_2$S$_5$; xM$_2$S-yM$_2$O-zP$_2$S$_5$-wMX; xM$_2$S-yM$_2$O-zP$_2$S$_5$-wP$_2$O$_5$; xM$_2$S-yM$_2$O-zP$_2$S$_5$-wP$_2$O$_5$-vMX; xM$_2$S-ySiS$_2$; MPSX (e.g., $M_aP_bS_cX_d$ such as $M_7P_3S_{11}X$, $M_7P_2S_8X$ and $M_6PS_5X$); MPSOX (e.g., $M_aP_bS_cO_dX_e$); MGPSX (e.g., $M_aGe_bP_cS_dX_f$); MGPSOX (e.g., $M_aGe_bP_cS_dO_eX_f$); MSIPSX (e.g., $M_aSi_bP_cS_dX_f$); MSiPSOX (e.g., $M_aSi_bP_cS_dO_eX_f$); MSnPSX (e.g., $M_aSn_bP_cS_dX_f$); MSnPSOX (e.g., $M_aSn_bP_cS_dO_eX_f$); MZPSX (e.g., $M_aZn_bP_cS_dX_f$); MZPSOX (e.g., $M_aZn_bP_cS_dO_eX_f$); $M_3$OX; $M_2$HOX; $M_3PO_4$; $M_3PS_4$; and $M_aPO_bN$, (where a=2b+3c−5);

wherein,
M is an alkali metal ion, an alkaline earth metal ion or a combination thereof, and wherein when M comprises an alkaline earth metal ion, then the number of M is adjusted to achieve electroneutrality;
X is selected from F, Cl, Br, I or a combination thereof;
a, b, c, d, e, and f are numbers other than zero and are, independently in each formula, selected to achieve electroneutrality; and
v, w, x, y, and z are numbers other than zero and are, independently in each formula, selected to obtain a stable compound.

According to another example, the additional component may be a ceramic or a glass-ceramic. For example, the additional component may be a sulfide-based ceramic or glass-ceramic such as $Li_{10}GeP_2S_{12}$, $Li_6PS_5Cl$, $Li_2S$—$P_2S_5$, $Li_7P_3S_{11}$, $Li_{9.54}Si_{1.74}P_{1.44}S_{11.7}Cl_{0.3}$, $Li_{90.6}P_3S_{12}$, $Li_{3.25}P_{0.95}S_4$ and other similar ceramics and glass-ceramics. According to a variant of interest, the sulfide-based ceramic or glass-ceramic is $Li_6PS_5Cl$. The concentration of the ceramic or glass-ceramic in the ionic plastic crystal composition may be of at least 50 wt. %. For example, the concentration of the ceramic or glass-ceramic in the ionic plastic crystal composition may be in the range of from about 50 wt. % to about 95 wt. %, or from about 55 wt. % to about 95 wt. %, or from about 60 wt. % to about 95 wt. %, or from about 65 wt. % to about 95 wt. %, or from about 70 wt. % to about 95 wt. %, or from about 75 wt. % to about 95 wt. %, or from about 80 wt. % to about 95 wt. %, or from about 85 wt. % to about 95 wt. %, or from about 90 wt. % to about 95 wt. %, upper and lower limits included. According to a variant of interest, the ionic plastic crystal composition includes about 90 wt. % of $Li_6PS_5Cl$ and 10 wt. % of the ionic plastic crystal as described herein. It is to be understood that the optimum concentration of the additional component in the ionic plastic crystal composition depends on the additional component used (e.g., depending on particle size, their specific surface area, etc.).

According to an example, the ionic plastic crystal may be prepared by any compatible synthetic process. For example, the synthesis of the ionic plastic crystal may include at least one of a proton exchange reaction, a counterion exchange reaction and any other suitable reaction.

According to another example, the process of synthesizing a protic ionic plastic crystal may include at least two synthesis steps. The first step may involve reacting a neutral organic superbase of the amidine, guanidine or phosphazene type with at least one proton source to form a complex, adduct or ion pair including a protonated cation. For example, the organic superbase may be selected for its ability to remove protons (or for its affinity for protons). For example, the organic superbase may be a non-nucleophilic organic superbase or a weakly nucleophilic organic superbase. According to a variant of interest, the organic superbase may be selected from the group consisting of DBU, DBN, MTBD, BEMP, BTPP, and $P_1$-t-Bu or a derivative thereof. For example, the organic superbase may be DBU or BEMP. For example, the second step may involve a counterion exchange reaction between the complex, adduct or ion pair including a protonated cation formed in the first step and an ionic salt based on a delocalized anion as described above. For example, the ionic salt may be an alkali or alkaline earth metal salt such as a lithium, sodium, potassium, calcium, or magnesium salt. For example, the ionic salt may be a lithium salt selected from the group consisting of lithium trifluoromethanesulfonate ($LiSO_3CF_3$) (LiOTf), lithium bis(trifluoromethanesulfonyl)imide (LiTFSI), lithium bis(fluorosulfonyl)imide (LiFSI), lithium 2-trifluoromethyl-4,5-dicyanoimidazolate (LiTDI), lithium hexafluorophosphate ($LiPF_6$), and lithium tetrafluoroborate ($LiBF_4$). According to a variant of interest, the lithium salt is LiFSI.

According to another example, the ionic plastic crystal may be a protic ionic plastic crystal formed by proton transfer from a Brønsted acid to a Brønsted base. For example, the Brønsted base may be a neutral organic superbase of the amidine, guanidine or phosphazene type and may be selected for its ability to remove protons (or for its affinity for protons). According to a variant of interest, the organic superbase may be selected from the group consisting of DBU, DBN, MTBD, BEMP, BTPP, and $P_1$-t-Bu, or a derivative thereof. For example, the organic superbase may be DBN or BEMP. According to another variant of interest, the Brønsted acid may be selected from the group consisting of trifluoromethanesulfonic acid (TfOH), bis(trifluoromethanesulfonyl)imide acid (HTFSI), bis(fluorosulfonyl)imide acid (HFSI), 2-(trifluoromethyl)-1H-imidazole-4,5-dicarbonitrile (HTDI), hexafluorophosphoric acid ($HPF_6$), and tetrafluoroboric acid ($HBF_4$). According to a variant of interest, the Brønsted acid is HFSI.

The present technology thus also relates to a process for the preparation of an ionic plastic crystal or an ionic plastic crystal composition as herein defined, the process comprising the following step:

(i) reacting at least one organic superbase as described above with a Brønsted acid based on the delocalized anion as herein defined to form the ionic plastic crystal.

The present technology therefore also relates to a process for the preparation of an ionic plastic crystal or of an ionic plastic crystal composition as herein defined, the process comprising the following steps:

(i) reacting at least one organic superbase as described above with a proton source to form at least one complex including a protonated cation and a counterion; and (ii) reacting said complex including a protonated cation and a counterion with at least one ionic salt based on a delocalized anion as described above.

According to an example, the organic superbase is a neutral organic superbase of the amidine, guanidine or phosphazene type. According to a variant of interest, the organic superbase is selected from the group consisting of DBU, DBN, MTBD, BEMP, BTPP, and $P_1$-t-Bu or a derivative thereof. For example, the organic superbase may be DBU or BEMP.

According to another example, the process further comprises a step of preparing the organic superbase carried out before step (i). In some examples, the organic superbase may be a neutral polycyclic amidine organic superbase prepared by the condensation of an aromatic dialdehyde with a 1,2-diamine. For example, the neutral polycyclic amidine organic superbase may be prepared by a process as described by Braddock et al. (Braddock, D. C., et al. "The reaction of aromatic dialdehydes with enantiopure 1,2-diamines: an expeditious route to enantiopure tricyclic amidines." Tetrahedron: Asymmetry 21.24 (2010): 2911-2919).

According to another example, the ionic salt based on a delocalized anion as herein defined may be an alkali or alkaline earth metal salt such as a lithium, sodium, potassium, calcium, or magnesium salt based on the delocalized anion as herein defined. For example, the ionic salt may be of the formula $M^{n+}[(FSI)_n]^{n-}$, wherein $M^{n+}$ is an alkali or alkaline earth metal ion selected from the group consisting of $Na^+$, $K^+$, $Li^+$, $Ca^{2+}$ and $Mg^{2+}$ ions. According to a variant of interest, the $M^{n+}$ is $Li^+$.

According to another example, the two reaction steps may be carried out sequentially, simultaneously, or partially overlapping in time with each other. According to a variant of interest, the two reaction steps are carried out sequentially, and the step of reacting at least one organic superbase with a proton source is carried out before the step of reacting the complex including a protonated cation and a counterion with the ionic salt based on a delocalized anion. According to another variant of interest, all reactants may be mixed together and left to react under appropriate reaction conditions.

According to another example, the synthesis may be carried out in the presence of a solvent. For example, the solvent may act as a source of protons, and may be selected for its ability to readily donate protons or for its ability to stabilize the base and/or solvent conjugate acid cations. For example, the stabilization of the base and/or solvent conjugate acid cations may be achieved through solvation, non-covalent interaction (e.g., hydrogen bonds and dipole-dipole interactions), or Van der Waals interaction. Without wishing to be bound by theory, the ability to efficiently solubilize, and therefore, the ability to improve the solvation stability of the protonated forms of the organic superbase may significantly improve reaction yield. For example, the solvent may be a polar solvent selected from the group consisting of dichloromethane (DCM), dimethyl carbonate (DMC), acetonitrile (ACN), ethanol (EtOH) and a miscible combination of at least two thereof. According to a variant of interest, the solvent may be ACN.

According to an example of interest, the synthesis of the ionic plastic crystal may be carried out by a process as illustrated in Scheme 1 (wherein the by-products of the reaction are not shown):

Scheme 1

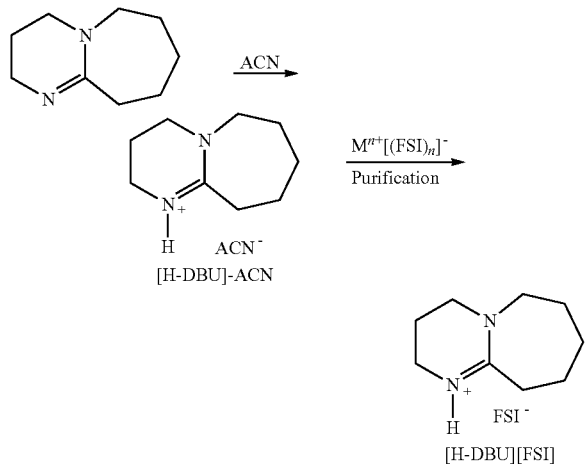

wherein,
$M^{n+}$ is an alkali or alkaline earth metal ion selected from the group consisting of Na$^+$,
K$^+$, Li$^+$, Ca$^{2+}$ and Mg$^{2+}$ ions.

According to a variant of interest, the $M^{n+}$ is Li$^+$.

According to another example, the synthesis may be carried out in the presence of a second proton source such as a suitable acid. The second proton source may, for example, be selected for its ability to readily donate protons or for its ability to stabilize the base and/or solvent conjugate acid cations. For example, the second proton source may also act as an activator and/or catalyst to obtain the ionic plastic crystal and may substantially improve the reaction yield. Examples of second proton sources include, without limitation, carboxylic acids (e.g., formic acid, acetic acid, propionic acid, lactic acid and trifluoroacetic acid), p-toluenesulfonic acid (or tosylic acid), sulfuric acid, hydroiodic acid, hydrobromic acid, hydrochloric acid, nitric acid, hydrofluoric acid, and other similar acids. According to a variant of interest, the acid is formic acid.

According to an example of interest, the synthesis of the ionic plastic crystal may be carried out by a process as illustrated in Scheme 2 (wherein the by-products of the reaction are not shown):

Scheme 2

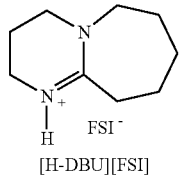

wherein,
$M^{n+}$ is an alkali or alkaline earth metal ion selected from the group consisting of Na$^+$, K$^+$, Li$^+$, Ca$^{2+}$ and Mg$^{2+}$ ions.

According to another example, the synthesis may be carried out in the presence of an activator which may also act as a stabilizer and/or as a proton source. The activator may react with the organic superbase to form a stable intermediary non-covalent complex. For example, the activator may substantially promote the formation of the ionic plastic crystal through the formation of said stable intermediary non-covalent complex by electrophilic nucleophilic activation. For example, the stable intermediary non-covalent complex may be an NHO-stabilized intermediary ion-neutral complex. For example, the activator may be a bis-silylated compound as described above.

According to an example of interest, the synthesis of the ionic plastic crystal may be carried out by a process as illustrated in Scheme 3 (wherein the by-products of the reaction are not shown):

Scheme 3

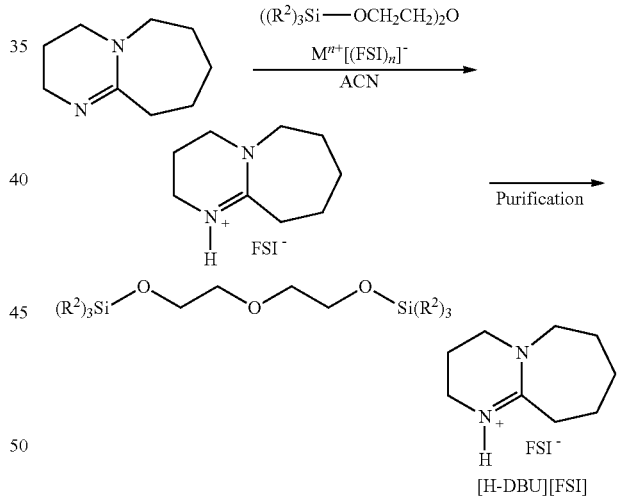

wherein,
$M^{n+}$ is an alkali or alkaline earth metal ion selected from the group consisting of Na$^+$, K$^+$, Li$^+$, Ca$^{2+}$ and Mg$^{2+}$ ions; and R$^2$ is as herein defined.

According to another example, the process further comprises a step for preparing the bis-silylated compound. The preparation of the bis-silylated compound may be carried out by the silylation of a compound including at least two hydroxyl groups that may be derivatized by silylation reagents, for example, the compound including at least two hydroxyl groups may be as described above. For example, the silylation reaction may be carried out by a base-catalyzed silylation reaction and may involve the replacement of an acidic hydrogen (or an active hydrogen) by a silyl group (e.g., an alkylsilyl group), for example, a trialkylsilyl group. For example, the compound including at least two hydroxyl groups may be deprotonated with a base, then treated with at least one silylation reagent. The base-catalyzed silylation reaction may be carried out in the presence of any known compatible base. For example, the base may be a nucleophilic Lewis base such as imidazole, 4-dimethylaminopyridine (DMAP), other similar nucleophilic Lewis bases and a combination thereof. According to a variant of interest, the base is imidazole. For example, the silylation reaction may be carried out in a polar aprotic solvent such as tetrahydrofuran (THF), N,N-dimethylformamide (DMF), dichloromethane (DCM), dimethyl sulfoxide (DMSO) or a miscible combination of at least two thereof. According to a variant of interest, the aprotic solvent is THF, DCM, or a combination of DCM and DMF in which DCM is significantly predominant.

For example, the silylation reagent may be selected for its reactivity and selectivity towards the compound including at least two hydroxyl groups, the stability of the silylated derivative and the reaction by-products. For example, universal silylation reagents may be used to derivatize the hydroxyl groups of the compound including at least two hydroxyl groups. Non-limiting examples of silylation reagents include trialkylsilyl chloride, trimethylsilyl chloride (TMS-Cl), triethylsilyl chloride (TES-Cl), isopropyldimethylsilyl chloride (IPDMS-Cl), diethylisopropylsilyl chloride (DEIPS-Cl), tert-butyldimethylsilyl chloride (TBDMS-Cl or TBS-Cl), tert-butyldiphenylsilyl chloride (TBDPS-Cl or TPS-Cl), triisopropylsilyl chloride (TIPS-Cl), nitrogen-containing silyl ethers, N,O-bis(tert-butyldimethylsilyl)acetamide (BSA), N-methyl-N-(trimethylsilyl)trifluoroacetamide (MSTFA), N-(trimethylsilyl)dimethylamine (TMSDEA), N-(trimethylsilyl)imidazole (TMSI or TSIM), N,O-bis(trimethylsilyl)trifluoroacetamide (BSTFA) and N-methyl-N-(trimethylsilyl)acetamide (MSA). According to a variant of interest, the silylation reagent includes a trialkylsilyl chloride such as TMS-Cl or TBDMS-Cl.

For example, TBDMS-Cl may be used to replace the active hydrogen on a hydroxyl group and the synthesis of the bis-silylated compound may be carried out by a silylation reaction as illustrated in Schemes 4(a) or 4(b):

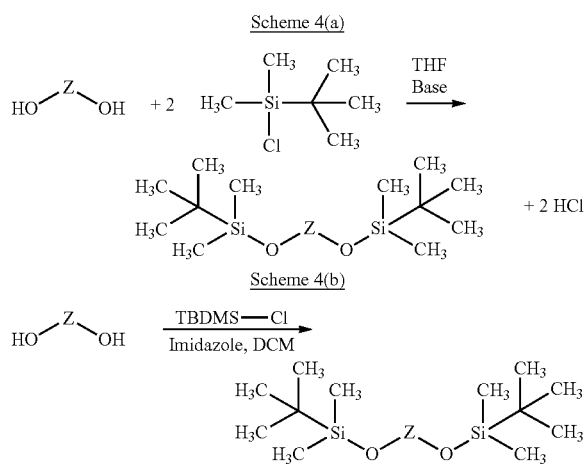

wherein,
Z is a substituted or unsubstituted organic group selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, a linear or branched polyether, a linear or branched polycarbonate, a linear or branched polythiocarbonate, a linear or branched polyamide, a linear or branched polyimide, a linear or branched polyurethane, a linear or branched polysiloxane, a linear or branched thioether, a linear or branched polyphosphazene, a linear or branched polyester, and a linear or branched polythioester.

A general example of a silylation reaction is illustrated in Scheme 4(a), using TBDMS-Cl as the silylation reagent, and involving nucleophilic attack on silicon. For example, one equivalent of the compound including at least two hydroxyl groups may react with two equivalents of TBDMS-Cl to form the bis-silylated compound and hydrochloric acid (HCl) as a reaction by-product. It is to be understood that the reaction involves one silyl group per hydroxyl group to be derivatized.

Another example of a silylation reaction is described by Sharpless et al. (Sharpless, K. B., et al. "SuFEx-Based Synthesis of Polysulfates" *Angewandte Chemie International Edition* 53.36 (2014): 9466-9470 (Supplementary Materials)). An example of this silylation reaction is shown in Scheme 4(b). For example, the silylation reagent may be added in a (—OH group to be derivatized):(silyl group) molar ratio of about 1:1 or about 1:0.9.

Alternatively, the silylation reagent may be added in excess. For example, the amount of silylation reagent may be in the range of from about 2 equivalents to about 5 equivalents per equivalent of compound including at least two hydroxyl groups, upper and lower limits included. For example, the amount of silylation reagent may be in the range of from about 2 equivalents to about 4.5 equivalents, or from about 2 equivalents to about 4 equivalents, or from about 2 equivalents to about 3.75 equivalents, or from about 2 equivalents to about 3.5 equivalents per equivalent of the compound including at least two hydroxyl groups, upper and lower limits included. According to a variant of interest, the amount of silylation reagent may be in the range of from about 2.2 equivalents to about 3.3 equivalents per equivalent of the compound including at least two hydroxyl groups when the compound includes two and three hydroxyl groups, respectively.

According to another example, the silylation reaction may be carried out at room temperature and for a sufficient period of time to allow a substantially complete reaction. For example, when the silylation reaction is carried out by the reaction shown in Scheme 4(a), it may be carried out for at least 15 hours. For example, the silylation reaction may be carried out for a period in the range of from about 15 hours to about 24 hours, upper and lower limits included. Alternatively, when the silylation reaction is carried out by the reaction shown in Scheme 4(b), it may be carried out for about 3 hours.

It is to be understood that the use of DCM as a solvent has a significant effect on the reaction rate. As such, DCM may be used for a larger-scale synthesis of the bis-silylated compound compared with other solvents such as THF or DMF.

According to another example, the preparation of an ionic plastic crystal or ionic plastic crystal composition as herein defined may thus involve a protonation reaction and an anion exchange reaction.

A general example of the mechanism is illustrated in Scheme 3 and involves the reaction of DBU with a metal bis(fluorosulfonyl)imide in the presence of the bis-silylated compound obtained in Scheme 4(a) or 4(b) to obtain the ionic plastic crystal and a by-product (not shown in Scheme 3).

According to another example, the activator (i.e., the bis-silylated compound) may react with an approximately equimolar amount of the organic superbase. Alternatively, the organic superbase may be added in excess, for example, the excess may be in the range of from about 0.01 mol. % to about 10 mol. %, upper and lower limits included. According to a variant of interest, the activator may be reacted with an approximately equimolar amount of the organic superbase.

According to another example, both reaction steps may be carried out at a sufficiently high temperature and for a sufficient period of time to allow a substantially complete reaction. For example, both reaction steps may be carried out at a temperature in the range of from about 20° C. to about 200° C., upper and lower limits included. For example, the two reaction steps may be carried out at a temperature in the range of from about 40° C. to about 80° C., or from about 45° C. to about 75° C., or from about 50° C. to about 70° C., or from about 55° C. to about 65° C., upper and lower limits included. For example, both reaction steps may be carried out for at least 4 days.

According to another example, the process further comprises a step for removing at least one by-product generated during any process step. For example, the removal step may be carried out by distillation or evaporation. For example, the by-product may be removed at ambient atmospheric pressure or under vacuum, depending on the boiling point of the by-product to be removed. The by-product may be removed by washing with any suitable solvent that dissolves the by-product but not the ionic plastic crystal. For example, the by-product may also be removed by more than one method, if necessary. According to a variant of interest, the by-product may be removed by extraction, for example, by dissolving the by-product in DCM and extracting with water and brine.

According to another example, the process further comprises a functionalization step, for example, a functionalization of the ionic plastic crystal in view of its crosslinking. For example, the functionalization of the ionic plastic crystal may optionally be carried out in order to functionalize the ionic plastic crystal, for example, by introducing at least one functional group as defined above, for example, a cross-linkable functional group. The cross-linkable functional group may be present on the cation or on a side chain of the cation backbone of the ionic plastic crystal.

According to another example, the reaction and functionalization steps may be carried out sequentially, simultaneously, or partially overlapping in time with each other. According to a variant of interest, the reaction and functionalization steps are performed sequentially, with the reaction step being performed before the functionalization step. For example, the functionalization step is a post-functionalization step.

According to another example, the functionalization step may be carried out by the reaction between the protonated cation and at least one cross-linkable functional group. For example, the functionalization step may be carried out by the reaction between the protonated cation and at least one cross-linkable functional group selected from the group consisting of $C_1$-$C_{10}$alkyl-acrylate, $C_1$-$C_{10}$alkyl-methacrylate, carbonyloxy-$C_1$-$C_{10}$alkyl-methacrylate, carbonyloxy-$C_1$-$C_{10}$alkyl-acrylate, carbonylamino-$C_1$-$C_{10}$alkyl-methacrylate, and carbonylamino-$C_1$-$C_{10}$alkyl-acrylate groups.

According to another example, the post-functionalization step may be carried out by a reaction as illustrated in Scheme 5 (wherein the reaction by-products are not shown):

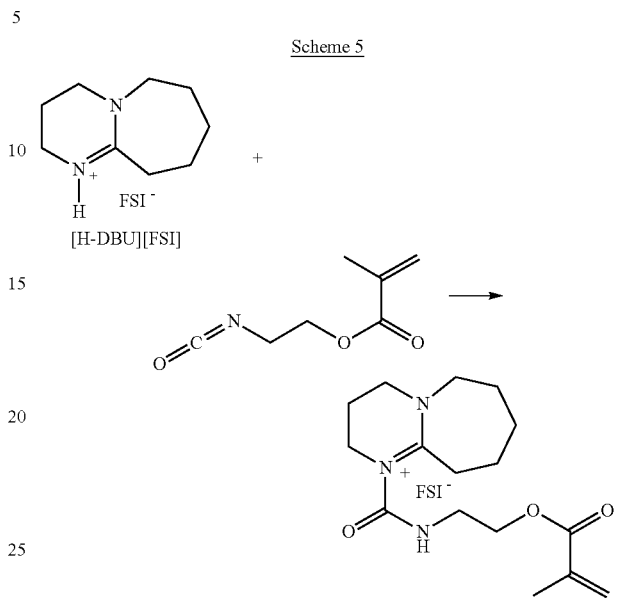

According to another example, the process further comprises a step of coating the ionic plastic crystal composition or a suspension comprising the ionic plastic crystal as described above. For example, said coating step may be carried out by at least one of a doctor blade coating method, a comma coating method, a reverse-comma coating method, a printing method such as a gravure coating, or a slot-die coating method. According to a variant of interest, said coating step is carried out by a doctor blade coating method or a slot-die coating method. According to an example, the ionic plastic crystal composition or the suspension comprising the ionic plastic crystal may be coated onto a substrate or support film (e.g., a substrate made of silicone, polypropylene or siliconized polypropylene). For example, said substrate or support film may be subsequently removed. According to another example, the ionic plastic crystal composition or the suspension comprising the ionic plastic crystal may be coated directly onto an electrode.

According to another example, the process further comprises a step of drying the ionic plastic crystal composition or the ionic plastic crystal as defined above. According to an example, the drying step may be carried out in order to remove any residual solvent. According to another example, the drying and coating steps may be carried out simultaneously and/or separately.

According to another example, the process further comprises a step of crosslinking the ionic plastic crystal composition or the ionic plastic crystal as defined above. For example, the cation comprises at least one functional group allowing the crosslinking of said ionic plastic crystal. According to another example, the crosslinking step may be carried out by UV irradiation, by heat treatment, by microwave irradiation, under an electron beam, by gamma irradiation, or by X-ray irradiation. According to a variant of interest, the crosslinking step is carried out by UV irradiation. According to another variant of interest, the crosslinking step is carried out by heat treatment. According to another variant of interest, the crosslinking step is carried out under an electron beam. According to another example, the crosslinking step may be carried out in the presence of a crosslinking agent, a thermal initiator, a photoinitiator, a catalyst, a plasticizing agent, or a combination of at least two thereof. For example, the photoinitiator is 2,2-dimethoxy-2-phenylacetophenone (Irgacure™ 651). For example, the ionic plastic crystal composition or the ionic plastic crystal may solidify after crosslinking.

The present technology also relates to a process for the preparation of a multicationic ionic plastic crystal or a multicationic ionic plastic crystal composition as defined in the present application, the process comprising the following steps:
(i) reacting an organic superbase as described above with an organic bridging compound to form a multicationic complex comprising at least two organic superbase-based cationic moieties separated (or linked) by an organic bridging group as described above and paired with a counterion; and
(ii) reacting said multicationic complex with at least one ionic salt based on a delocalized anion as herein defined.

According to an example, the organic superbase is a neutral amidine, guanidine or phosphazene type organic superbase. According to a variant of interest, the organic superbase is selected from the group consisting of DBU, DBN, MTBD, BEMP, BTPP and $P_1$-t-Bu or a derivative thereof. For example, the organic superbase may be DBU or BEMP.

According to another example, the organic bridging compound includes the organic bridging group as described above and at least two anionic leaving groups. The anionic leaving groups of the organic bridging compound may be selected for their leaving group abilities. Any compatible anionic leaving group is contemplated. Non-limiting examples of anionic leaving groups include halides such as $F^-$, $Cl^-$, $Br^-$ and $I^-$. According to a variant of interest, the anionic leaving groups are $Br^-$.

According to another example, the organic bridging group is an optionally substituted organic bridging group and is selected from the group consisting of a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy) $C_1$-$C_{10}$alkylene, a linear or branched polyether, a linear or branched polyester, a $C_6$-$C_{12}$arylene, a $C_5$-$C_{12}$heteroarylene, a $C_3$-$C_{12}$cycloalkylene, and a $C_3$-$C_{12}$heterocycloalkylene. According to a variant of interest, the organic bridging group is a $C_6$-$C_{12}$arylene. In some examples, the organic bridging group is 1,2,4,5-tetrakis(bromomethyl)benzene.

According to another example, the two reaction steps may be carried out sequentially, simultaneously, or partially overlapping in time with each other. According to a variant of interest, the two reaction steps are carried out sequentially, and the step of reacting the organic superbase with the organic bridging compound is carried out before the step of reacting the multicationic complex with the ionic salt. According to another variant of interest, all reactants may be mixed together and left to react under appropriate reaction conditions.

According to another example, the step of reacting the organic superbase with the organic bridging compound may be carried out in the presence of a solvent. For example, the solvent may be a polar solvent selected from the group consisting of DCM, DMC, ACN, EtOH, and a miscible combination of at least two thereof. According to a variant of interest, the solvent may be DCM.

According to another example, the step of reacting the organic superbase with the organic bridging compound may be carried out in the presence of a base such as triethylamine ($Et_3N$), N,N-diisopropylethylamine (iPr$_2$NEt), pyridine, and pyridine derivatives. According to a variant of interest, the base is $Et_3N$.

According to an example of interest, the synthesis of the multicationic ionic plastic crystal may be carried out by a process as illustrated in Scheme 6 (wherein the by-products of the reaction are not shown):

Scheme 6

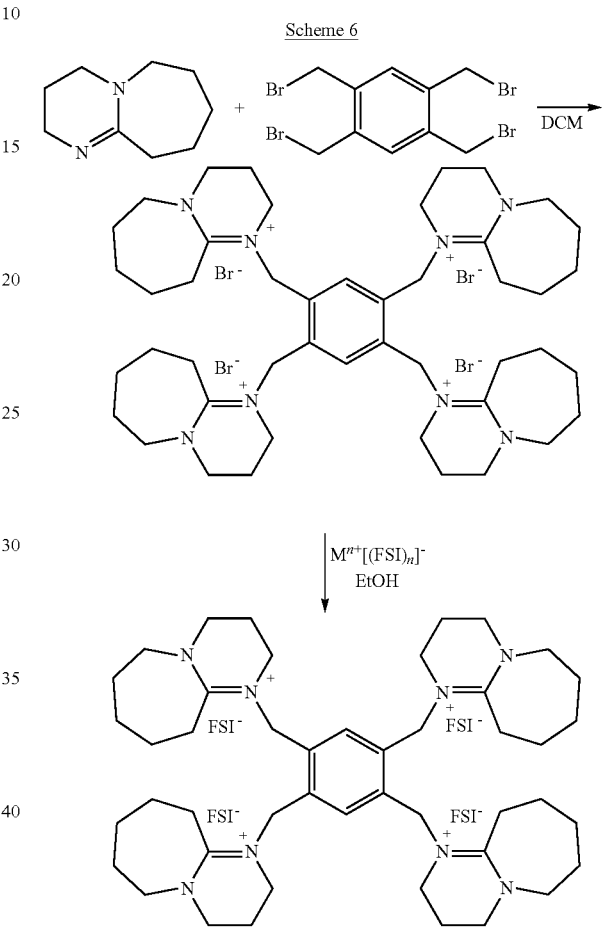

wherein,
$M^{n+}$ is an alkali or alkaline earth metal ion selected from the group consisting of $Na^+$, $K^+$, $Li^+$, $Ca^{2+}$ and $Mg^{2+}$ ions.

According to another example, the step of reacting the organic superbase with the organic bridging compound may further comprise recovering the multicationic complex. For example, the step of recovering the multicationic complex may be carried out by centrifugation. The centrifugation may be carried out at a number of revolutions per minute and for a period of time sufficient to recover the multicationic complex. For example, centrifugation may be carried out at about 5000 rpm for about 10 minutes.

According to another example, the two reaction steps may be carried out at a sufficiently high temperature and for a sufficient period of time to allow a substantially complete reaction. For example, the step of reacting the organic superbase with the organic bridging compound may be carried out at room temperature and for about 4 days. For example, the step of reacting the multicationic complex with the ionic salt may be carried out at room temperature and for about 3 days.

According to another example, the process further comprises recovering the multicationic ionic plastic crystal, for example, by centrifugation. The centrifugation may be carried out at a number of revolutions per minute and for a period of time sufficient to recover the multicationic ionic plastic crystal.

According to another example, the process further comprises drying the multicationic ionic plastic crystal. The drying step may be carried out at a sufficiently high temperature and for a sufficient period of time to substantially dry the multicationic ionic plastic crystal. For example, the drying step may be carried out under vacuum at a temperature of about 45° C. for about 48 hours.

According to another example, the process further comprises removing at least one by-product generated during any process step. For example, the removal step may be carried out by distillation or evaporation. For example, the by-product may be removed at ambient atmospheric pressure or under vacuum, depending on the boiling point of the by-product to be removed. The by-product may be removed by washing with any suitable solvent that dissolves the by-product but not the multicationic ionic plastic crystal. For example, the by-product may also be removed by more than one method, if necessary. According to a variant of interest, the by-product may be removed by extraction, for example, by dissolving the product in DCM.

The present technology also relates to the use of an ionic plastic crystal composition or an ionic plastic crystal as defined above in electrochemical applications.

According to an example, the ionic plastic crystal composition or ionic plastic crystal may be used in electrochemical cells, batteries, supercapacitors (e.g., carbon-carbon supercapacitors, hybrid supercapacitors, etc.). According to another example, the ionic plastic crystal composition or the ionic plastic crystal may be used in electrochromic materials, electrochromic cells, electrochromic devices (ECDs), and electrochromic sensors such as those described in U.S. Pat. Nos. 5,356,553, 8,482,839, and 9,249,353.

According to another example, the ionic plastic crystal composition as herein defined may be an ionic plastic crystal-based solid electrolyte composition. According to another example, the ionic plastic crystal composition as herein defined may be used as a component of an electrode material, for example, as a binder in an electrode material.

The present technology thus also relates to an ionic plastic crystal-based solid electrolyte comprising an ionic plastic crystal as defined above or an ionic plastic crystal composition as defined above (i.e., comprising an ionic plastic crystal as defined above), wherein the ionic plastic crystal may optionally be crosslinked if cross-linkable functional groups are present therein.

According to one example, the ionic plastic crystal solid electrolyte composition or the ionic plastic crystal solid electrolyte as defined above may further comprise at least one salt. For example, the salt may be dissolved in the ionic plastic crystal solid electrolyte composition or in the ionic plastic crystal solid electrolyte.

According to another example, the salt may be an ionic salt such as a lithium, sodium, potassium, calcium or magnesium salt. According to a variant of interest, the ionic salt is a lithium salt. Non-limiting examples of lithium salts include lithium hexafluorophosphate (LiPF$_6$), lithium bis(trifluoromethanesulfonyl)imide (LiTFSI), lithium bis(fluorosulfonyl)imide (LiFSI), lithium (flurosulfonyl)(trifluoromethanesulfonyl)imide) (Li(FSI)(TFSI)), lithium 2-trifluoromethyl-4,5-dicyanoimidazolate (LiTDI), lithium 4,5-dicyano-1,2,3-triazolate (LiDCTA), lithium bis(pentafluoroethylsulfonyl)imide (LiBETI), lithium difluorophosphate (LiDFP), lithium tetrafluoroborate (LiBF$_4$), lithium bis(oxalato)borate (LiBOB), lithium nitrate (LiNO$_3$), lithium chloride (LiCl), lithium bromide (LiBr), lithium fluoride (LiF), lithium perchlorate (LiClO$_4$), lithium hexafluoroarsenate (LiAsF$_6$), lithium trifluoromethanesulfonate (LiSO$_3$CF$_3$) (LiOTf), lithium fluoroalkylphosphate Li[PF$_3$(CF$_2$CF$_3$)$_3$] (LiFAP), lithium tetrakis(trifluoroacetoxy)borate Li[B(OCOCF$_3$)$_4$](LiTFAB), lithium bis(1,2-benzenediolato(2-)—O,O')borate [B(C$_6$O$_2$)$_2$] (LiBBB), lithium difluoro(oxalato)borate (LiBF$_2$(C$_2$O$_4$)) (LiFOB), a salt of formula LiBF$_2$O$_4$R$^x$ (where R$^x$=C$_{2\text{-}4}$alkyl), and a combination of at least two thereof. According to a variant of interest, the lithium salt may be LiPF$_6$. According to another variant of interest, the lithium salt may be LiFSI. According to another variant of interest, the lithium salt may be LiTFSI. Non-limiting examples of sodium salts include the salts described above where the lithium ion is replaced by a sodium ion. Non-limiting examples of potassium salts include the salts described above where the lithium ion is replaced by a potassium ion. Non-limiting examples of calcium salts include the salts described above where the lithium ion is replaced by a calcium ion and where the number of anions present in the salt is adjusted to the charge of the calcium ion. Non-limiting examples of magnesium salts include the salts described above where the lithium ion is replaced by a magnesium ion and where the number of anions present in the salt is adjusted to the charge of the magnesium ion.

According to another example, the ionic plastic crystal-based solid electrolyte composition or the ionic plastic crystal-based solid electrolyte as defined above may further comprise additional components such as ionically conductive materials, inorganic particles, glass particles, ceramic particles (e.g., nanoceramics), plasticizing agents, and other similar components or a combination of at least two thereof. For example, the additional component may be selected for its mechanical, physical and/or chemical properties. For example, the additional component may be selected for its high ionic conductivity and may, in particular, be added to improve the conduction of lithium ions. According to a variant of interest, the additional component may be selected from NASICON, LISICON, thio-LiSICON type compounds, garnets, in crystalline and/or amorphous form, and a combination of at least two thereof.

According to another example, the ionic plastic crystal-based solid electrolyte may be in the form of a thin film. For example, the film may include at least one electrolytic layer including the ionic plastic crystal-based solid electrolyte. For example, the additional components may be included and/or substantially dispersed in the electrolytic layer or separately in an ion-conducting layer, for example, deposited on the electrolytic layer.

The present technology also relates to a binder composition comprising an ionic plastic crystal as herein defined or an ionic plastic crystal composition as herein defined together with a binder.

According to another example, the binder may be a polymeric binder and may, for example, be selected for its ability to be solubilized in a solvent that may also solubilize the plastic crystal as herein defined and to be mixed effectively therewith. For example, the solvent may be an organic solvent (e.g., N-methyl-2-pyrrolidone (NMP)). The solvent may also comprise, for example, a polar protic solvent (e.g., isopropanol) to solubilize the polymer.

Non-limiting examples of polymeric binders include fluorine-containing polymers (e.g., polytetrafluoroethylene (PTFE), polyvinylidene fluoride (PVDF), and polyvinylidene fluoride-co-hexafluoropropylene (PVDF-HFP)), synthetic or natural rubbers (e.g., ethylene propylene diene monomer rubbers (EPDM)), and ionically conductive polymer binders such as a copolymer composed of at least one lithium ion-solvating segment, such as a polyether, and optionally at least one cross-linkable segment (e.g., PEO-based polymers comprising methyl methacrylate repeating units). According to a variant of interest, the polymer binder is a fluorine-containing polymer binder. For example, the fluorine-containing polymer binder is PTFE. Alternatively, the fluorine-containing polymer binder is PVDF or PVDF-HFP, preferably PVDF. According to another variant of interest, the polymer binder is a fluorine-free polymer binder. For example, the polymer binder is EPDM.

According to another example, the binder may be a polymer binder and may, for example, be a polymer as described above in relation to solid polymer electrolytes (SPE).

The present technology also relates to the use of a binder composition as herein defined, in an electrode material.

The present technology also relates to an electrode material comprising at least one electrochemically active material and an ionic plastic crystal or an ionic plastic crystal composition as herein defined. According to an example, the ionic plastic crystal or the ionic plastic crystal composition is a binder in an electrode material. In one example, the electrode material is a positive electrode material. In another example, the electrode material is a negative electrode material.

According to an example, the electrochemically active material may be in the form of particles. Non-limiting examples of electrochemically active materials include metal oxides, lithium metal oxides, metal phosphates, lithium metal phosphates, titanates, lithium titanates, metal fluorophosphates, lithium metal fluorophosphates, metal oxyfluorophosphates, lithium metal oxyfluorophosphates, metal sulfates, lithium metal sulfates, metal halides (such as metal fluorides), lithium metal halides (such as lithium metal fluorides), sulfur, selenium, and a combination of at least two thereof. According to a variant of interest, the electrochemically active material is selected from the group consisting of metal oxides, lithium metal oxides, metal phosphates, lithium metal phosphates, titanates, lithium titanates, lithium metal fluorides, lithium metal fluorophosphates, lithium metal oxyfluorophosphates, metal sulfates, metal halides, sulfur, selenium, and a combination of at least two thereof.

For example, the metal of the electrochemically active material may be selected from the group consisting of titanium (Ti), iron (Fe), magnesium (Mg), manganese (Mn), vanadium (V), nickel (Ni), cobalt (Co), aluminum (Al), chromium (Cr), copper (Cu), antimony (Sb), zirconium (Zr), zinc (Zn), niobium (Nb), and a combination of at least two thereof, when compatible. According to an example of interest, the metal of the electrochemically active material may be selected from the group consisting of titanium (Ti), iron (Fe), magnesium (Mg), manganese (Mn), vanadium (V), nickel (Ni), cobalt (Co), aluminum (Al), zirconium (Zr), zinc (Zn), niobium (Nb), and a combination of at least two thereof, when compatible. According to another example of interest, the metal of the electrochemically active material may be selected from the group consisting of titanium (Ti), iron (Fe), magnesium (Mg), manganese (Mn), vanadium (V), nickel (Ni), cobalt (Co), aluminum (Al), and a combination of at least two thereof, when compatible.

Non-limiting examples of electrochemically active materials also include titanates and lithium titanates (e.g., $TiO_2$, $Li_2TiO_3$, $Li_4Ti_5O_{12}$, $H_2Ti_5O_{11}$, $H_2Ti_4O_9$, or a combination thereof), metal phosphates and lithium metal phosphates (e.g., $LiM'PO_4$ and $M'PO_4$, where M' may be Fe, Ni, Mn, Mg, Co, or a combination of at least two thereof), vanadium oxides and vanadium metal oxides (e.g., $LiV_3O_8$, $V_2O_5$, $LiV_2O_5$, and other similar oxides), and other lithium metal oxides of formulae $LiMn_2O_4$, $LiM''O_2$ (where M'' is selected from Mn, Co, Ni, and a combination thereof), or $Li(NiM''')O_2$ (where M''' is selected from Mn, Co, Al, Fe, Cr, Ti, Zr, another similar metal, and a combination thereof), and a combination of at least two thereof, when compatible.

According to another example, the electrochemically active material may optionally be doped with other elements included in smaller amounts, for example to modulate or optimize its electrochemical properties. For example, the electrochemically active material may be doped by the partial substitution of the metal with other ions. For example, the electrochemically active material may be doped with a transition metal (e.g., Ti, V, Cr, Mn, Fe, Co, Ni, Cu, Zn, or Y) and/or an element other than a transition metal (e.g., Mg, Al, or Sb).

According to another example, the electrochemically active material may be in the form of particles (e.g., microparticles and/or nanoparticles) which may be freshly formed or commercially sourced. For example, the electrochemically active material may be in the form of particles coated with a layer of coating material. The coating material may be an electronically conductive material, for example, a conductive carbon coating.

According to another example, the electrode material is a negative electrode material comprising, for example, a carbon-coated lithium titanate (C-LTO) as electrochemically active material.

According to another example, the electrode material as herein defined further includes an additive. For example, the additive may be selected from inorganic ionic conducting materials, inorganic materials, glasses, glass-ceramics, ceramics, including nanoceramics (such as $Al_2O_3$, $TiO_2$, $SiO_2$ and other similar compounds), salts (e.g., lithium salts) and other similar additives or a combination of at least two thereof. For example, the additive may be an inorganic ionic conductor selected from NASICON, LISICON, thio-LISICON type compounds, garnets, sulfides, sulfur halides, phosphates, thio-phosphates, in crystalline and/or amorphous form, and a combination of at least two thereof.

According to another example, the electrode material as herein defined further includes an electronically conductive material. Non-limiting examples of electronically conductive material include a carbon source such as carbon black (e.g., Ketjen™ carbon and Super P™ carbon), acetylene black (e.g., Shawinigan carbon and Denka™ carbon black), graphite, graphene, carbon fibers (e.g., vapor grown carbon fibers (VGCFs)), carbon nanofibers, carbon nanotubes (CNTs), and a combination of at least two thereof.

According to another example, the electrode material as herein defined may have an electrochemically active material:ionic plastic crystal ratio of less than about 6, or less than about 5, or less than about 4, or less than about 3, and preferably less than about 4.

According to another example, the electrode material as herein defined may have a porosity of less than about 8%, or less than about 7%, or less than about 6%, or less than about 5%, or less than about 4%, or less than about 3%, or less than about 2%, or less than about 1%, and preferably less than about 5%. For example, since the pores of plastic crystal-based electrodes may possibly act as a resistance to lithium ion transport, electrode performances could be limited by excessive porosity.

According to another example, the ratio of electrochemically active material to ionic plastic crystal may substantially affect the porosity of the electrode material. In some examples, an electrochemically active material:ionic plastic crystal ratio of less than about 4 was used to obtain an electrode having a porosity of less than about 5% in order to obtain substantially high electrochemical performances.

The present technology also relates to an electrode comprising the electrode material as herein defined and applied on a current collector (e.g., an aluminum or a copper foil). Alternatively, the electrode may be a self-supported electrode. According to a variant of interest, the electrode as herein defined is a positive electrode. According to another variant of interest, the electrode as herein defined is a negative electrode.

The present technology thus also relates to a process for the production of an electrode material as herein defined and an electrode as herein defined. For a more detailed understanding of the description, reference is now made to FIG. 1, which shows a flow diagram of the process for producing an electrode material as herein defined, in accordance with a possible embodiment.

As illustrated in FIG. 1, the process may include a step of preparing a carbon binder slurry (CBS). The CBS preparation step includes dispersing an electronically conductive material as described above in a binder composition. For example, the binder composition may comprise a binder (e.g., a binder as described above), a solvent as described above and/or a carbon dispersing agent. By way of example, the electronically conductive material may be a combination of carbon black and VGCFs and the binder composition may include a combination of PVDF and polyvinylpyrrolidone (PVP) as binder and NMP as solvent. It should be noted that PVP may also be used as a carbon dispersing agent. The step of dispersing the electronically conductive material in the binder composition may be carried out by any compatible method. For example, the step of dispersing the electronically conductive material in the binder composition may be carried out by a milling process such as a ball milling process. The step of dispersing the electronically conductive material in the binder composition may be carried out for a sufficient period of time to obtain a substantially homogeneous CBS.

According to an example, the step of preparing the CBS may also include a step of preparing the binder composition, for example, by mixing the binder, solvent and/or carbon dispersing agent. The step of preparing the binder composition may be carried out by any compatible method. For example, the step of preparing the binder composition may be carried out by a milling process such as a roll milling process. The step of preparing the binder composition may be carried out for a period of time sufficient to substantially dissolve the binder and/or carbon dispersing agent in the solvent. For example, the step of preparing the binder composition may be carried out for more than 10 hours.

Still referring to FIG. 1, the process may further include a step of preparing an ionic plastic crystal (PCr)-based catholyte solution. For example, the PCr catholyte solution may be a dilute PCr catholyte solution. Illustratively, the step of preparing the diluted PCr catholyte solution may include diluting a PCr as herein described and an ionic salt as described above (e.g., a lithium salt such as LiFSI) by adding an additional solvent to the solution. By way of example, the additional solvent may be NMP.

Still referring to FIG. 1, the process may further include preparing a PCr—CBS slurry. For example, the step of preparing the PCr—CBS slurry may be performed by adding the diluted PCr catholyte solution to the CBS. For example, the diluted PCr catholyte solution may be added to the CBS gradually to prevent the polarity of the slurry from increasing too abruptly.

Still referring to FIG. 1, the process may further include the addition of an electrochemically active material as described above to the PCr—CBS slurry. For example, the electrochemically active material may be lithium nickel manganese cobalt oxide (NMC).

Figure 2:
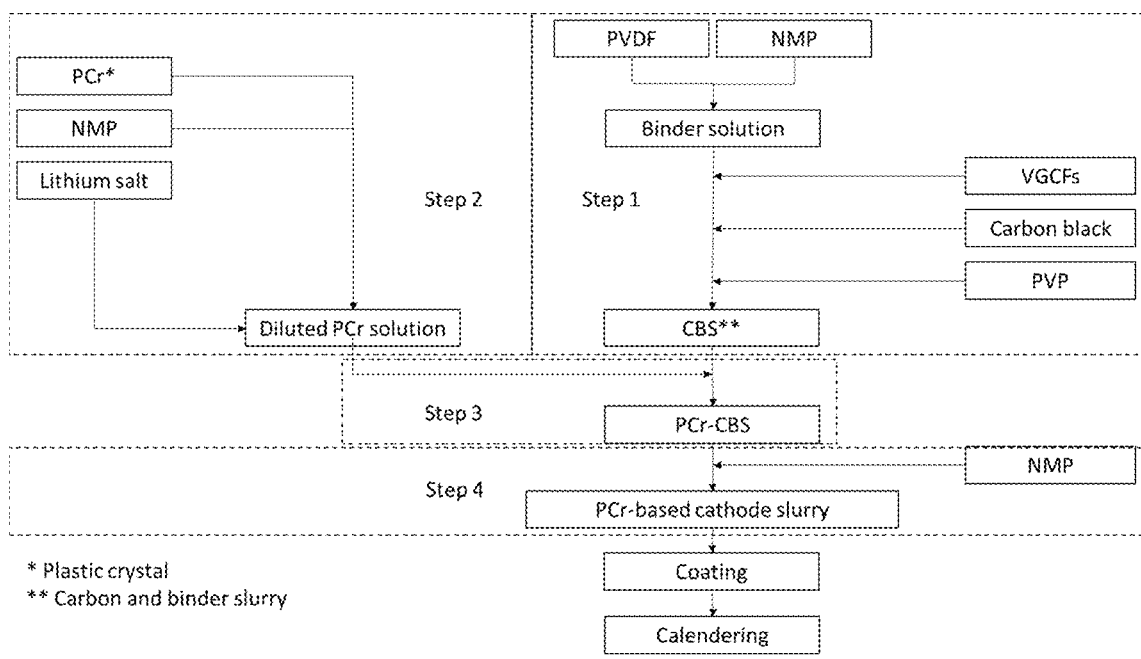
FIG. 2 is a flow diagram of a process for producing an electrode material according to one embodiment.

FIG. 2 shows a flow diagram of the process for producing an electrode as herein defined, according to a possible embodiment.

As illustrated in FIG. 2, the process may further include a step of coating the PCr—CBS slurry as described above on a current collector or on a substrate or support film (e.g., a substrate made of silicone, polypropylene, or siliconized polypropylene) to obtain a PCr-based positive electrode film on a current collector or support. For example, said substrate or support film may be subsequently removed. According to a variant of interest, the PCr—CBS slurry is coated on a current collector. For example, said coating step may be carried out by any compatible coating method. For example, said coating step may be carried out by at least one of a doctor blade coating method, a comma coating method, a reverse-comma coating method, a printing method such as gravure coating, or a slot-die coating method. According to a variant of interest, said coating step is carried out by a doctor blade coating method.

According to another example, the process may further include a step of drying the PCr-based positive electrode film. For example, the drying step may be carried out at a temperature and for a period of time sufficient to substantially remove any residual solvent. For example, the drying step may be carried out in a vacuum oven at a temperature of about 120° C. for more than 10 hours to substantially remove any residual solvent.

Still referring to FIG. 2, the process may further include a step of calendering or pressing the positive electrode film to substantially reduce its thickness. For example, the calendering or pressing step may be carried out by any compatible calendering or pressing method. For example, the calendering or pressing step may be carried out by a roll (or between rolls) pressing process.

According to another example, the electrode material obtained by the process as herein defined may be substantially or totally exempt of carbon agglomerates compared to electrode materials obtained by conventional mixing methods. Indeed, electrode materials obtained by conventional mixing methods generally include carbon agglomerates. This may be attributed to the fact that carbon readily agglomerates in a highly polar solvent due to its hydrophobic surface properties.

The present technology also relates to an electrochemical cell including a negative electrode, a positive electrode, and an electrolyte, wherein at least one of the negative electrode, the positive electrode, and the electrolyte comprises the ionic plastic crystal as herein defined or the ionic plastic crystal composition as herein defined.

The present technology also relates to an electrochemical cell including a negative electrode, a positive electrode, and an electrolyte, wherein at least one of the negative electrode, the positive electrode, and the electrolyte is as herein defined. According to a variant of interest, the electrolyte is an ionic plastic crystal solid electrolyte as herein defined.

According to another variant of interest, the negative electrode is as herein defined. According to another variant of interest, the positive electrode is as herein defined. According to another variant of interest, the electrolyte is an ionic plastic crystal-based solid electrolyte as herein defined and the positive electrode is as herein defined. In some cases, the negative electrode (counter electrode) includes an electrochemically active material which may be any known electrochemically active material, and which may be selected for its electrochemical compatibility with the various elements of the electrochemical cell as herein defined. For example, the electrochemically active material of the negative electrode is selected for its electrochemical compatibility with the material of the positive electrode as herein defined. Non-limiting examples of electrochemically active negative electrode materials include alkali metals, alkali metal alloys, graphite, silicon (Si), tin (Sn), and prelithiated electrochemically active materials. In some examples, the electrochemically active material of the negative electrode includes a lithium titanate, a carbon-coated lithium titanate, an alkali metal, or an alkali metal alloy. In one variant of interest, the electrochemically active material of the negative electrode is metallic lithium.

The present technology also relates to a battery comprising at least one electrochemical cell as herein defined. For example, said battery may be selected from a lithium battery, a lithium-ion battery, a lithium-sulfur battery, a sodium battery, a sodium-ion battery, a magnesium battery, and a magnesium-ion battery. According to a variant of interest, said battery is a lithium battery or a lithium-ion battery. For example, the battery may be an all-solid-state battery (e.g., an all-solid-state lithium battery).

EXAMPLES

The following examples are for illustrative purposes only and should not be construed as further limiting the scope of the invention as contemplated. These examples will be better understood by referring to the accompanying Figures.

Unless otherwise indicated, all numbers expressing quantities of components, preparation conditions, concentrations, properties, etc. used herein are to be understood as modified in all instances by the term "about". At the very least, each numerical parameter should be interpreted in the light of the number of the reported significant digits and by applying common rounding techniques. Therefore, unless otherwise indicated, the numerical parameters set forth in the present document are approximations which may vary depending on the desired properties. Notwithstanding the fact that the ranges of numerical values and the parameters defining the scope of the embodiments are approximations, the numerical values presented in the following examples are reported as accurately as possible. However, any numerical value inherently contains certain errors resulting from variations in experiments, test measurements, statistical analyses, etc.

Example 1—Synthesis and Characterization of Monocationic Ionic Plastic Crystals Two processes of producing substantially pure protic ionic plastic crystals (about 99% pure) were developed. The protic ionic plastic crystals have a glass transition temperature ($T_g$) of between about −70° C. and about −60° C. and a melting point of between about 10° C. and about 45° C. it is to be noted that the melting point decreases with the insertion of methacrylate functional groups. The reaction yields increase in the presence of formic acid, silylated derivatives of diethylene glycol (SiDEG) and/or silylated derivatives of glycerol (SiGLY).

(a) Synthesis of Silylated Derivatives of Diethylene Glycol and Glycerol

The synthesis of silylated derivatives of diethylene glycol (SiDEG) and glycerol (SiGLY) was carried out by silylation of diethylene glycol or glycerol with tert-butyldimethylsilyl chloride (TBDMS-Cl) in DCM as a solvent and imidazole as a base and catalyst.

The silylation reaction was carried out in a glovebox by adding all the reagents to a previously cleaned and dried round-bottomed flask fitted with a magnetic stirrer. The round-bottomed flask was dried at a temperature of 120° C. for at least 3 hours to remove any residual water prior to the addition of the reagents.

All reagents were also previously dried and then weighed. The diethylene glycol and glycerol were dried by azeotropic distillation with toluene and added at the end, i.e., after all the other reagents.

The round-bottomed flask was then fitted with a stopper and stirred at 1,000 rpm for at least 15 to 24 hours at room temperature. The mixture thus obtained was then filtered and the filtrate was dissolved in an additional 50 ml of DCM and washed three times with a 10% (v/v) aqueous solution of hydrochloric acid, three times with a saturated aqueous solution of sodium carbonate ($Na_2CO_3$), three times with water, and finally three times with brine. The organic phase was dried over magnesium sulfate ($MgSO_4$) used as a drying agent for a period of 12 hours with stirring. The solution thus obtained was then filtered. The filtrate was evaporated to dryness and dried under vacuum for 12 hours. In cases where an impure solution was obtained, the solution was distilled under vacuum at a temperature of 130° C. for 30 minutes, and the volatile contaminants were removed.

The quantity, number of moles and equivalents of the reagents used for the small-scale silylation of diethylene glycol and glycerol are presented in Tables 1 and 2, respectively.

TABLE 1

Reagents used in the silylation of diethylene glycol

| Reagents | Quantity (g) | n (mmol) | Equivalent |
|---|---|---|---|
| Imidazole | 10.5 | 154 | 2.7 |
| Diethylene glycol | 6.0 | 56.6 | 1.0 |
| DCM, anhydrous | 120 | — | — |
| TBDMS-Cl | 20.5 | 135.84 | 2.4 |

TABLE 2

Reagents used in the silylation of glycerol

| Reagents | Quantity (g) | n (mmol) | Equivalent |
|---|---|---|---|
| Imidazole | 15.4 | 226.4 | 4.0 |
| glycerol | 5.2 | 56.6 | 1.0 |
| THF, anhydrous | 120 | — | — |
| TBDMS-Cl | 28.2 | 186.8 | 3.3 |

The silylated derivatives of diethylene glycol (SiDEG) and glycerol (SiGLY) prepared in the present example were characterized by Fourier-transform infrared spectroscopy (FTIR) and proton nuclear magnetic resonance ($^1H$ NMR).

(b) Preparation of Ionic Plastic Crystals

The synthesis was carried out in a glovebox by adding all reagents in a previously cleaned and dried round-bottomed flask fitted with a magnetic stirrer. All reagents were also previously dried under vacuum at a temperature below 60° C. for about 48 hours then weighed. The round-bottomed flask was dried at a temperature 120° C. for at least 3 hours to remove any residual water prior to addition of the reagents.

The round-bottomed flask was fitted with a reflux condenser, heated to a pre-selected temperature, and stirred at 500 rpm for at least 4 days under an inert atmosphere of nitrogen. The mixture thus obtained was subsequently cooled and the pH was measured to ensure that the mixture was under alkaline (basic) conditions. The mixture was then evaporated to dryness under vacuum at a temperature below 50° C. The residue was then dissolved in 45 ml of DCM, washed four times with water and then twice with brine. The solution thus obtained was then filtered and the filtrate evaporated to dryness. The two phases thus formed were separated using a separating funnel. The lower phase (a yellowish phase) was recovered and concentrated. The viscous solid was then distilled under vacuum at a temperature of 160° C. for about 12 hours to remove volatile contaminants. The viscous solid turns into a solid at room temperature.

Ionic plastic crystals (Plastic Crystals ° to 14) were obtained by the process of the present example. The number of equivalents for each reagent and the synthesis conditions are presented in Table 3 and the reaction yield and melting points for each ionic plastic crystal are presented in Table 4.

TABLE 3

Synthesis of Plastic Crystals 1 to 14

| Plastic Crystal | LiFSi (eq) | Organic Superbase (eq) | SiDEG prepared in Example 1(a) (eq) | Formic acid | Solvent (0.7M) | Temperature (°C.) | Duration (Days) |
|---|---|---|---|---|---|---|---|
| 1 | 1.0 | DBU 1.0 | 1.0 | 0.0 | ACN | 21 | 4 |
| 2 | 1.0 | DBU 1.0 | 1.0 | 0.0 | ACN | 21 | 4 |
| 3 | 1.0 | DBU 1.0 | 1.0 | 0.0 | DMC | 65 | 4 |
| 4 | 1.0 | DBU 1.0 | 1.0 | 0.0 | ACN | 65 | 7 |
| 5 | 1.0 | DBU 1.0 | 1.0 | 0.0 | EtOH | 65 | 4 |
| 6 | 1.0 | DBU 0.3 | 1.0 | 0.0 | DMC | 65 | 4 |
| 7 | 1.0 | DBU 0.3 | 1.0 | 0.0 | DCM | 65 | 4 |
| 8 | 1.0 | DBU 1.0 | 0.25 | 0.0 | ACN | 21 | 4 |
| 9 | 1.0 | DBU 0.3 | 1.0 | 0.0 | ACN | 21 | 4 |
| 10 | 1.0 | DBU 0.3 | 1.0 | 0.0 | DMC | 21 | 4 |
| 11 | 1.0 | BEMP 0.3 | 1.0 | 0.0 | ACN | 65 | 4 |
| 12 | 1.0 | DBU 1.0 | 0.0 | 0.0 | ACN | 21 | 4 |
| 13 | 1.0 | DBU 1.0 | 1.0 | 1.0 | ACN | 21 | 4 |
| 14 | 1.5 | DBU 1.0 | 1.0 | 0.0 | ACN | 21 | 4 |

TABLE 4

Reaction yield (%) and the melting point (° C.) obtained for Plastic Crystals 1 to 14

| Plastic Crystal | Yield (%) | Melting point (° C.) |
|---|---|---|
| 1 | 72 | 12 and 41 |
| 2 | 82 | 11 and 38 |
| 3 | 74 | 21 |
| 4 | 56 | 12 and 32 |
| 5 | 66 | 5 and 32 |
| 6 | 48 | 14 and 41 |
| 7 | 45 | N/A |
| 8 | 84 | 13 and 42 |
| 9 | 58 | N/A |
| 10 | 62 | N/A |
| 11 | 56 | 45 |
| 12 | 60 | 14 and 44 |
| 13 | 62 | 12 and 39 |
| 14 | 52 | 12 and 34 |

BEMP was used as a 1M solution of BEMP in hexane. The solvents in Table 3 are anhydrous acetonitrile (ACN), dichloromethane (DCM), dimethyl carbonate (DMC), and ethanol (EtOH).

Ionic plastic crystals (Plastic Crystals 15 and 16) were obtained using the process of the present example, the quantity, number of moles, and number of equivalents of the reagents used in the synthesis are presented in Tables 5 and 6, respectively.

TABLE 5

Reagents used in the synthesis of Plastic Crystal 15

| Reagents | Quantity (g) | n (mmol) | Equivalent |
|---|---|---|---|
| LiFSI | 6.0 | 32.0 | 1.0 |
| SiGLY prepared in Example 1(a) | 0.160 | 0.6 | 0.02 |
| SiDEG prepared in Example 1(a) | 10.50 | 31.4 | 0.98 |
| ACN, anhydrous | 100 | — | — |
| DBU | 1.70 | 11.2 | 0.35 |

TABLE 6

Reagents used in the synthesis of Plastic Crystal 16

| Reagents | Quantity wt. % |
|---|---|
| LiFSI | 32.9 |
| SiGLY prepared in Example 1(a) | 57 |

TABLE 6-continued

Reagents used in the synthesis of Plastic Crystal 16

| Reagents | Quantity wt. % |
|---|---|
| SiDEG prepared in Example 1(a) | 0.87 |
| ACN, anhydrous | — |
| DBU | 9.2 |

Figure 3:
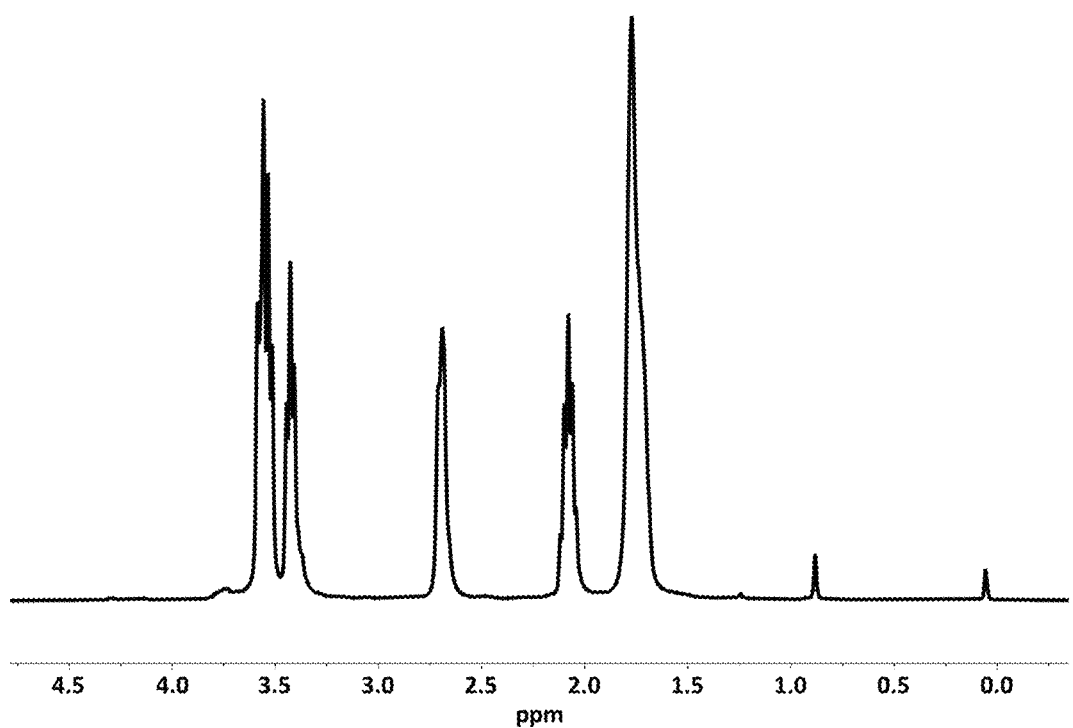
FIG. 3 is a proton nuclear magnetic resonance ($^1H$ NMR) spectrum obtained for 1,8-diazabicyclo[5.4.0]undec-7-ene (DBU), as described in Example 1(b).

FIG. 3 shows a proton NMR spectrum obtained for a commercially sourced DBU in deuterated dimethyl sulfoxide (DMSO-$d^6$). The proton NMR spectrum was obtained for comparison purposes.

Figure 4:
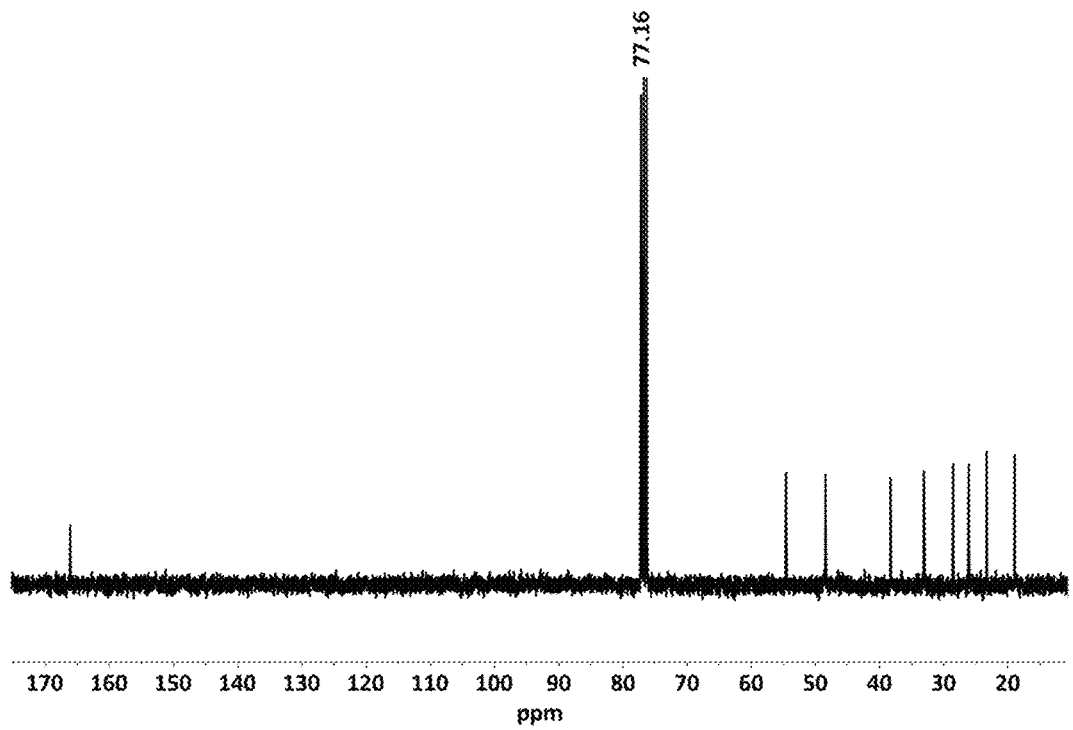
FIG. 4 is a carbon-13 nuclear magnetic resonance ($^{13}C$ NMR) spectrum obtained for Plastic Crystal 1, as described in Example 1(b).
Figure 5:
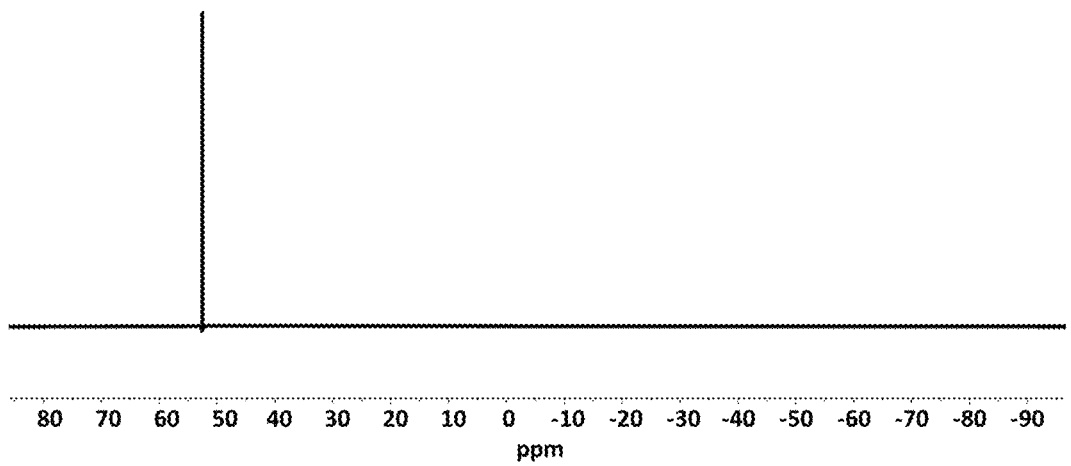
FIG. 5 is a fluorine-19 nuclear magnetic resonance ($^{19}F$ NMR) spectrum obtained for Plastic Crystal 1, as described in Example 1(b).
Figure 6:
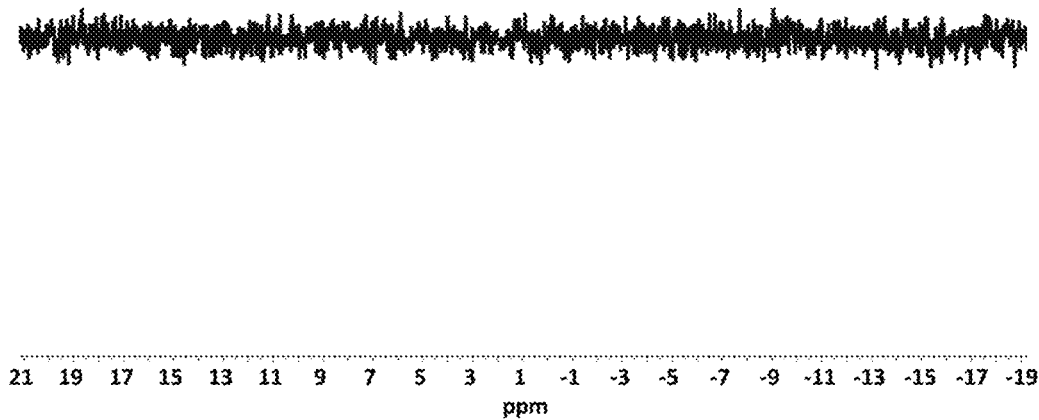
FIG. 6 is a lithium-7 nuclear magnetic resonance ($^7Li$ NMR) spectrum obtained for Plastic Crystal 1, as described in Example 1(b).

FIGS. 4, 5 and 6 respectively show carbon-13, fluorine-19, and lithium-7 nuclear magnetic resonance ($^{13}$C NMR, $^{19}$F NMR and $^7$Li NMR) spectra obtained for Plastic Crystal 1 in deuterated chloroform (CDCl$_3$). As shown in FIG. 6, no $^7$Li NMR peaks could be observed in the region from 21 ppm to −19 ppm.

Figure 7:
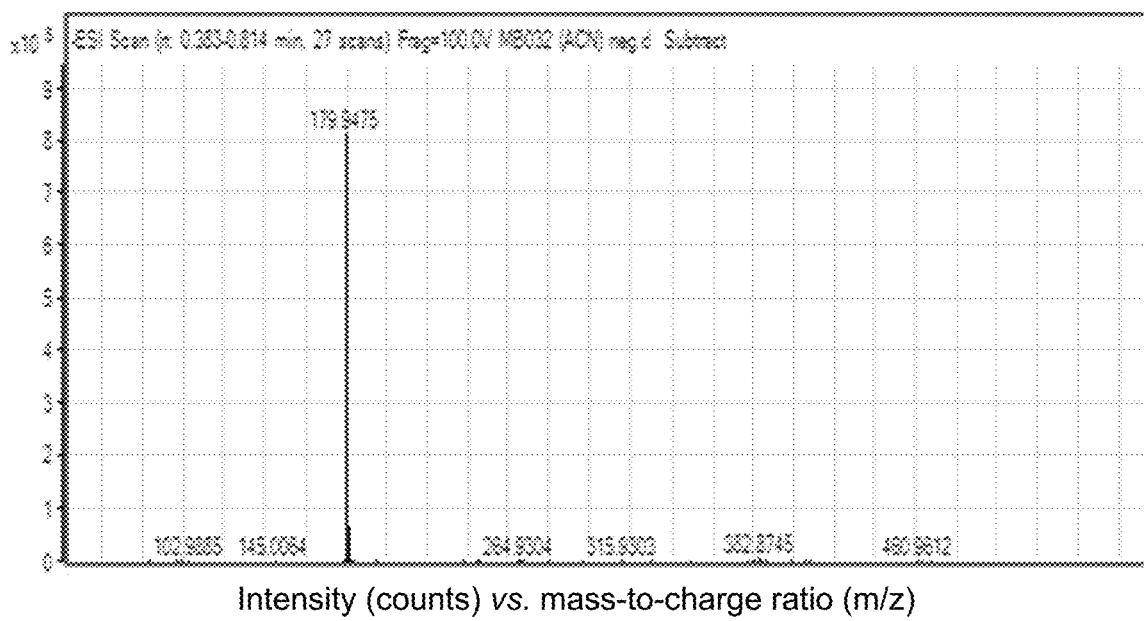
FIG. 7 shows mass spectra obtained by high performance liquid chromatography time of flight mass spectrometry (HPLC TOF-MS) with an electrospray ionization (ESI) source in (A) negative mode (ESI−), and (B) positive mode (ESI+) respectively for Plastic Crystal 1, as described in Example 1(b).
Figure 7:
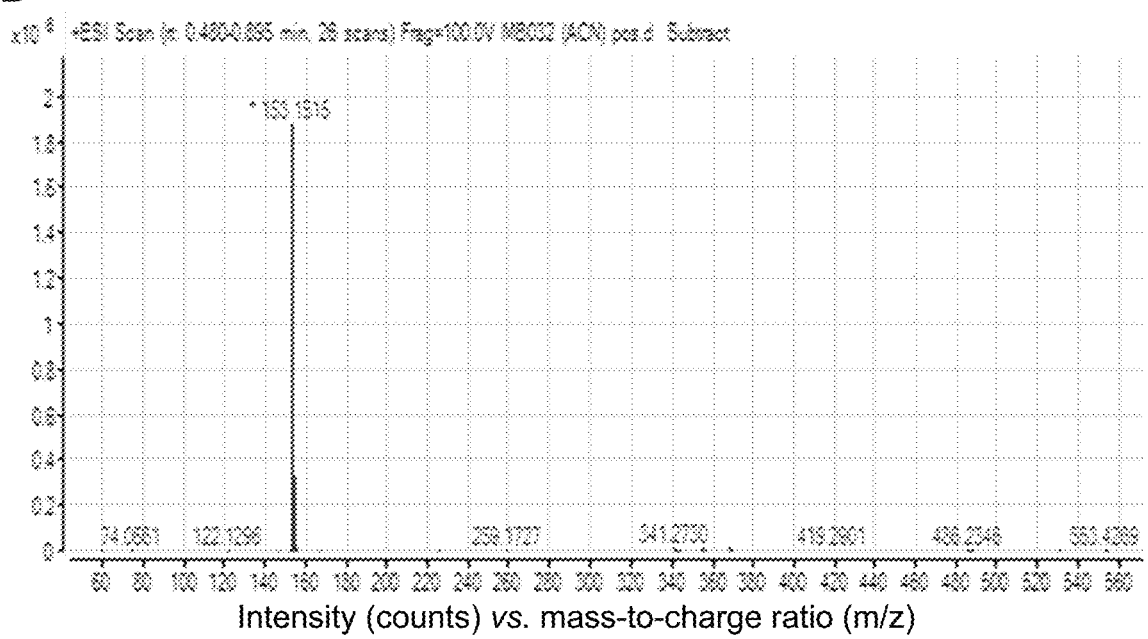

FIG. 7 shows the mass spectra obtained by high-performance liquid chromatography coupled to a time-of-flight mass spectrometer with an electrospray ionization source (HPLC TOF ESI-MS) for Plastic Crystal 1. Results are presented for both negative (ESI−) and positive (ESI+) modes.

Figure 8:
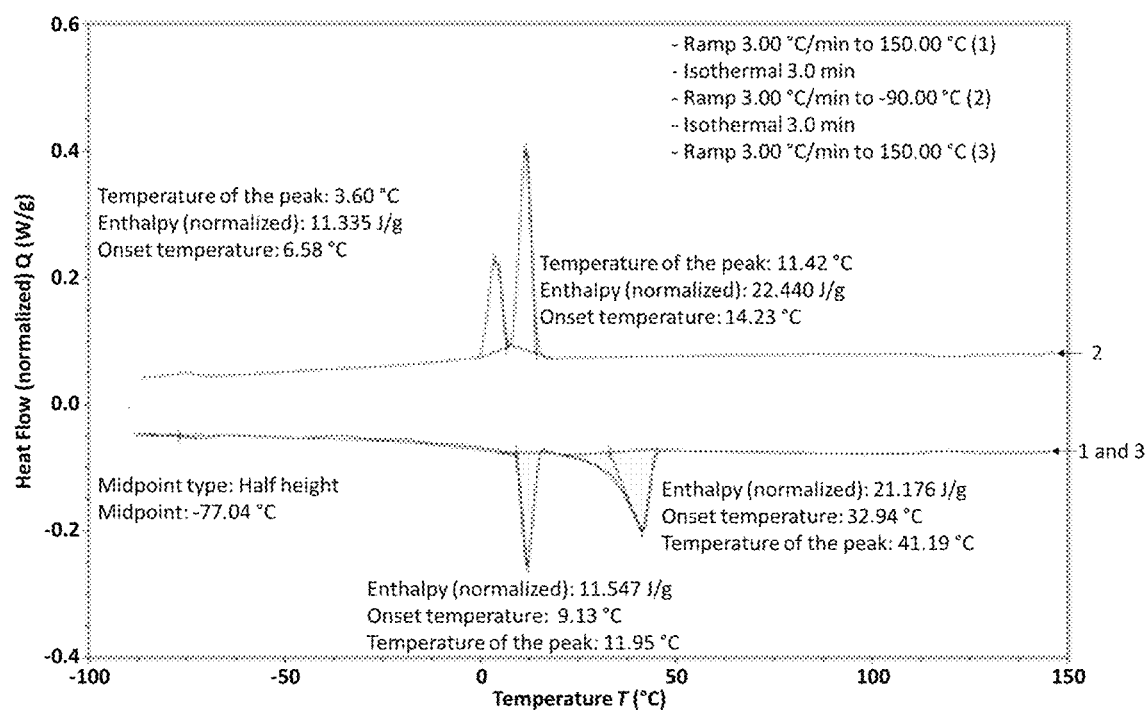
FIG. 8 shows the results of the differential scanning calorimetry analysis obtained for Plastic Crystal 1, as described in Example 1(b).

FIG. 8 shows the results of differential scanning calorimetry (DSC) analysis obtained for Plastic Crystal 1. Isothermal (at 150.00° C. and −90.00° C.) and non-isothermal (3.00° C./min ramp) measurements were carried out. Repeated DSC heating-cooling cycling measurements were carried out following the thermal procedure: 3.00° C./min ramp from −090.00° C. to 150.00° C. (1), isothermal at 150.00° C. for 3 min, 3.00° C./min ramp from 150.00° C. to −90.00° C. (2), isothermal at −90.00° C. for 3 min, and 3.00° C./min ramp from −90.00° C. to 150.00° C. (3).

Figure 9:
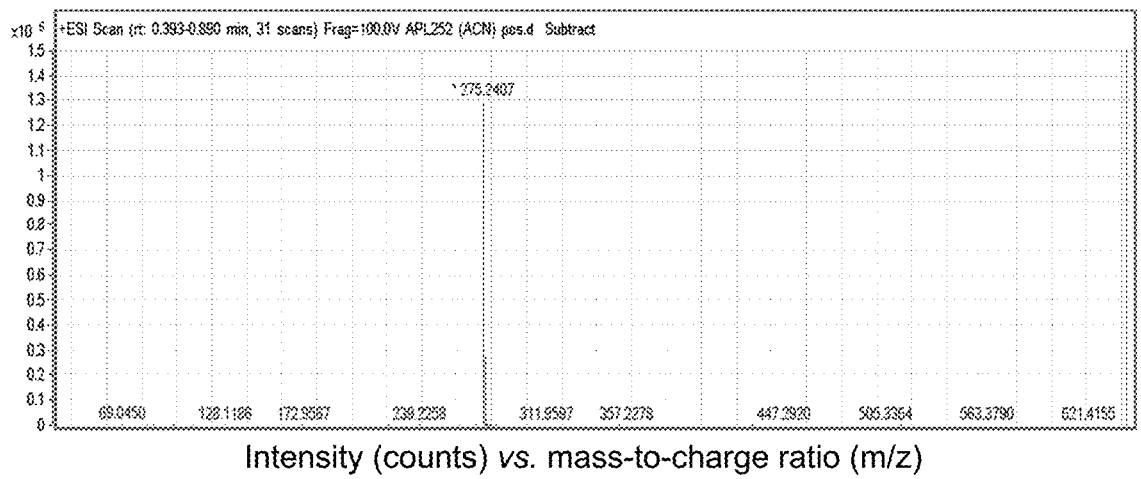
FIG. 9 shows mass spectra obtained by HPLC TOF-MS with an ESI ionization source in (A) positive mode (ESI+), and (B) negative mode (ESI−) respectively for Plastic Crystal 11, as described in Example 1(b).
Figure 9:
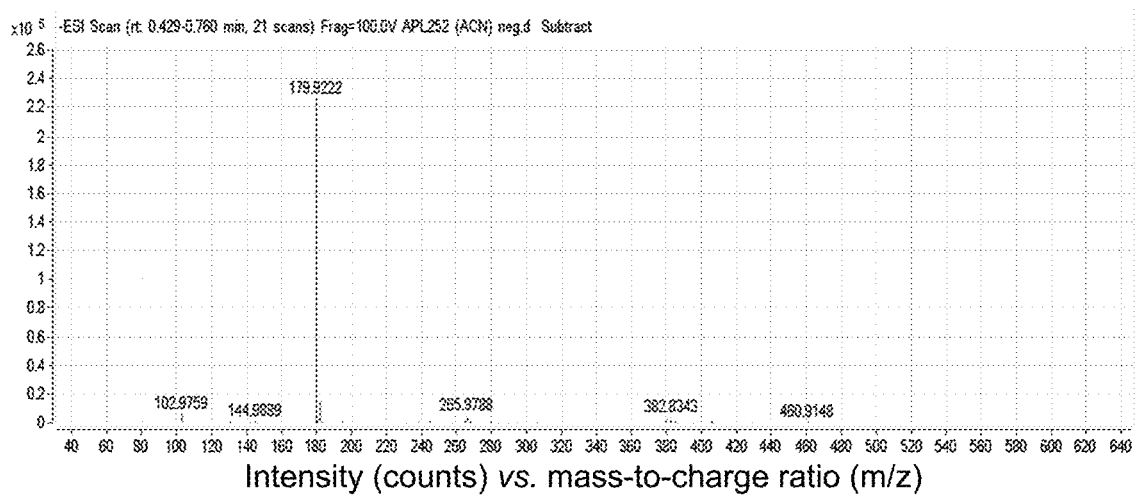

FIG. 9 shows the mass spectra obtained by HPLC TOF ESI-MS for Plastic Cristal 11. Results are shown for ESI− and ESI+.

Figure 10:
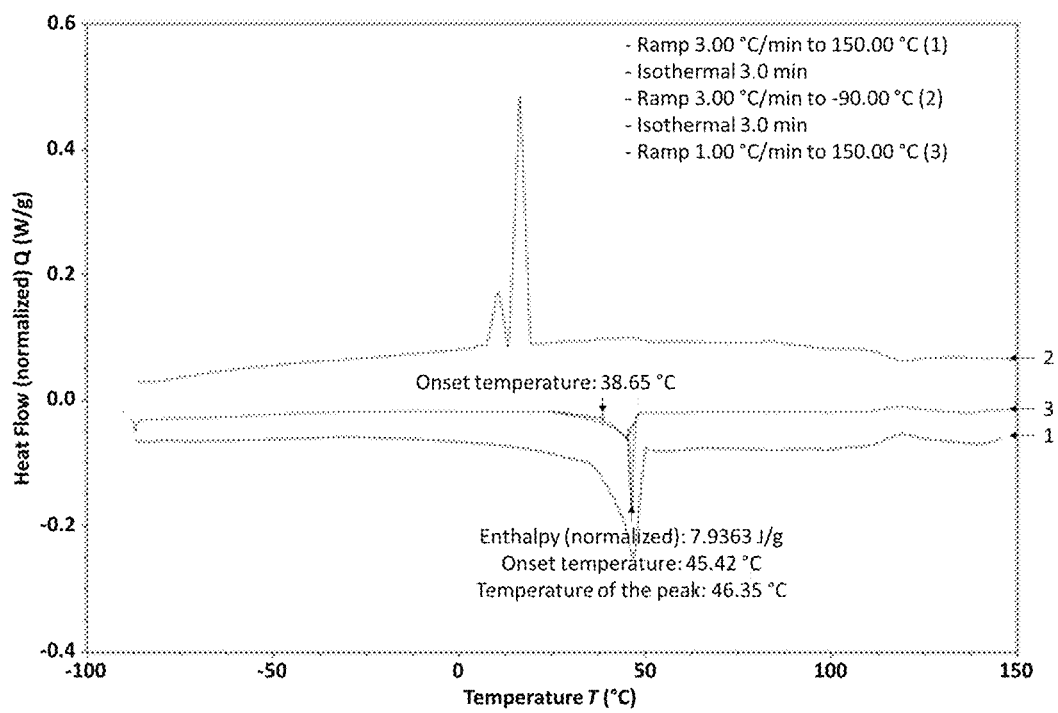
FIG. 10 shows the results of the differential scanning calorimetry analysis obtained for Plastic Crystal 11, as described in Example 1(b).

FIG. 10 shows the DSC results obtained for Plastic Crystal 11. Isothermal (at 150.00° C. and −90.00° C.) and non-isothermal (3.00° C./min ramp) measurements were carried out. Repeated DSC heating-cooling cycling measurements were carried out using the following thermal procedure: 3.00° C./min ramp from −90.00° C. to 150.00° C. (1), isothermal at 150.00° C. for 3 min, 3.00° C./min ramp from 150.00° C. to −90.00° C. (2), isothermal at −90.00° C. for 3 min, and 3.00° C./min ramp from −90.00° C. to 150.00° C. (3).

(c) Preparation of Ionic Plastic Crystals

Ionic plastic crystals were also synthesized by the following method. The synthesis was carried out in a glovebox in a previously cleaned and dried round-bottomed flask fitted with a magnetic stirrer. All reagents were also previously dried under vacuum at a temperature below 60° C. for about 48 hours then weighed. The round-bottomed flask was dried at a temperature of 120° C. for at least 3 hours to remove any residual water before adding the reagents.

Ionic plastic crystals (Plastic Crystals 17 and 18) were obtained using the process of the present example, the quantity, number of moles and number of equivalents of the reagents used in the synthesis are presented in Tables 7 and 8, respectively.

TABLE 7

Reagents used in the synthesis of Plastic Crystal 17

| Reagents | Quantity (g) | n (mmol) | Equivalent |
|---|---|---|---|
| LiFSI, anhydrous | 1.0 | 5.35 | 1.0 |
| Formic acid | 0.246 | 5.35 | 1.0 |
| SiDEG prepared in Example 1(a) | 1.6 | 5.35 | 1.0 |
| ACN, anhydrous | 15 | — | — |
| DBU | 0.75 | 5.35 | 0.35 |

TABLE 8

Reagents used in the synthesis of Plastic Crystal 18

| Reagents | Quantity (g) | n (mmol) | Equivalent |
|---|---|---|---|
| LiFSI, anhydrous | 1.0 | 5.35 | 1.0 |
| Formic acid | 0.246 | 5.35 | 1.0 |
| ACN, anhydrous | 15 | — | — |
| DBU | 0.75 | 5.35 | 0.35 |

The solvent and DBU were added to the round-bottomed flask. The round-bottomed flask was then fitted with a septum, removed from the glovebox, and cooled to a temperature of about 4° C. Formic acid was then added dropwise to the round-bottomed flask with stirring. The mixture was then heated to a temperature of about 21° C. and stirred under an inert argon atmosphere for about 1 hour. The round-bottomed flask was fitted with a reflux condenser and stirred at 500 rpm under an inert atmosphere of nitrogen for at least 4 days at a temperature of 21° C. The mixture thus obtained was then cooled and the pH was measured to ensure that the mixture was under alkaline (basic) conditions. The mixture was then filtered, and the filtrate evaporated to dryness under vacuum at a temperature below 50° C. The residue was dissolved in 45 ml of DCM, washed four times with water and twice with brine. The two phases thus formed were separated using a separating funnel. The lower phase (a yellowish phase) was recovered and concentrated. The viscous solid was then distilled under vacuum at a temperature of 160° C. for about 12 hours to remove volatile contaminants. The viscous solid turns into a solid at room temperature.

(d) Post-Functionalization of the Ionic Plastic Crystals Prepared in Examples 1(b) and 1(c)

The post-functionalization of the ionic plastic crystals prepared in Examples 1(b) and 1(c) was carried out to introduce cross-linkable functional groups.

1.50 g of the ionic plastic crystals prepared in Examples 1(b) and 1(c) were dissolved in 25 ml of anhydrous THF. 0.70 ml of 2-isocyanatoethyl methacrylate was added to the solution. The mixture thus obtained was stirred for about 5 hours at a temperature of about 60° C. under an inert atmosphere of nitrogen. 5 ml of methanol were added at the end of the reaction and the mixture was cooled. The solid thus obtained was then evaporated to dryness and dried under vacuum at a temperature of about 60° C.

Figure 11:
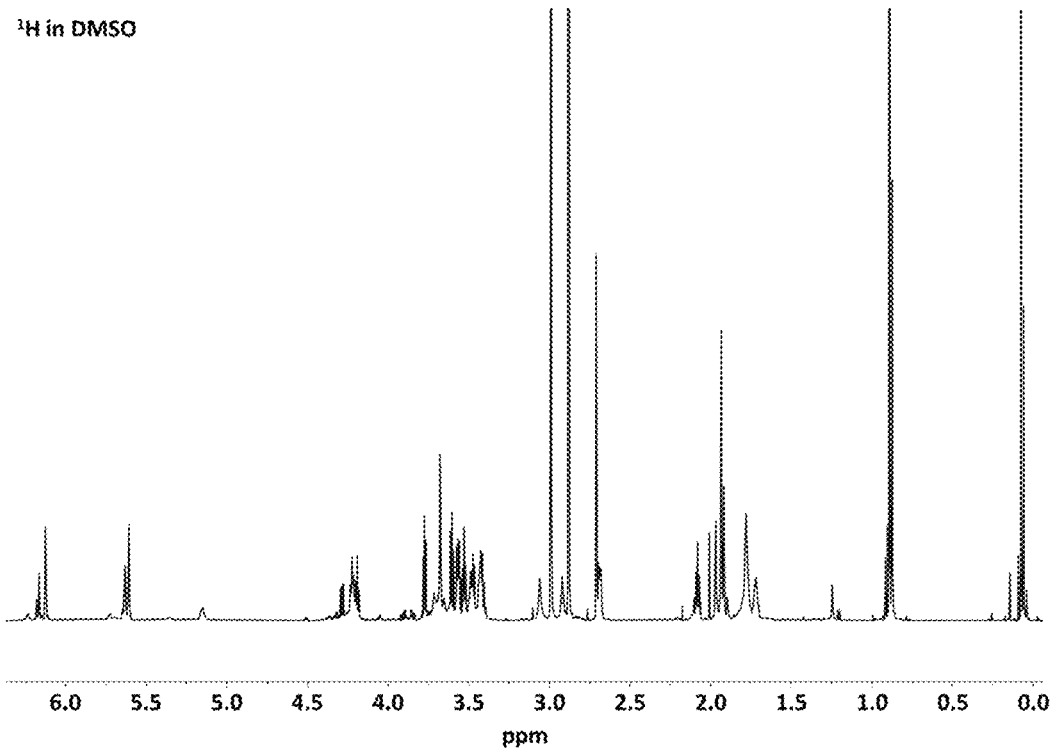
FIG. 11 is a H NMR spectrum obtained for Plastic Crystal 15 after post-functionalization, as described in Example 1(d).

FIG. 11 shows a proton NMR spectrum obtained for Plastic Crystal 15 after post-functionalization as described in the present example. The $^1$H NMR measurements were performed in DMSO-$d^6$.

Figure 12:
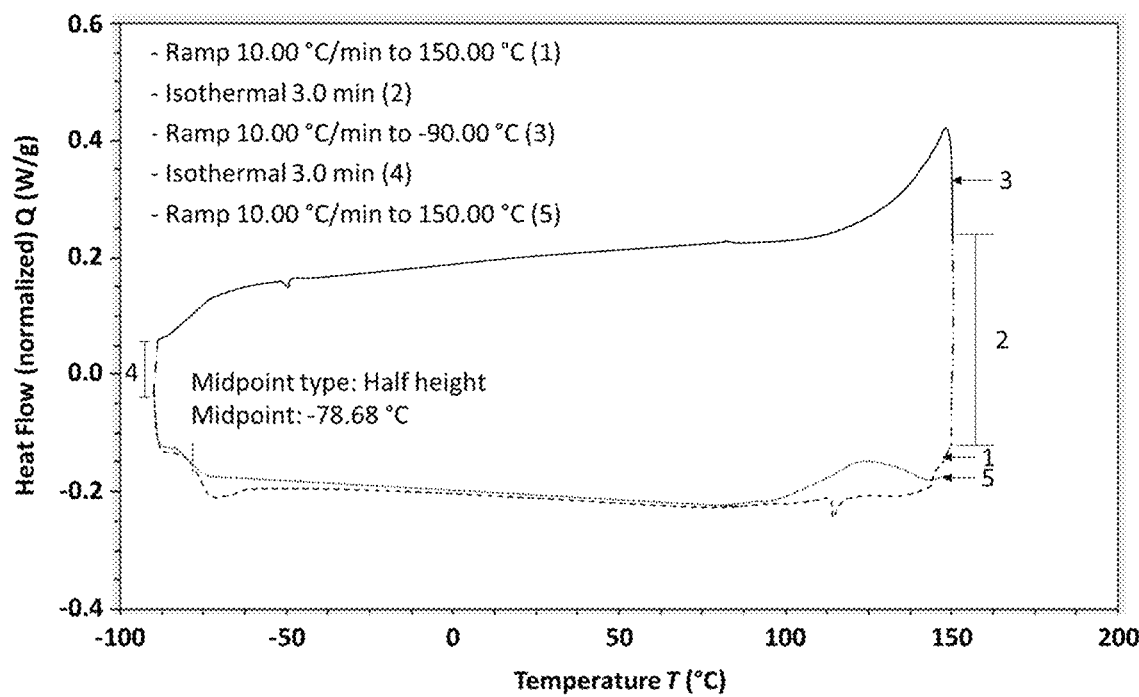
FIG. 12 shows the results of the differential scanning calorimetry analysis obtained for Plastic Crystal 15 after post-functionalization, as described in Example 1(d).

FIG. 12 shows the DSC results obtained for Plastic Crystal 15 after post-functionalization as described in the present example. Isothermal (at 150.00° C. and −90.00° C.) and non-isothermal (10.00° C./min ramp) measurements were carried out. Repeated DSC heating-cooling cycling measurements were carried out using the following thermal procedure: 10.00° C./min ramp from −90.00° C. to 150.00° C. (dashed line, 1), isothermal at 150.00° C. for 3 min (dashed-dot-dot line, 2), 10.00° C./min ramp from 150.00° C. to −90.00° C. (solid line, 3), isothermal at −90.00° C. for 3 min (dashed-dot line, 4), and 10.00° C./min ramp from −90.00° C. to 150.00° C. (dotted line, 5).

Figure 13:
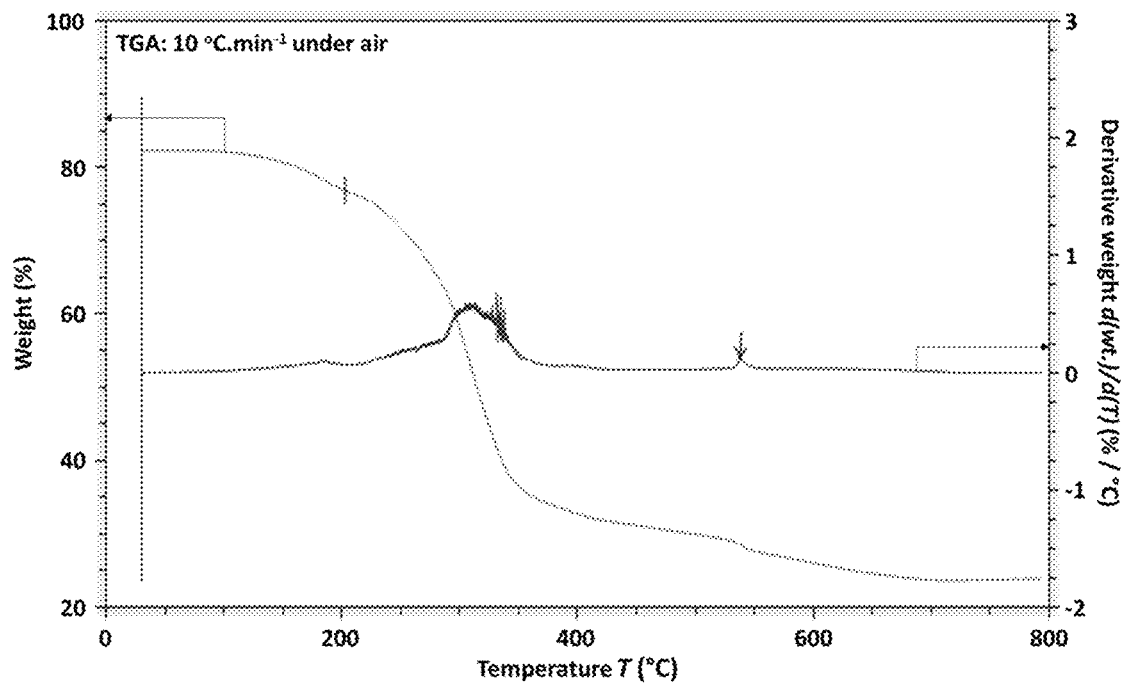
FIG. 13 shows the results of thermogravimetric analysis obtained for Plastic Crystal 15 after post-functionalization, as described in Example 1(d).

FIG. 13 shows the results of the thermogravimetric analysis (TGA) obtained for Plastic Crystal 15 after post-functionalization as described in the present example. Thermal degradation of the ionic plastic crystal occurred in a programmed temperature range of from room temperature to 800° C. The ionic plastic crystal was heated in an oven from room temperature to 800° C. at a heating ramp rate of 10° C./min under an oxidative environment (air).

Figure 14:
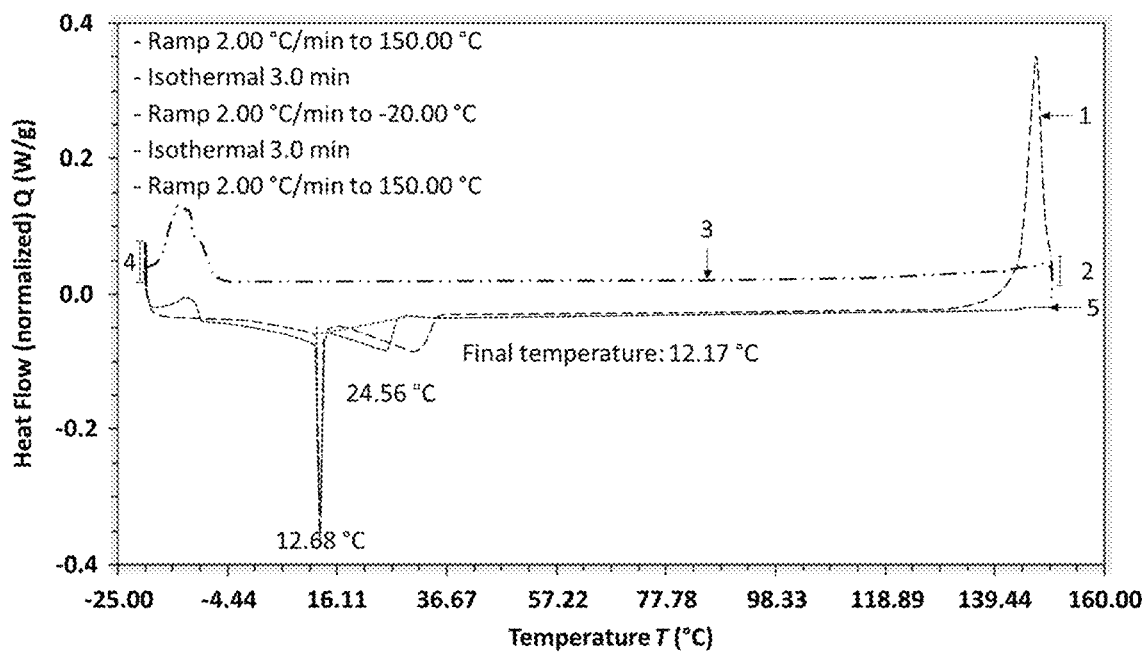
FIG. 14 shows the results of the differential scanning calorimetry analysis obtained for Plastic Crystal 16 after post-functionalization, as described in Example 1(d).

FIG. 14 shows the DSC results obtained for Plastic Crystal 16 after the post-functionalization as described in the present example. Isothermal (at 150.00° C. and −20.00° C.) and non-isothermal (2.00° C./min ramp) measurements were carried out. Repeated DSC heating-cooling cycling measurements were carried out using the following thermal procedure: 2.00° C./min ramp from −20.00° C. to 150.00° C. (dashed line, 1), isothermal at 150.00° C. for 3 min (solid line, 2), 2.00° C./min ramp from 150.00° C. to −20.00° C. (dashed-dot-dot line, 3), isothermal at −20.00° C. for 3 min (solid line, 4), and 2.00° C./min ramp from −20.00° C. to 150.00° C. (dotted line, 5).

(e) Ionic Conductivity of Ionic Plastic Crystals Presented in Example 1(d)

The ionic conductivity measurements were carried out by alternating current electrochemical impedance spectroscopy recorded with a VPM3 multi-channel potentiostat. The electrochemical impedance spectroscopy was performed between 200 mHz and 1 MHz over a temperature range of from 20° C. to 80° C. (in increase and in decrease, each 10° C.).

Each electrochemical impedance measurement was obtained after stabilizing the oven temperature at temperature (T).

The ionic plastic crystal films were placed between two stainless steel blocking electrodes with an active surface area of 2.01 cm².

The ionic conductivity of lithium ions was calculated from the electrochemical impedance spectroscopy measurements using Equation 1:

$$\sigma = \frac{1}{R_t} \times \frac{l}{A} \qquad \text{Equation 1}$$

wherein, $\sigma$ is the ionic conductivity (S·cm⁻¹), I is the thickness of the ionic plastic crystal film between the two blocking electrodes, A is the contact surface area between the ionic plastic crystal film and the two blocking electrodes and $R_t$ is the total resistance measured by electrochemical impedance spectroscopy.

Figure 15:
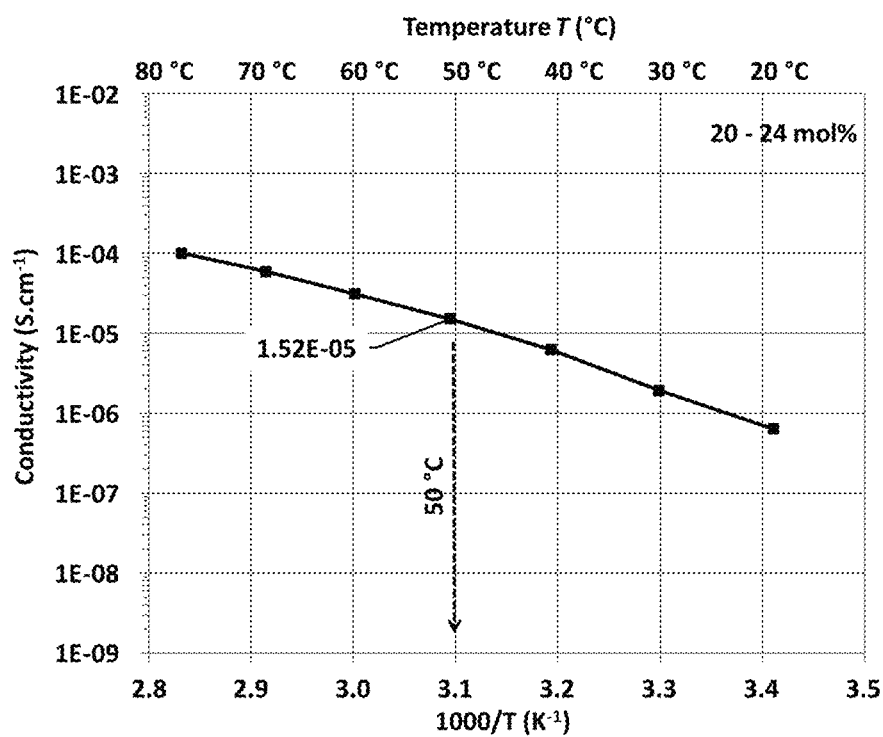
FIG. 15 is a graph showing ionic conductivity results (S·cm$^{-1}$) as a function of temperature (1000/T, K$^{-1}$) for a cell, as described in Example 1(e).

FIG. 15 presents ionic conductivity (S·cm⁻¹) results measured as a function of the temperature (K⁻¹) for the symmetrical cell assembled in the present example. FIG. 15 shows that an ionic conductivity value of 1.52×10⁻⁵ S·cm⁻¹ was obtained at a temperature of 50° C. for Plastic Crystal 15 after post-functionalization as described in Example 1(d).

Figure 16:
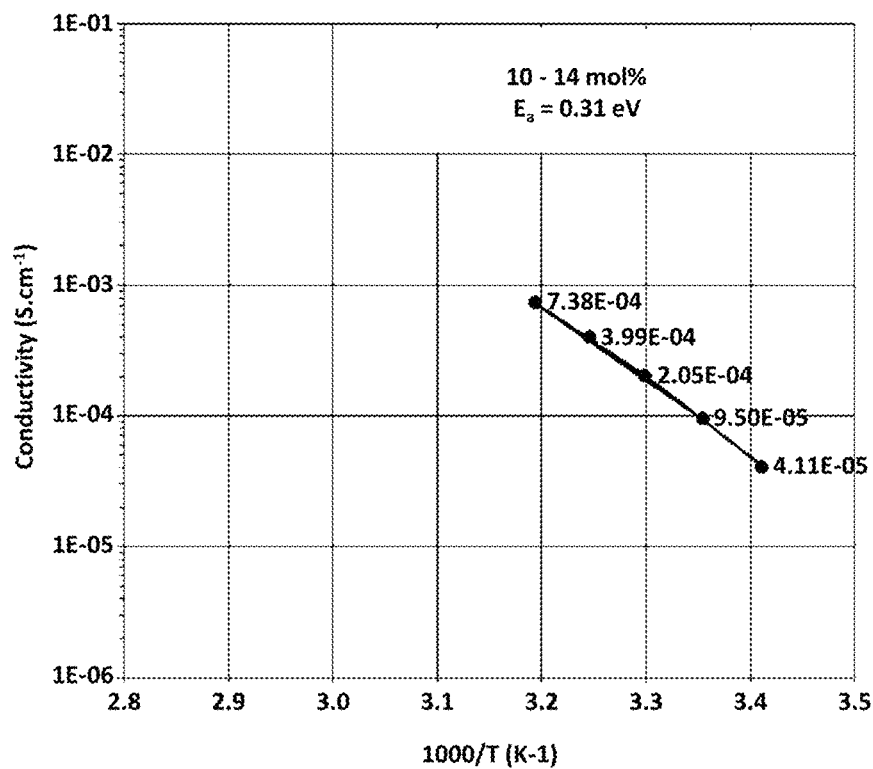
FIG. 16 is a graph showing ionic conductivity results as a function of temperature for a cell, as described in Example 1(e).

FIG. 16 presents ionic conductivity (S·cm⁻¹) results measured as a function of the temperature (K⁻¹) for the symmetrical cell assembled with Plastic Crystal 16 after post-functionalization as described in Example 1(d).

Example 2—Preparation of Ceramic-Ionic Plastic Crystal Composite Films

Ionic conductivity results were obtained for ceramic-ionic plastic crystal composite films comprising 90 wt. % of $Li_6PS_5Cl$ and 10 wt. % of Plastic Crystals 1 or 13.

Ionic conductivity results were also obtained for a ceramic-ionic plastic crystal composite film comprising 90 wt. % of $Li_6PS_5Cl$ and 10 wt. % of an ionic plastic crystal mixture comprising a polymer as described in the US'674 patent (hereinafter US'674 polymer) and an ionic plastic crystal prepared in Examples 1(b) to 1(d).

Finally, ionic conductivity results were also obtained for ceramic-polymer composite films comprising 90 wt. % of $Li_6PS_5Cl$ and 10 wt. % of the US'674 polymer and for a $Li_6PS_5Cl$ film for comparative purposes.

DCM or ACN was added when necessary to the mixtures to obtain the appropriate viscosity. The mixtures were then cast on a previously degreased aluminum foil. A 10 mm diameter pellet was placed in a mold and compressed under a pressure of 2.8 tons using a press and then transferred to a conductivity cell at a pressure of 5 MPa. The temperature was stabilized for about 1 hour. At a temperature of 20° C., the conductivity results for the ceramic-ionic plastic crystal composite films were in the range of from about 3.0 to about 7.0×10⁻⁴ S/cm which is similar to the conductivity results obtained for this ceramic ($Li_6PS_5Cl$) compressed without polymer or ionic plastic crystal and without an aluminum support but measured under the same conditions. The conductivity results for the ceramic-ionic plastic crystal composite films were also significantly superior to the conductivity results for the ceramic-polymer composite film. Two impedance measurements were recorded at each temperature, with 15 minutes between each measurement. The conductivity cells were assembled according to the configurations indicated in Table 9.

TABLE 9

Conductivity cell configurations

| Conductivity cell | Composition |
|---|---|
| Cell 1 (comparative cell) | 100 wt. % of $Li_6PS_5Cl$ |
| Cell 2 (comparative cell) | 90 wt. % of $Li_6PS_5Cl$ and 10 wt. % of a US'674 polymer (30:1) |
| Cell 3 | 90 wt. % of $Li_6PS_5Cl$ and 10 wt. % of a mixture including a US'674 polymer and Plastic Crystal 1 prepared in Example 1(b) (40:60) |
| Cell 4 | 90 wt. % of $Li_6PS_5Cl$ and 10 wt. % of Plastic Crystal 1 prepared in Example 1(b) |
| Cell 5 | 90 wt. % of $Li_6PS_5Cl$ and 10 wt. % of Plastic Crystal 11 prepared in Example 1(b) |
| Cell 6 (comparative cell) | 100 wt. % of a US'674 polymer having a polymer:LiTFSI ratio (20:1) (dried and using ACN as the solvent) |
| Cell 7 | 50 wt. % of Plastic Crystal 1 prepared in Example 1(b) and 50 wt. % of the polymer as described in Cell 6 (dried and using ACN as the solvent) |
| Cell 8 | 85 wt. % of Plastic Crystal 1 prepared in Example 1(b) and 15 wt. % of the polymer as described in Cell 6 (dried and solvent-free) |
| Cell 9 | 85 wt. % of Plastic Crystal 1 prepared in Example 1(b) and 15 wt. % of the polymer as described in Cell 6 (not dried and solvent-free) |
| Cell 10 | 95 wt. % of Plastic Crystal 1 prepared in Example 1(b) and 5 wt. % of the polymer as described in Cell 6 (not dried and solvent-free) |

TABLE 9-continued

Conductivity cell configurations

| Conductivity cell | Composition |
|---|---|
| Cell 11 | 95 wt. % of Plastic Crystal 1 prepared in Example 1(b) and 5 wt. % of the polymer as described in Cell 6 (dried and solvent-free) |

In Table 9, the expression "not dried" means that the film was dried at 25° C. under vacuum for 12 hours to remove ACN only. In Table 9, the expression "dried" means that the film has been dried at 80° C. under vacuum for 12 hours to ensure adequate drying. Thus, the plastic crystal melts and may diffuse slightly into the polymer.

Figure 17:
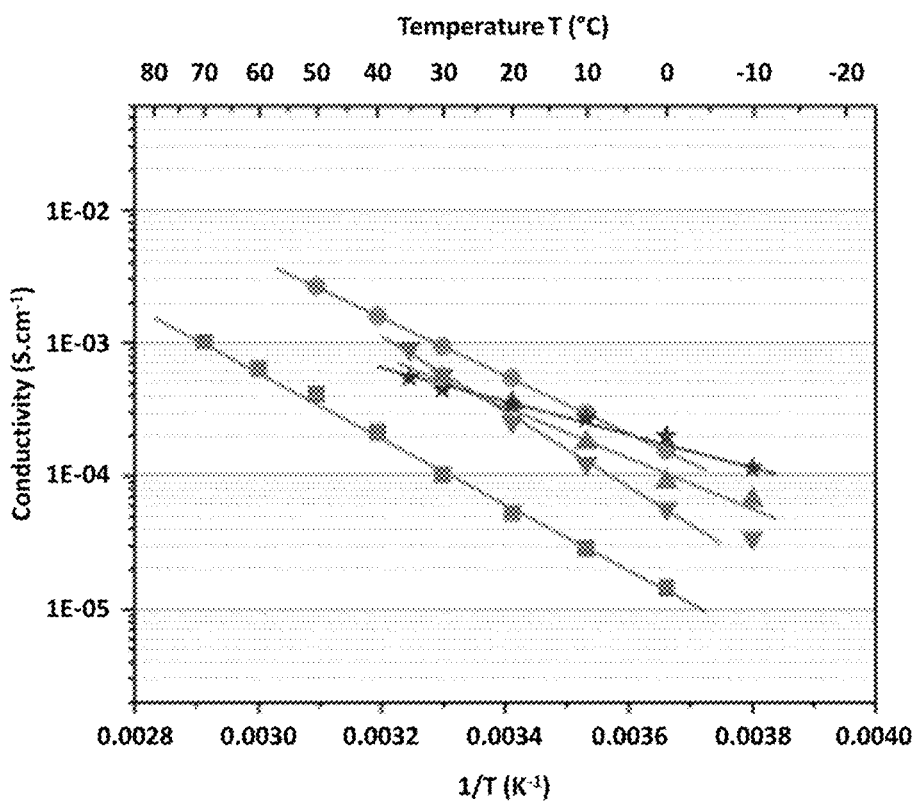
FIG. 17 is a graph showing ionic conductivity results as a function of temperature for Cells 1 (●), 2 (■), 3 (▼), 4 (★), and 5 (▲), as described in Example 2.

FIG. 17 presents the results of ionic conductivity ($S \cdot cm^{-1}$) measured as a function of the temperature ($K^{-1}$) for the conductivity cells assembled in the present example. The results are presented for Cell 1 (●), Cell 2 (■), Cell 3 (▼), Cell 4 (★), and Cell 5 (▲), as described in the present example.

Figure 18:
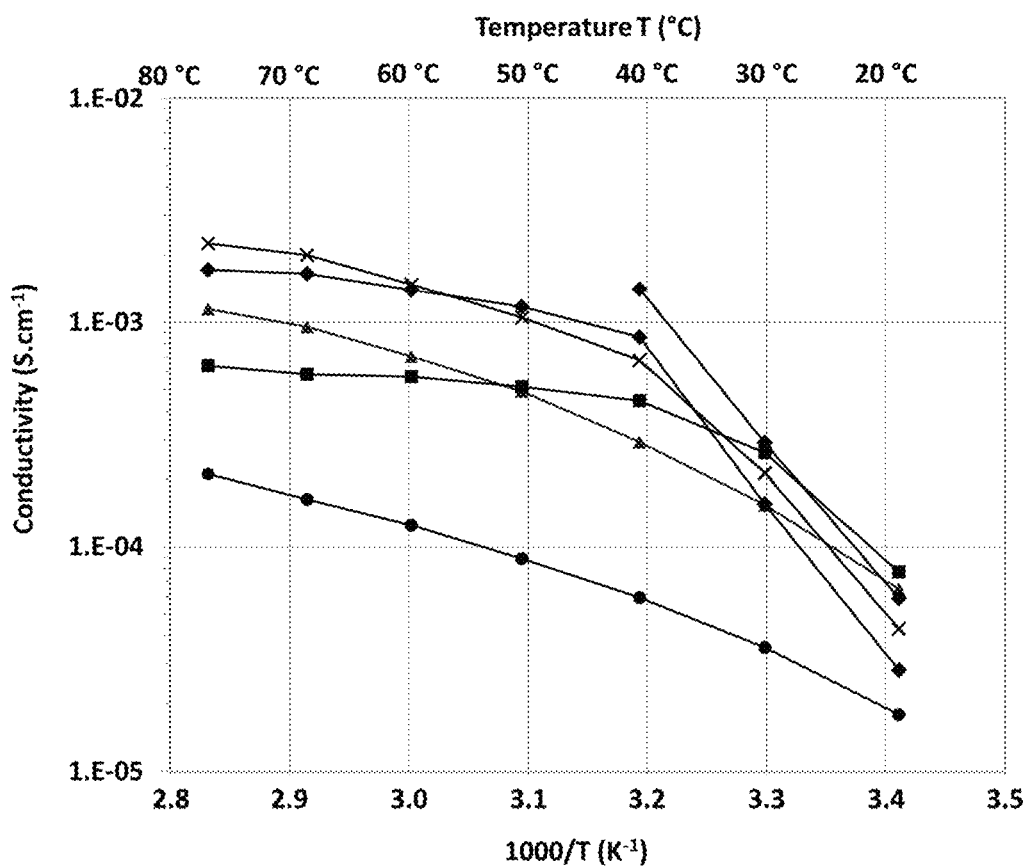
FIG. 18 is a graph showing ionic conductivity results as a function of temperature for Cells 6 (●), 7 (▼), 8 (X), 9 (■), 10 (♦, solid line), and 11 (♦, dotted line), as described in Example 2.

FIG. 18 presents the results of ionic conductivity ($S \cdot cm^{-1}$) measured as a function of the temperature ($K^{-1}$) for the conductivity cells assembled in the present example. The results are presented for Cell 6 (●), Cell 7 (▲), Cell 8 (X), Cell 9 (■), Cell 10 (★, solid line), and Cell 11 (★, dotted line) as described in the present example.

Example 4—Anion and Cation Pairs

The influence of ion pairing on the reaction yield was also determined. Ionic plastic crystals (Plastic Crystals 19 to 28) including different combinations of guanidine, amidine or phosphazene organic superbase-derived cations and delocalized anions were obtained by the process described in Example 1(b). The reactions were carried out at a temperature of about 21° C. for about 4 days.

The quantities of reagents used in the synthesis are presented in Table 10. The reaction yields as well as the mass of each ionic plastic crystal obtained are presented in Table 11.

TABLE 10

Synthesis of Plastic Crystals 19 to 28

| Plastic Crystal | Organic Superbase (ml) | SiDEG prepared in Example 1(a) (eq) | Lithium salt (g) | ACN, anhydrous (ml) |
|---|---|---|---|---|
| 19 | DBU 1.5 | 3.2 | LiTFSI 2.88 | 30 |
| 20 | DBU 1.5 | 3.2 | LiOTf 1.56 | 30 |
| 21 | DBU 1.5 | 3.2 | LiBF$_4$ 0.94 | 30 |
| 22 | DBU 1.5 | 3.2 | LiPF$_6$ 1.52 | 30 |
| 23 | DBU 1.5 | 3.2 | LiTDI 1.89 | 30 |
| 24 | DBU 11.0 | 5.90 | LiFSI 19.1 | 220 |
| 25 | DBN 1.5 | 3.7 | LiFSI 2.27 | 30 |
| 26 | BEMP 1.5 | 1.8 | LiFSI 1.12 | 30 |
| 27 | BTPP 1.5 | 1.5 | LiFSI 0.92 | 30 |
| 28 | DBU 1.5 | 0.8 | LiFSI 2.6 | 30 |
| 29 | P$_1$-t-Bu 1.5 | 2.0 | LiFSI 1.1 | 30 |

TABLE 11

Reaction yield (%) and mass of Plastic Crystals 19 to 28

| Plastic Crystal | Mass of the ionic plastic crystal (g) | Yield (%) |
|---|---|---|
| 19 | 3.49 | 80 |
| 20 | N/A | N/A |
| 21 | 0.25 | 10 |
| 22 | 1.26 | 59 |
| 23 | 1.89 | 57 |
| 24 | 21.6 | 84 |
| 25 | 2.27 | 60 |
| 26 | N/A | N/A |
| 27 | 0.92 | 83 |
| 28 | 2.6 | 84 |
| 29 | 1.1 | 82 |

Although not all results are provided, all combinations of delocalized anions and guanidine, amidine and phosphazene organic superbase-derived produced ionic plastic crystals. It should, however, be understood that the pairing of anions and cations has a significant influence on the mass of a product obtained by the reaction and therefore on the yield of the reaction.

Example 5—Characterization of the Stabilized Intermediary Ion-Neutral Complex

As described above, the yield of the reaction may be improved by the formation of a stabilized intermediary ion-neutral complex obtained by the reaction of a guanidine, amidine or phosphazene organic superbase-derived cation as described herein and a bis-silylated compound of Formula 17.

A stabilized intermediary ion-neutral complex formed by the reaction of the bis-silylated derivative of diethylene glycol (SiDEG) prepared in Example 1(a) and protonated DBU was characterized.

The stabilized intermediary ion-neutral complex was characterized by $^1$H NMR and $^{13}$C NMR over a period of about 3 weeks to assess its ability to stabilize the protonated base.

Figure 19:
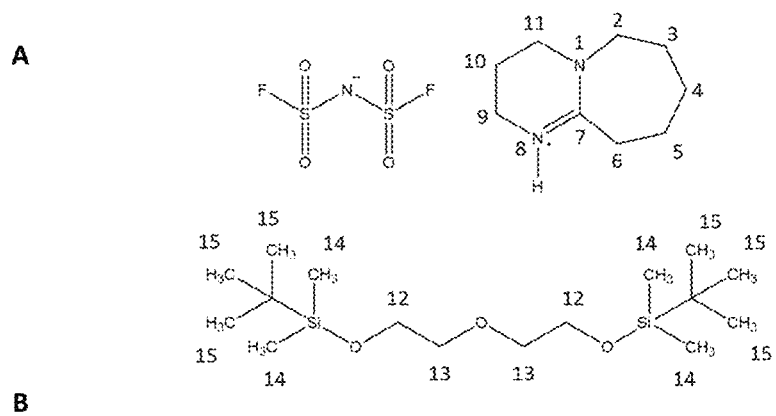
FIG. 19 shows in (A) the numbering of atoms for a protonated DBU and for a bis-silylated derivative of diethylene glycol prepared in Example 1(a); and in (B) and (C) are respectively a $^1$H NMR and a $^{13}$C NMR spectra obtained for a stabilized intermediary ion-neutral complex, as described in Example 5.
Figure 19:
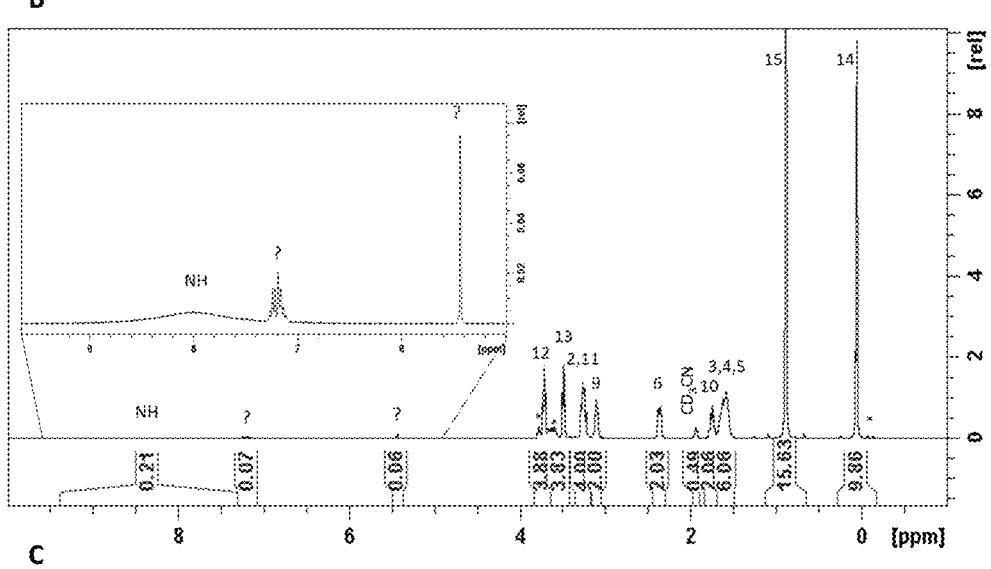
Figure 19:
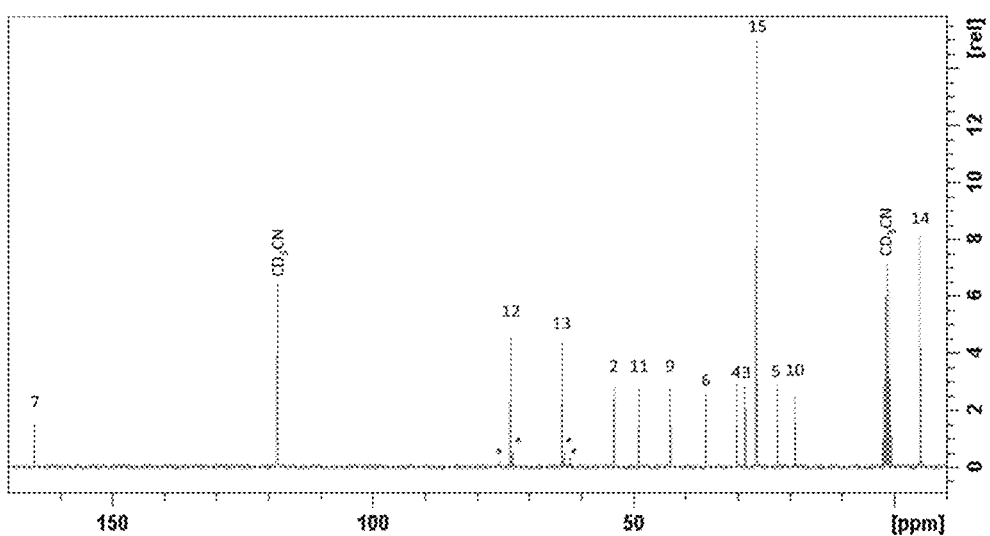

FIG. 19(A) shows the numbering of atoms in both the protonated DBU and the bis-silylated derivative of diethylene glycol (SiDEG) prepared in Example 1(a).

FIG. 19(B) shows a proton NMR spectrum obtained for the stabilized intermediary ion-neutral complex as described in the present example. The $^1$H NMR measurements were carried out in acetonitrile-d$_3$ (CD$_3$CN), and the peak assignments are indicated on the spectrum.

FIG. 19(C) shows a $^{13}$C NMR spectrum obtained for the stabilized intermediary ion-neutral complex as described in the present example. The $^{13}$C NMR measurements were also carried out in CD$_3$CN, and peak assignments are indicated on the spectrum.

Figure 20:
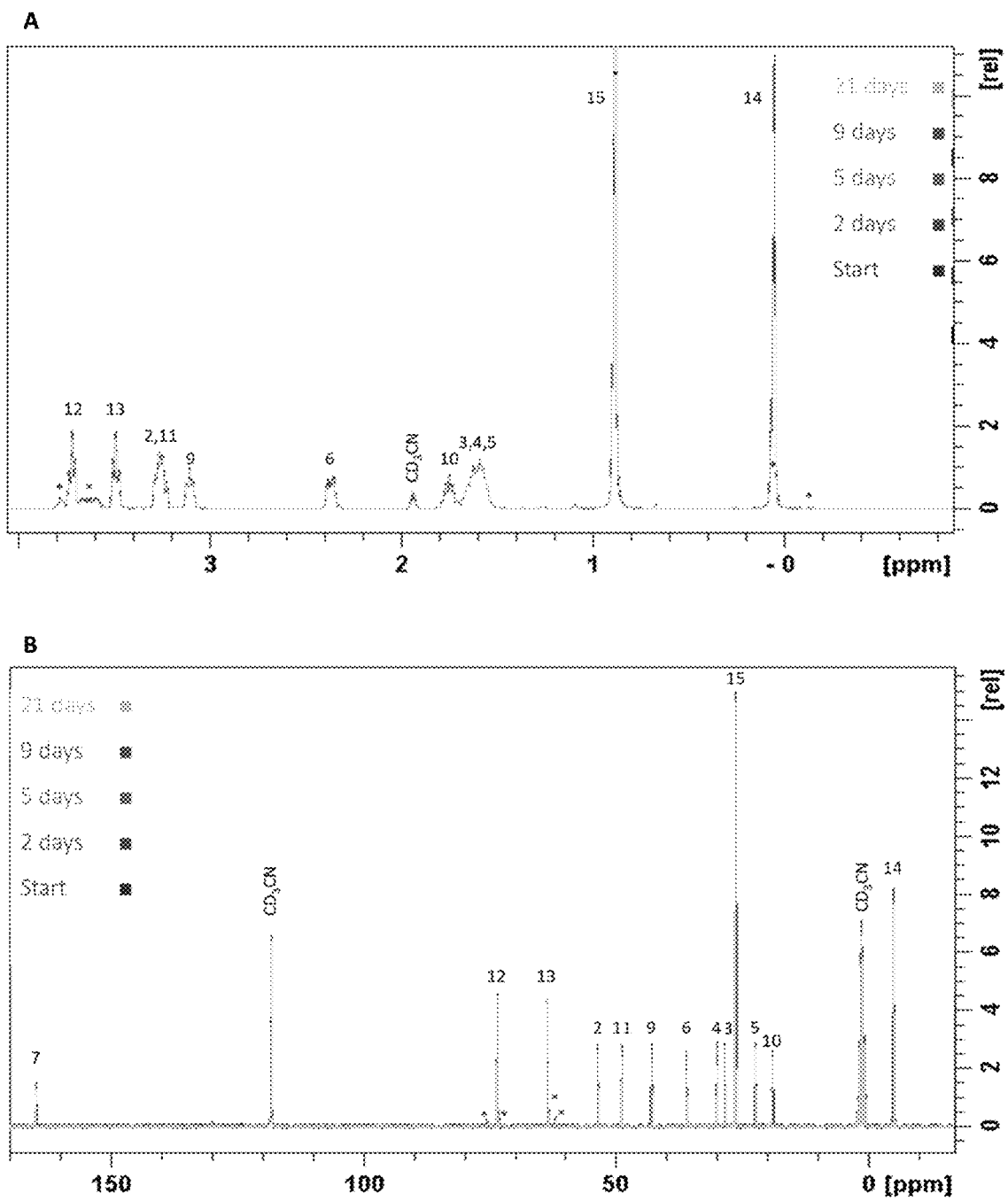
FIG. 20 shows respectively in (A) and (B)$^1$H NMR spectra and $^{13}$C NMR spectra obtained for the stabilized intermediary ion-neutral complex over a period of 3 weeks, as described in Example 5. The results were obtained at the start of the experiment (blue), after 2 days (red), after 3 days (green), after 9 days (purple) and after 21 days (yellow).

FIG. 20(A) shows proton NMR spectra obtained for the stabilized intermediary ion-neutral complex as described in the present example over a period of 3 weeks. The results are shown at the start of the experiment (blue $^1$H NMR spectrum), after 2 days (red $^1$H NMR spectrum), after 3 days (green $^1$H NMR spectrum), after 9 days (purple $^1$H NMR spectrum), and after 21 days (yellow $^1$H NMR spectrum). The $^1$H NMR measurements were carried out in CD$_3$CN, and peak assignments are indicated on the spectra.

FIG. 20(B) shows $^{13}$C NMR spectra obtained for the stabilized intermediary ion-neutral complex as described in the present example over a period of 3 weeks. The results are shown at the start of the experiment (blue $^{13}$C NMR spectrum), after 2 days (red $^{13}$C NMR spectrum), after 3 days (green $^{13}$C NMR spectrum), after 9 days (violet $^{13}$C NMR spectrum), and after 21 days (yellow $^{13}$C NMR spectrum). The $^{13}$C NMR measurements were carried out in CD$_3$CN, and peak assignments are indicated on the spectra.

As can be seen in FIGS. 20(A) and 20(B), no significant changes were detected in the spectra after 3 weeks, meaning that there is no significant product transformation accompanied by structural change during this period.

Figure 21:
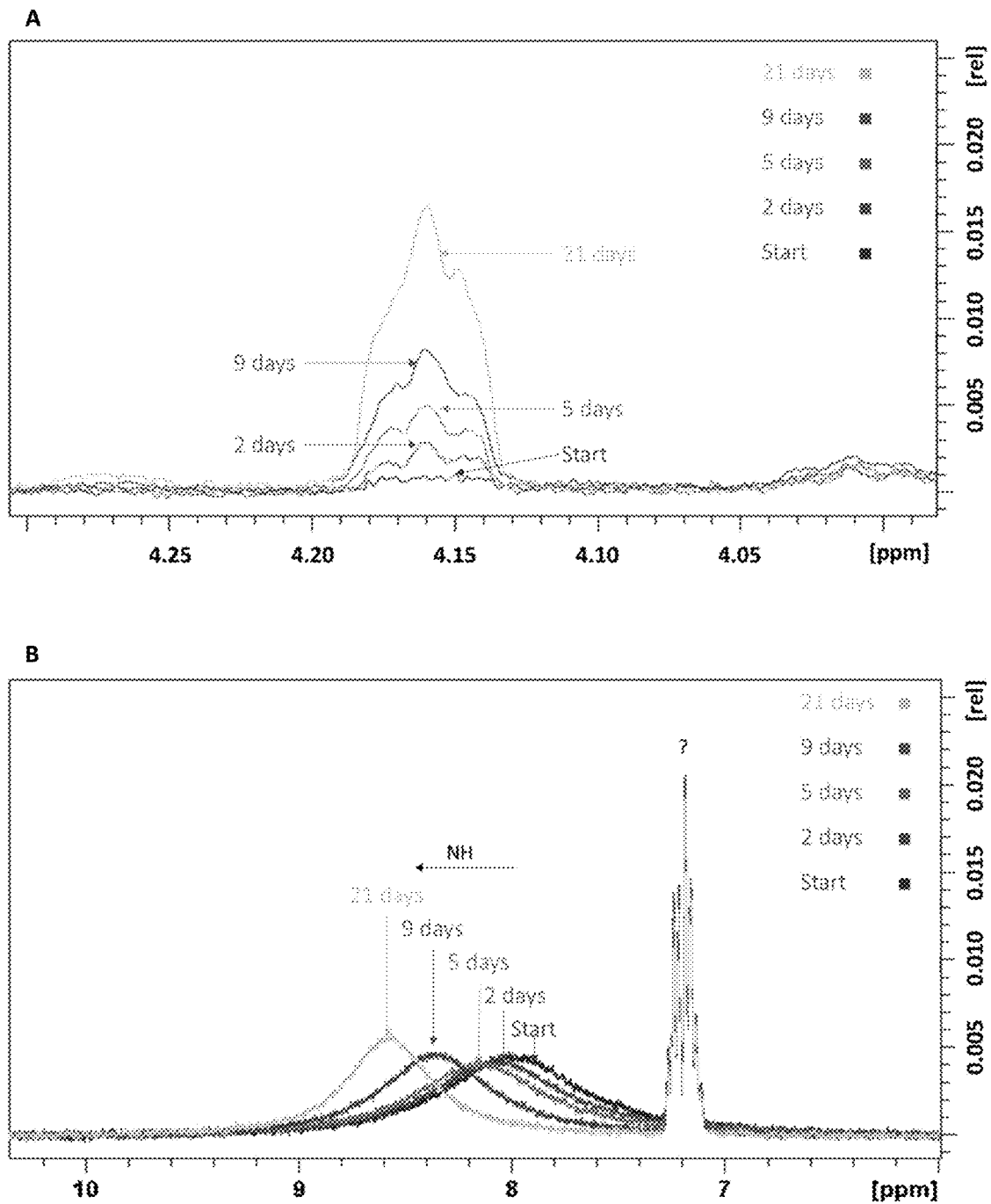
FIG. 21 shows the $^1$H NMR spectra obtained for the stabilized intermediary ion-neutral complex over a period of 3 weeks and were recorded in (A) between 3.99 ppm and 4.30 ppm, and in (B) between 6 ppm and 10.4 ppm, as described in Example 5. The results were obtained at the start of the experiment (blue), after 2 days (red), after 3 days (green), after 9 days (purple), and after 21 days (yellow).

FIG. 21(A) shows proton NMR spectra obtained for the stabilized intermediary ion-neutral complex as described in the present example over a period of 3 weeks. The results were recorded between 3.99 ppm and 4.30 ppm at the start of the experiment (blue $^1$H NMR spectrum), after 2 days (red $^1$H NMR spectrum), after 3 days (green $^1$H NMR spectrum), after 9 days (purple $^1$H NMR spectrum), and after 21 days (yellow $^1$H NMR spectrum). The $^1$H NMR measurements were carried out in CD$_3$CN, and peak assignments are indicated on the spectra.

FIG. 21(B) shows proton NMR spectra obtained for the stabilized intermediary ion-neutral complex as described in the present example over a period of 3 weeks. The results were recorded between 6 ppm and 10.4 ppm were obtained at the start of the experiment (blue $^1$H NMR spectrum), after 2 days (red $^1$H NMR spectrum), after 3 days (green $^1$H NMR spectrum), after 9 days (purple $^1$H NMR spectrum), and after 21 days (yellow $^1$H NMR spectrum). The $^1$H NMR measurements were carried out in CD$_3$CN, and peak assignments are indicated on the spectra.

The appearance of an additional minor peak (~1% of the main compound after 21 days of reaction) may be observed at 4.16 ppm in FIG. 21(A). The position of this peak and its multiplicity could potentially indicate that it corresponds to the CH$_2$ protons of diethylene glycol without the silane group at the end.

As can be seen in FIG. 21(B), the peak corresponding to N—H becomes significantly narrower and shifts to higher frequencies, which is a common behaviour associated with the formation of hydrogen bonds.

Example 6—Synthesis and Characterization of Polycyclic Ionic Plastic Crystals (a) Synthesis of a tetracyclic ionic plastic crystal (Plastic Crystal 30)

The synthesis of polycyclic amidines was carried out by a process similar to the one described by Braddock et al. (Braddock, D. C., et al. "The reaction of aromatic dialdehydes with enantiopure 1,2-diamines: an expeditious route to enantiopure tricyclic amidines." Tetrahedron: Asymmetry 21.24 (2010): 2911-2919).

A tetracyclic ionic plastic crystal (Plastic Crystal 30) was prepared by a process as illustrated in Scheme 7:

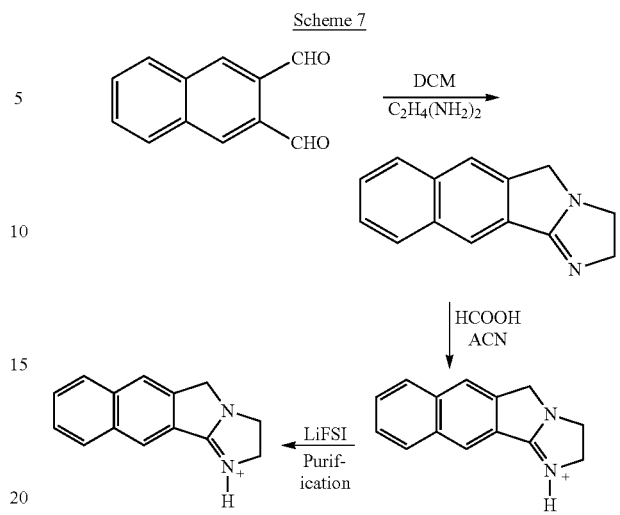

Scheme 7

0.8947 g of 2,3-naphthalenedialdehyde and 60.0 ml of DCM were added in a previously cleaned and dried round-bottomed flask fitted with a magnetic stirrer. The solution was then stirred until dissolved. 3.30 ml of ethylene diamine were then added, and the solution was stirred for about 4 hours at a temperature of about 22° C. The solvent was then evaporated to dryness.

The synthesis was carried out in a glovebox by adding all reagents to a previously cleaned and dried round-bottomed flask fitted with a magnetic stirrer. The flask was dried at a temperature of 120° C. for at least 3 hours to remove any residual water before adding the reagents.

The round-bottomed flask fitted with a reflux condenser under an inert atmosphere of nitrogen was heated to a preselected temperature and stirred at 500 rpm for at least 4 days. The resulting mixture was then cooled, and the pH was measured to ensure that the mixture was under alkaline (basic) conditions. The mixture was then evaporated to dryness under vacuum at a temperature below 50° C. The residue was then dissolved in 45 ml of DCM, washed four times with water, and then twice with brine. The solution thus obtained was then filtered and the filtrate was evaporated to dryness. The two phases thus formed were separated using a separating funnel. The lower phase (a yellowish phase) was recovered and concentrated. The viscous solid was then distilled under vacuum at a temperature of 160° C. for about 12 hours to remove volatile contaminants. The viscous solid turns into a solid at room temperature.

The tetracyclic ionic plastic crystal (Plastic Crystal 30) was obtained using the process of the present example. The number of equivalents for each reagent and the synthesis conditions are presented in Table 12.

TABLE 12

Synthesis of Plastic Crystal 30

| Plastic Crystal | LiFSi (eq) | Organic Superbase (eq) | SiDEG prepared in Example 1(a) (eq) | Formic acid | Solvent (0.7M) | Temperature (°C.) | Duration (Days) |
|---|---|---|---|---|---|---|---|
| 30 | 1.0 | Tetracyclic amidine prepared in the present example 1.0 eq | 0.0 | 0.0 | DCM | 21 | 4 |

(b) Characterization of the Tetracyclic Ionic Plastic Crystal (Plastic Crystal 30)

Figure 22:
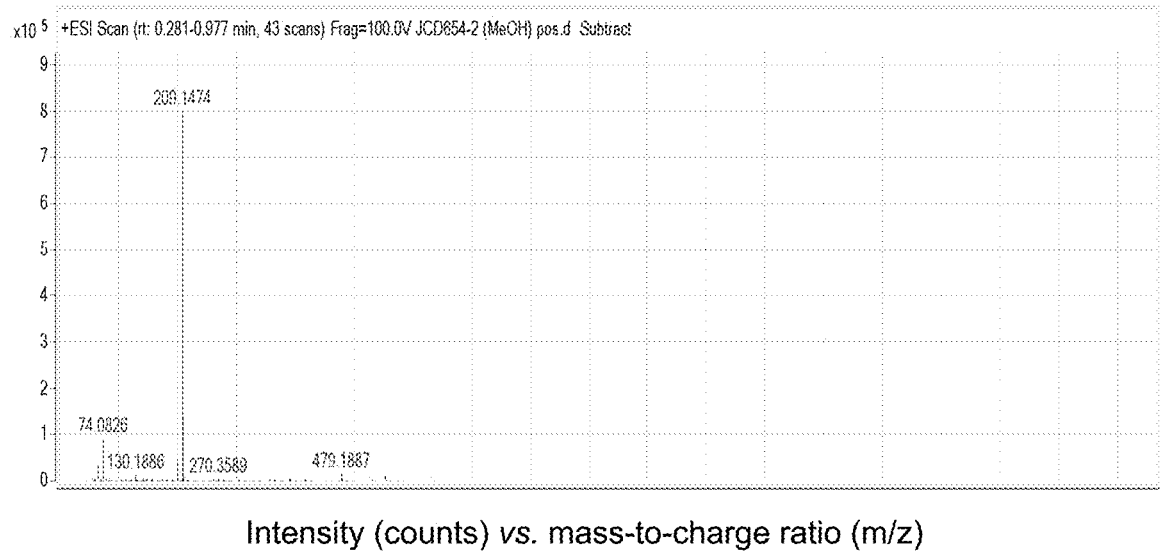
FIG. 22 shows mass spectra obtained by HPLC TOF-MS with an ESI ionization source respectively in (A) in positive mode (ESI$^+$), and in (B) in negative mode (ESI−) for Plastic Crystal 30, as described in Example 6(b).
Figure 22:
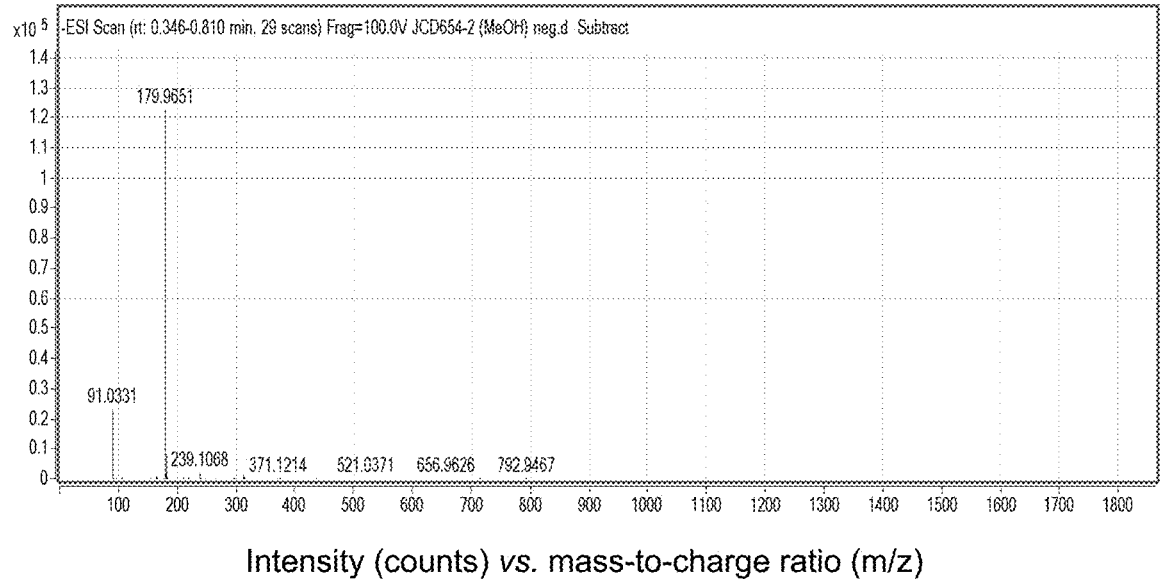

FIG. 22 shows the mass spectra obtained by HPLC TOF ESI-MS for Plastic Crystal 30 as described in Example 6(a). Results are shown for both ESI⁻ and ESI⁺. The eluent for the HPLC TOF ESI-MS was (95% methanol, 4.9% water and 0.1% formic acid), and the flow rate was 0.1 ml/min.

Figure 23:
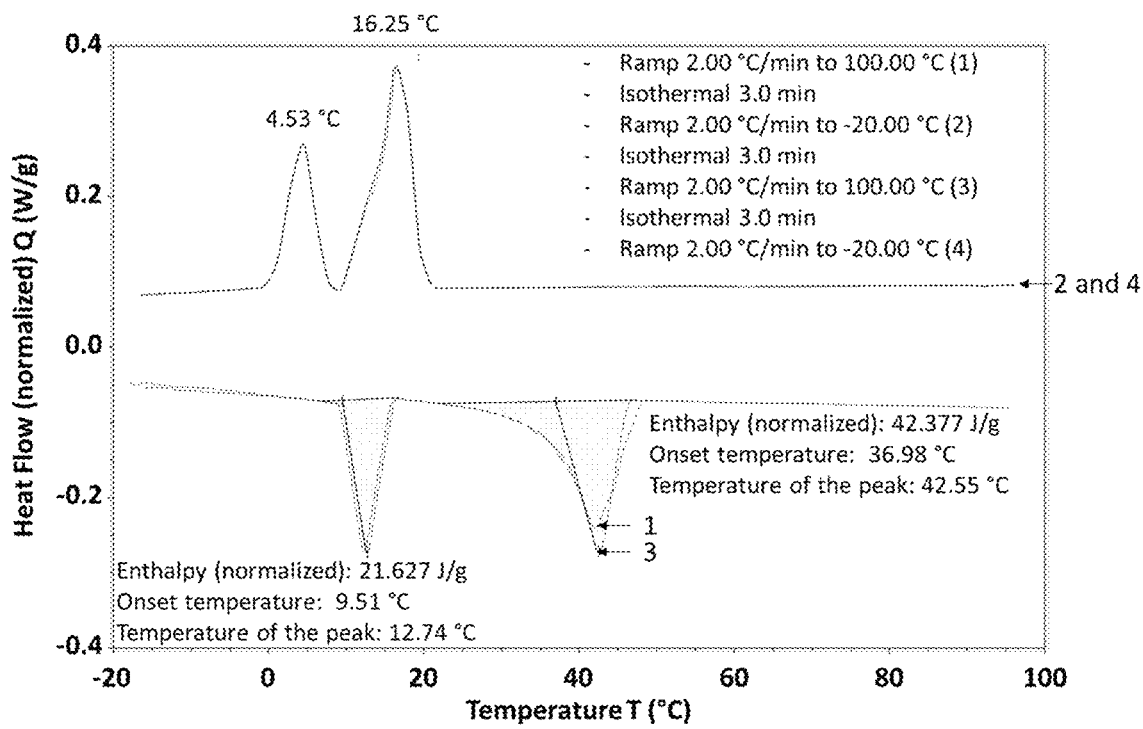
FIG. 23 shows the results of the differential scanning calorimetry analysis obtained for Plastic Crystal 30, as described in Example 6(b).

FIG. 23 shows the DSC results obtained for Plastic Crystal 30 as described in Example 6(a). Isothermal (at 100.00° C. and −20.00° C.) and non-isothermal (2.00° C./min ramp) measurements were carried out.

Repeated DSC heating-cooling cycling measurements were carried out using the following thermal procedure: 2.00° C./min ramp from −20.00° C. to 100.00° C. (1), isothermal at 100.00° C. for 3 min, 2.00° C./min ramp from 100.00° C. to −20.00° C. (2), isothermal at −20.00° C. for 3 min, 2.00° C./min ramp from −20.00° C. to 100.00° C. (3), isothermal at 100.00° C. for 3 min, and 2.00° C./min ramp from 100.00° C. to −20.00° C. (4). The DSC results are presented in Table 13.

TABLE 13

| DSC analysis results for Plastic Crystal 30 Peak Integration (enthalpy) | | |
|---|---|---|
| Enthalpy (normalized) | Peak temperature (° C.) | Onset x |
| 21.627 J/g | 12.74° C. | 9.506° C. |
| 42.377 J/g | 42.55° C. | 36.978° C. |

Example 7—Synthesis and Characterization of Multicationic Ionic Plastic Crystals (a) Synthesis of the Multicationic Ionic Plastic Crystal (Plastic Crystal 31)

The tetracationic ionic plastic crystal was prepared by a process as illustrated in Scheme 8:

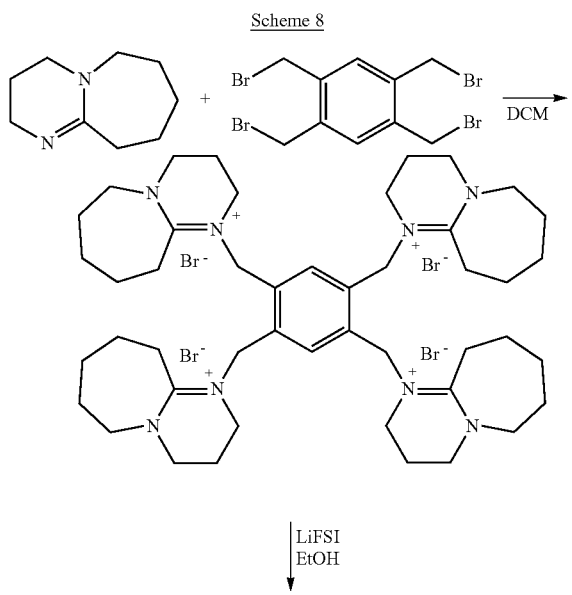

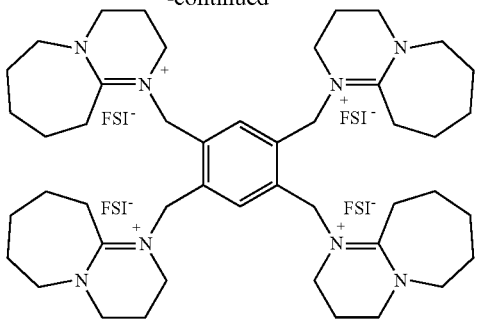

The synthesis of the tetracationic ionic plastic crystal was carried out by adding 20.0 ml of anhydrous DCM and 1.35 ml of DBU to a previously cleaned and dried 50 ml round-bottomed flask equipped with a magnetic stirrer in a glovebox. The mixture was then cooled to a temperature of about 4° C. outside of the glovebox. The mixture was then stirred and 1.0 g of 1,2,4,5-tetrakis(bromomethyl)benzene was added.

The mixture was then placed under an inert atmosphere for at least 4 days at room temperature. The white precipitate thus obtained was then removed by centrifugation (5000 rpm for about 10 minutes) and washed three times with 15 ml of DCM. The white solid was then dried under vacuum at a temperature of about 45° C. for 3 hours. The reaction yield was 1.624 g.

1.624 g of the solid thus obtained, 1.71 g of LiFSI and 100 ml of anhydrous ethanol were added to a previously cleaned and dried 250 ml round-bottomed flask equipped with a magnetic stirrer in a glovebox.

The mixture was then stirred under inert atmosphere for about 3 days at room temperature. The mixture was then centrifuged and the solid was separated and recovered. The solid was transferred to an 80 ml beaker and 50 ml of methanol was added. The suspension was stirred for 15 minutes at room temperature. The solid was separated and recovered by centrifugation. The solid was then dried under vacuum at a temperature of about 45° C. for about 48 hours. The reaction yield was 1.62 g and the purity 96%.

(b) Characterization of the Tetracationic Ionic Plastic Crystal (Plastic Crystal 31)

Inversion recovery measurements of longitudinal relaxation time (Ti) for $^1$H and $^{19}$F nuclei were obtained for Plastic Crystal 31.

Figure 24:
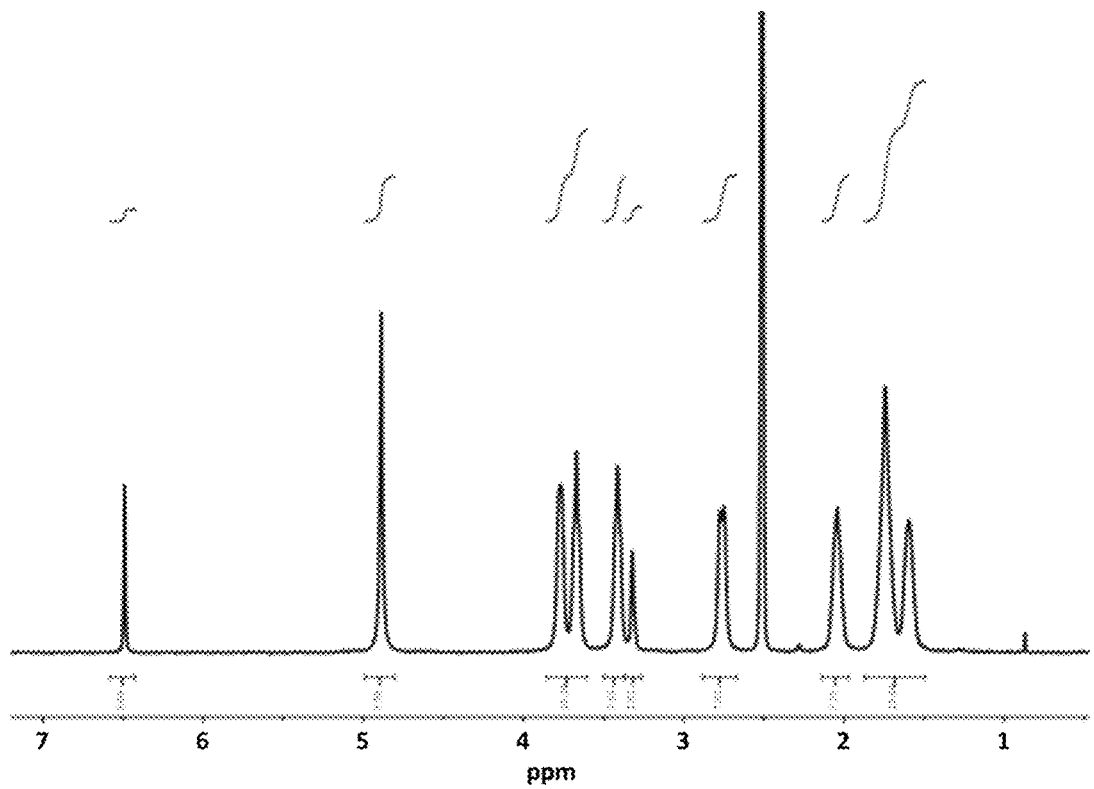
FIG. 24 is a $^1$H NMR spectrum obtained for a tetracationic ionic plastic crystal, as described in Example 7(b).
Figure 25:
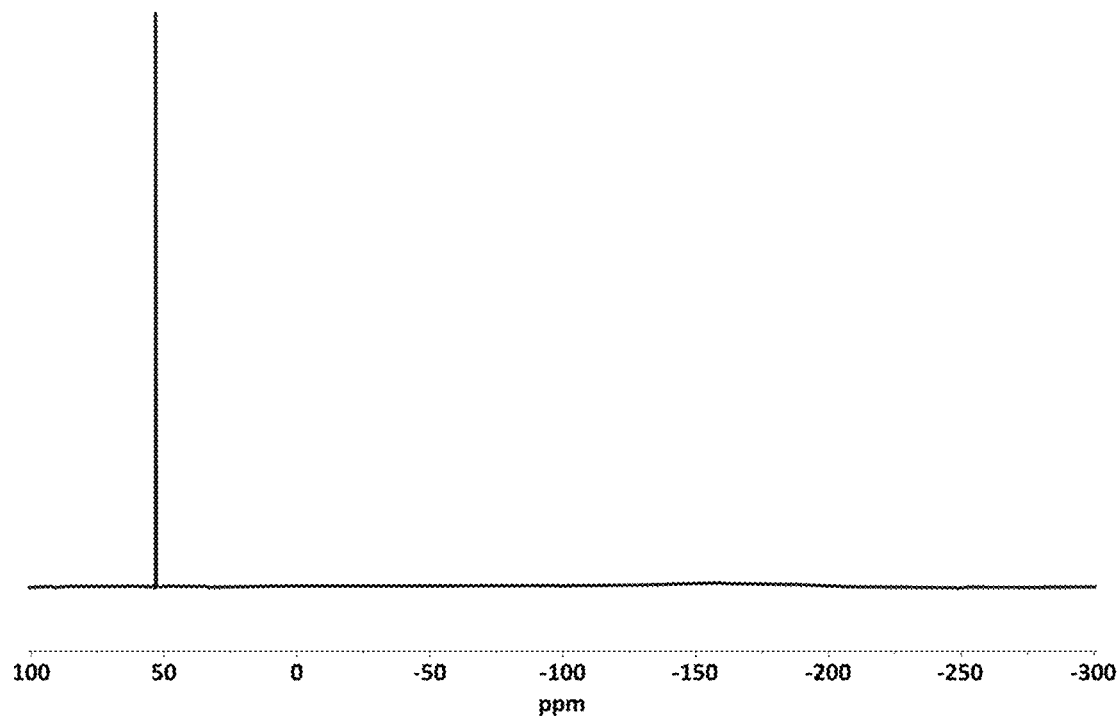
FIG. 25 is a $^{19}$F NMR spectrum obtained for the tetracationic ionic plastic crystal, as described in Example 7(b).
Figure 26:
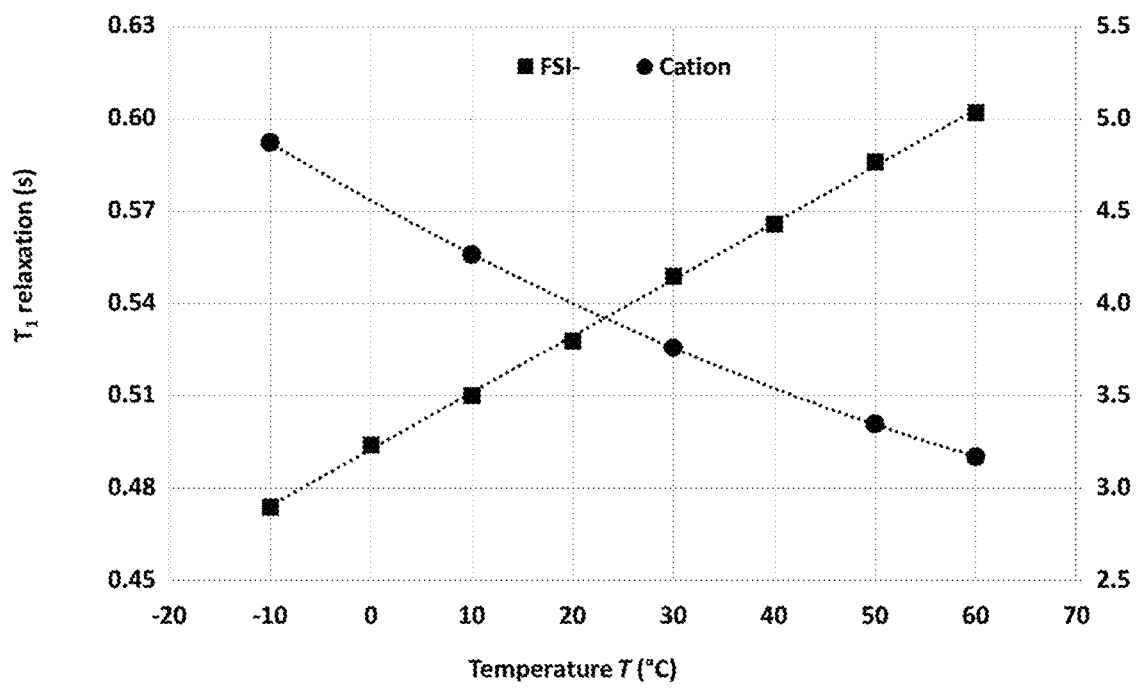
FIG. 26 is a graph of the relaxation time as a function of the temperature obtained for the tetracationic ionic plastic crystal, as described in Example 7(b).

NMR experiments were carried out using a 500 MHz WB Bruker AVANCE NEO™ spectrometer equipped with a 1.3 mm MAS X/$^1$H/$^{19}$F NMR probe with a maximum rotation speed at the magic angle of 67 kHz. $T_1$ measurements were carried out over a temperature range of from −10° C. to 60° C. at MAS=60 kHz. The recovery time delay varied in 12 steps from 50 ρs to 20 s for $^{19}$F and up to 50 s for $^1$H. FIGS. 24 and 25 respectively show $^1$H NMR and $^{19}$F NMR spectra obtained for the tetracationic ionic plastic crystal prepared in Example 7(a). FIG. 26 is a graph showing the relaxation time (Ti) as a function of temperature for the tetracationic ionic plastic crystal prepared in Example 7(a). The spin-lattice relaxation rate of the $^{19}$F and $^1$H nuclei was perfectly described with a single exponential decay over the whole temperature range, meaning that the sample was substantially uniform. The $T_1$ values of $^1$H and $^{19}$F are presented in Table 13.

TABLE 13

| T, °C. | -10 | 0 | 10 | 20 | 30 | 40 | 50 | 60 |
|---|---|---|---|---|---|---|---|---|
| $^{19}F: T_1, S$ | 0.47 | 0.49 | 0.51 | 0.53 | 0.55 | 0.57 | 0.59 | 0.60 |
| $^1H: T_1, S$ | 4.87 | — | 4.27 | — | 3.76 | — | 3.35 | 3.17 |

The $T_1$ values of $^1H$ and $^{19}F$ show opposite trends with respect to temperature, meaning that the cations form a "solid" type immobile framework, while the FSI anions can move in a "liquid" type manner. The tetracationic ionic plastic crystal of the present example was compared to Plastic Crystals 1 and 30. A transition from "solid" to "liquid" phase was observed at a temperature of 17° C. for the anions and at a temperature of 40° C. for the cations of Plastic Crystal 1. The cations and anions of Plastic Crystal 30 were tightly packed, with very limited movement in the temperature range of from 20° C. to 60° C. Finally, the results obtained for the tetracationic ionic plastic crystal of the present example (Plastic Crystal 31) showed that the cations form a "solid" type immobile framework, while the FSI anions can move in a "liquid" type manner in the temperature range of from −10° C. to 60° C.

Example 8—Plastic Crystal-Based Positive Electrodes (a) Preparation and Characterization of Plastic Crystal-Based Positive Electrode Films (Electrodes 1 to 4)

Plastic crystal-based positive electrodes with different formulations and processing conditions were prepared and characterized. The electrochemically active material was lithium nickel manganese cobalt oxide (NMC). The different positive electrode compositions are presented in Table 14.

TABLE 14

Plastic crystal-based positive electrode film compositions

| Electrode | NMC particle size distribution | NCM (wt. %) | Plastic crystal-based catholyte (wt. %) | Carbon and binder (wt. %) | Ratio NCM:catholyte | Positive electrode porosity |
|---|---|---|---|---|---|---|
| 1 | Bimodal | 78.1 | 18.6 | 3.3 | 4.2 | 6.3 |
| 2 | Unimodal | 73.2 | 22.0 | 4.8 | 3.3 | — |

Figure 27:
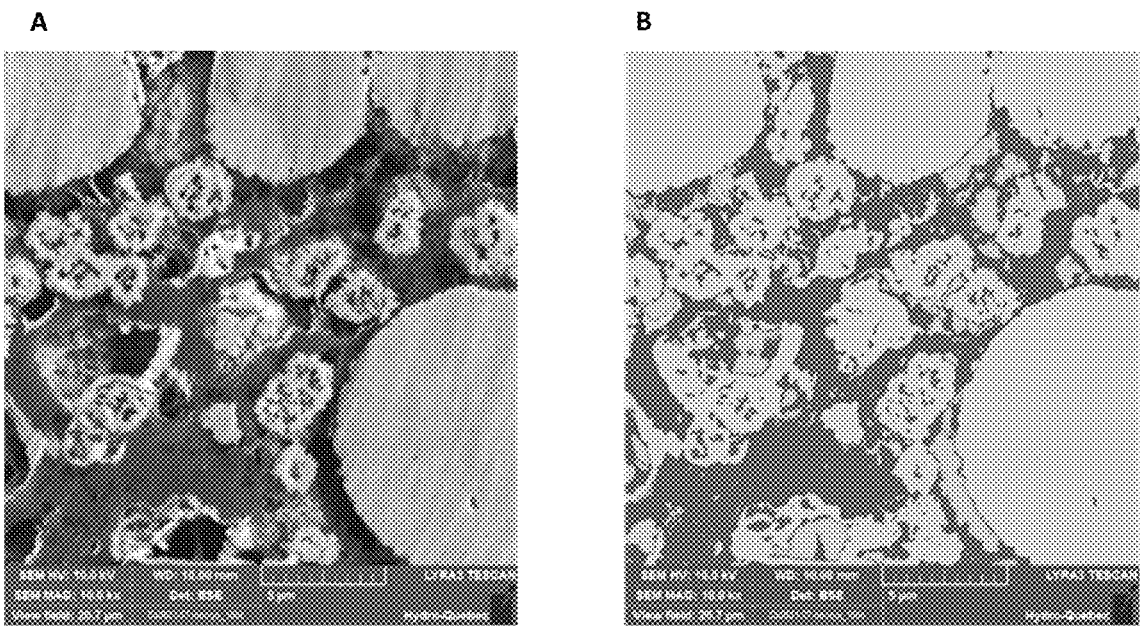
FIG. 27 shows scanning electron microscopy (SEM) images obtained for Electrode 1, as described in Example 8(a).

Scanning electron microscopy (SEM) images of Electrode 1 were obtained using a TESCAN LYRA3 focused ion beam field emission scanning electron microscope (FIB-FESEM). FIG. 27 presents the SEM images obtained for Electrode 1 showing the porosity and pore size distribution of the electrode. The cyan color in the right image represents the pores of the electrode and corresponds to the majority of the darker areas in the left image.

It should be noted that, as the pores of the plastic crystal-based positive electrode can act as resistance to lithium ion transport, the positive electrode performance can therefore be limited by the porosity. It should also be noted that the ratio of active material to plastic crystal-based catholyte must be significant in order to ensure that the porosity of the positive electrode is 5% or less and thus obtain substantially high positive electrode performance.

Different positive electrode film compositions are presented in Table 15.

TABLE 15

Plastic crystal-based positive electrode compositions

| | Electrochemically active material | | Catholyte | | | |
|---|---|---|---|---|---|---|
| Electrode | NMC particle size distribution | NCM (wt. %) | Plastic Crystal (wt. %) | LiFSI (wt. %) | Carbon (wt. %) | Binder (wt. %) |
| 3 | Bimodal | 78.1 | 17.6 | 1.0 | 1.3 | 2.0 |
| 4 | Unimodal | 73.2 | 20.7 | 1.3 | 2.0 | 2.8 |

(b) Preparation and Characterization of a Plastic Crystal-Based Positive Electrode Film (Electrode 5)

Plastic crystal-based positive electrodes were obtained by the process as described above and more particularly as illustrated in FIG. 1 or 2.

The CBS was prepared by adding 0.252 g of PVDF, 0.010 g of PVP, and 5.836 g of NMP in a container. The container and its contents were placed in a roller mill for over 10 hours until dissolved. 10 g of 3 mm milling balls, 1.260 g of Denka™ carbon black, and 0.42 g of VGCFs were then added to the container. The mixture was then ground four times for 5 minutes with a SPEX™ mixer mill to obtain the CBS.

The diluted PCr catholyte solution was prepared by adding 1.934 g of Plastic Crystal 24, 0.120 g of LiFSI in 1.908 g of NMP. The solution was then mixed using a vortex mixer.

The PCr—CBS solution was prepared by adding one quarter of the diluted PCr catholyte solution to the CBS, then grinding the mixture for 5 minutes with a SPEX™ mixer mill. This step was carried out three more times (i.e., until the diluted PCr catholyte solution was all added and mixed with the CBS).

The PCr-based positive electrode slurry was obtained by adding 7.685 g of PCr—CBS solution and 5.130 g of NCM 811 in a container. The mixture was then stirred twice with a vortex mixer for 5 minutes, then three times with a homogenizer (IKA™ T-10 Basic) operated at speed level 1 for 2 minutes.

The PCr-based positive electrode slurry thus obtained was then applied to a carbon-coated aluminum current collector using a doctor blade coating system with a fixed gap size of 150 μm.

The PCr-based positive electrode film was then dried in a vacuum oven at a temperature of 120° C. for over 10 hours to remove any residual solvent.

The dried PCr-based positive electrode film was then roll pressed with a thickness reduction target of about 17%. The temperature setting of the roll press was adjusted so that the roll surface temperature was below the melting point of Plastic Crystal 24.

The compositions of the PCr—CBS solution and the PCr-based positive electrode are respectively presented in Tables 16 and 17.

TABLE 16

Composition of the PCr-CBS solution

| PCr-CBS solution | CBS | Binder (PVdF) (g) | 0.252 |
|---|---|---|---|
| | | Dispersing Agent (PVP) (g) | 0.010 |
| | | Solvent (NMP) (g) | 5.836 |
| | | Denka ™ carbon black (g) | 1.260 |
| | | VGCFs (g) | 0.42 |
| | Diluted PCr catholyte solution | Plastic Crystal 24 (g) | 1.934 |
| | | Lithium salt (LiFSI) (g) | 0.120 |
| | | Solvent (NMP) (g) | 1.908 |

TABLE 17

Composition of the PCr-based positive electrode (Electrode 5)

| Electrode 5 | PCr-based positive electrode slurry | PCr-CBS solution of Table 16 (g) | 7.685 |
|---|---|---|---|
| | | Electrochemically active material (NCM 811) (g) | 5.130 |

TABLE 18

Composition of the PCr-based positive electrode film (Electrode 6)

| Electrode 6 | Electrochemically active material | 70.0 wt. % |
|---|---|---|
| | (NCM 811) | Unimodal (NCM811) |
| | Denka ™ carbon black | 1.7 wt. % |
| | VGCFs | 0.6 wt. % |
| | Binder (PVdF) | 3.0 wt. % |
| | Dispersing Agent (PVP) | 0.1 wt. % |
| | Plastic Crystal 24 | 23.2 wt. % |
| | Lithium salt (LiFSI) | 1.4 wt. % |

The plastic crystal-based positive electrode film (Electrode 6) was then coated with a ceramic-polymer composite layer. The ceramic-polymer composite layer was applied on the plastic crystal-based positive electrode film (Electrode 6) using a doctor blade coating system with a fixed gap of 65 µm. The composition of the ceramic-polymer composite layer as well as its preparation process are presented in Table 19.

TABLE 19

Composition of the ceramic-polymer composite layer and mixing conditions*

| Component | Weight (g) | Weight percentage (wt. %) | Formulation ×5 (g) | Actual weight (g) | Mixing time (THINKY ™ mixer) |
|---|---|---|---|---|---|
| Lithium salt (LiFSI) | 0.5 | 19.46 | 2.5 | 2.5025 | 2 × 3 min |
| Tetraethylene glycol dimethyl ether (TEGDME) | 0.69 | 26.85 | 3.45 | 3.4552 | — |
| N-methyltrifluoroacetamide (NMTFAm) described in CA 3,120,820 | 0.44 | 17.12 | 2.2 | 2.2025 | 1 × 3 min |
| Polymer US'674 | 0.67 | 26.07 | 3.35 | 3.381 | 1 × 5 min |
| Li$_{1.3}$Al$_{0.3}$ Ti$_{1.7}$(PO$_4$)$_3$ (LATP, Toshima) | 0.26 | 10.12 | 1.3 | 1.3014 | 2 × 3 min |
| Irgacure ™ 651 | 0.01 | 0.39 | 0.05 | — | 2 × 3 min |

*The components of the ceramic-polymer composite layer were added in the order presented.

Figure 28:
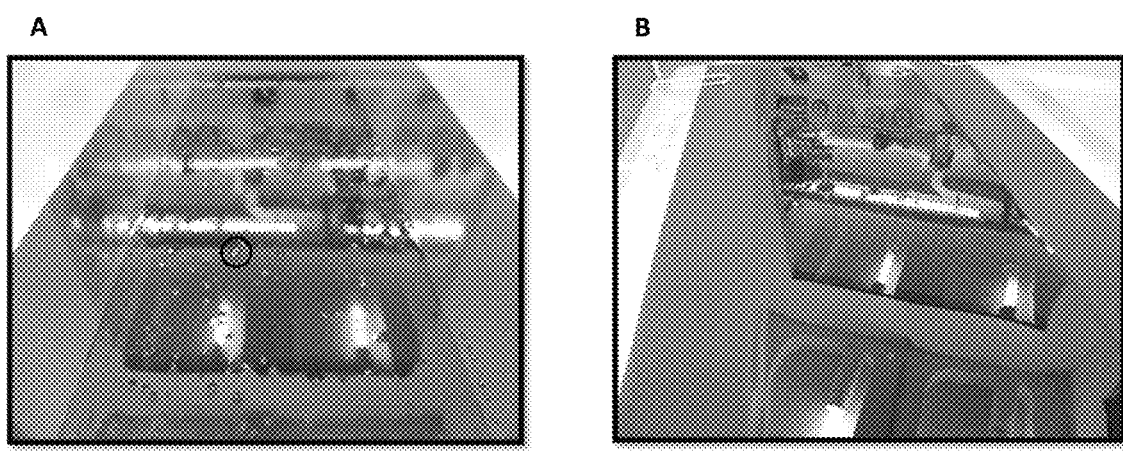
FIG. 28 shows photographs in (A) of the surface of a plastic crystal-based positive electrode obtained by a conventional mixing method, and in (B) of the surface of Electrode 5, as described in Example 8(b).

FIG. 28 shows in (A) a photograph of the surface of a plastic crystal-based positive electrode obtained by a conventional mixing process and in (B) a photograph of the surface of a plastic crystal-based positive electrode obtained by the process of the present example (Electrode 5). It should be noted that these images present the immediate environment reflected on the surface of the films, this environment not being part of the electrode films. As can be seen in FIG. 28(A), the surface of the plastic crystal-based positive electrode obtained by the conventional mixing process includes carbon agglomerates, an example of which is circled. This can be attributed to the fact that carbon agglomerates readily in a highly polar solvent due to its hydrophobic surface properties. As can be seen in FIG. 28(B), the surface of the plastic crystal-based positive electrode obtained by the process of the present example appears substantially clean and smooth and is substantially or completely free of carbon agglomerates.

(c) Preparation and Characterization of a Plastic Crystal-Based Positive Electrode (Electrode 6) and of an Electrochemical Cell (Cell 12)

A plastic crystal-based positive electrode film having the composition presented in Table 18 was prepared using the mixing process described in Example 8(b).

The electrochemical cell (Cell 12) was assembled according to the configuration presented in Table 20.

TABLE 20

Electrochemical cell configuration (Cell 12)

| Electrochemical cell | PCr-based positive electrode film | Ceramic-polymer composite layer | Negative electrode |
|---|---|---|---|
| Cell 12 | Electrode 6 as described in Table 18 | Ceramic-polymer composite layer as described in Table 19 | Metallic lithium |

Figure 29:
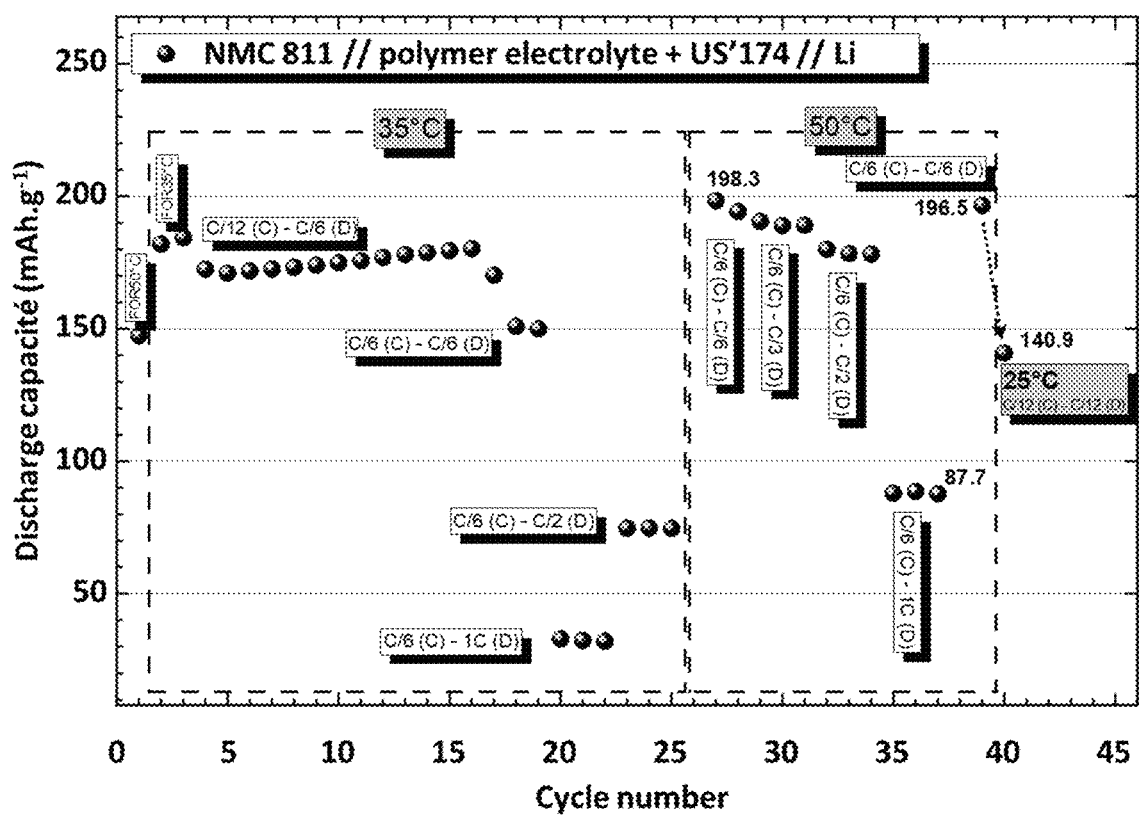
FIG. 29 is a graph of the discharge capacity (mAh/g) as a function of the number of cycles for Cell 12, as described in Example 8(c).

FIG. 29 is a graph of the discharge capacity as a function of the number of cycles obtained for Cell 12 for 40 charge and discharge cycles. The discharge capacity was recorded at a temperature of 35° C. for the first 25 cycles, at a temperature of 50° C. for cycles 26 to 39, and at a temperature of 25° C. for the 40$^{th}$ cycle.

Example 9—Cyclic Charge Discharge (CCD) Measurements

CCD measurements were obtained to test the performances and cycle life for the plastic crystal compositions presented in Table 21.

TABLE 21

Cell configurations (Cells 13 to 16)

| Cell | Component | Weight percentage (wt. %) |
|---|---|---|
| Cell 13 | Plastic Crystal 24 | 97.85 wt. % |
|  | Lithium salt (LiFSI) | 2.15 wt. % |
| Cell 14 | Plastic Crystal 24 | 75. wt. % |
|  | Polymer US'674 (ACN) | 15 wt. % |
|  | $Li_{1.3}Al_{0.3}Ti_{1.7}(PO_4)_3$ (LATP, Toshima) | 10 wt. % |
|  | Polypropylene (substrate or support film) | — |
| Cell 15 | Plastic Crystal 24 | 85 wt. % |
|  | Polymer US'674 (polymer:LiTFSI ratio of 10:1) | 5 wt. % |
|  | $Li_{1.3}Al_{0.3}Ti_{1.7}(PO_4)_3$ (LATP, Toshima) | 10 wt. % |
| Cell 16 | Plastic Crystal 24 | 95 wt. % |
|  | Polymer US'674 (polymer:LiTFSI ratio of 10:1) | 5 wt. % |

Figure 30:
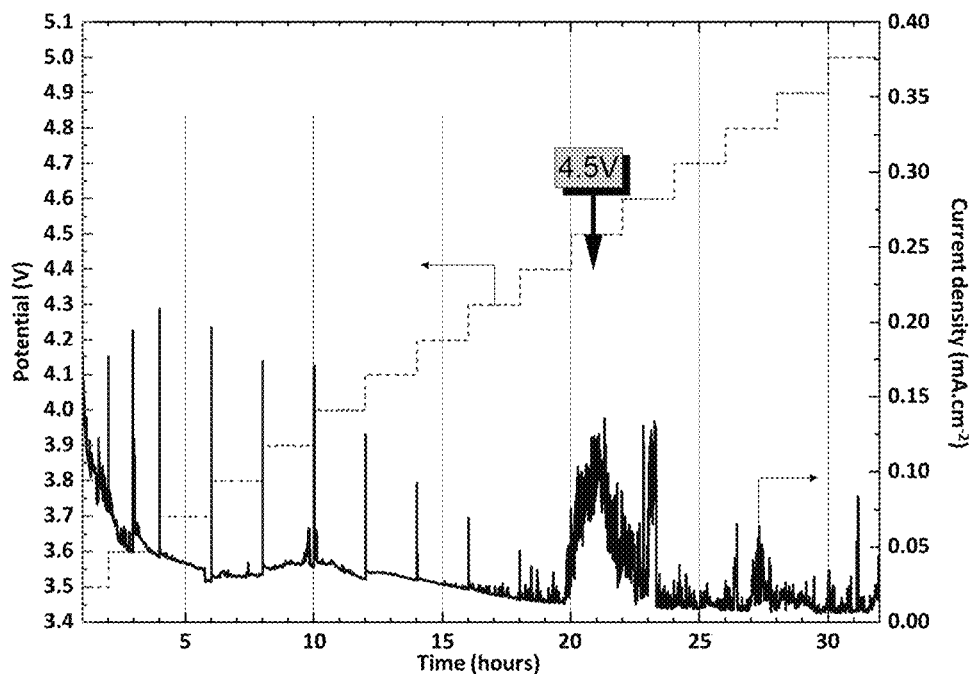
FIG. 30 is a graph of the current density and potential as a function of time for Cell 13, as described in Example 9.

FIG. 30 is a graph of the current density and potential as a function of time for Cell 13 described in the present example. Cell 7 was cycled between 3.5 V and 5.0 V with 0.1 V increments, at a temperature of 50° C.

Figure 31:
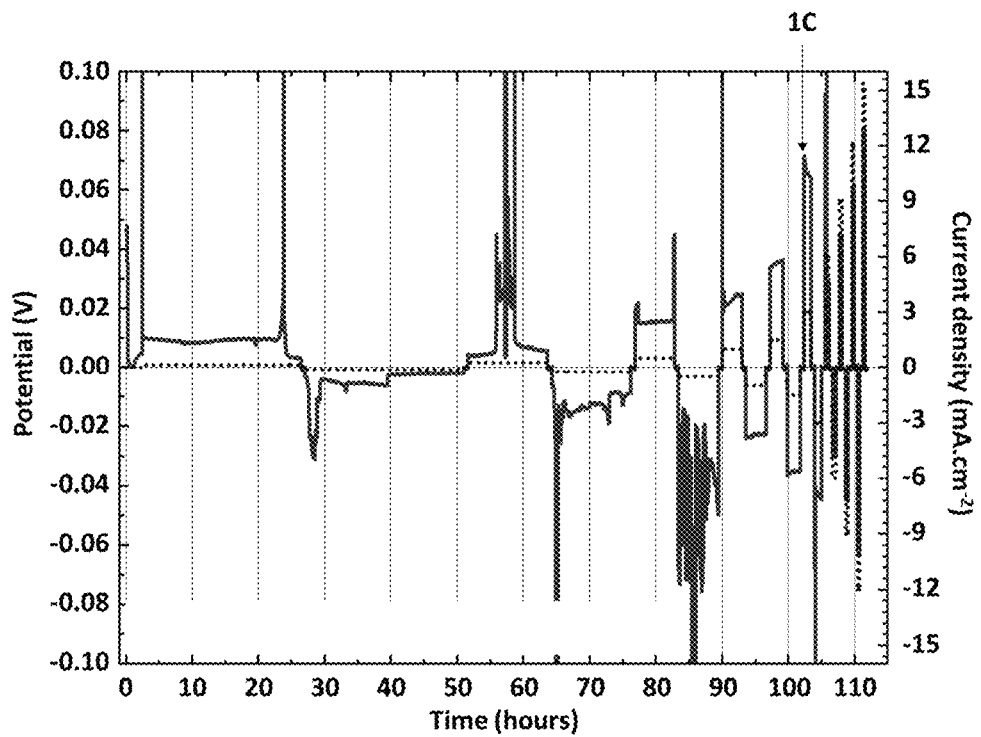
FIG. 31 is a graph of the current density and potential as a function of time for Cell 14, as described in Example 9.

FIG. 31 is a graph of the current density and potential as a function of time for Cell 14 described in the present example. Cell 14 was cycled between −0.10 V and 0.10 V at 1 C, with a current density of 3 mA/cm², and at a temperature of 25° C. The current density is represented by the dotted line.

Figure 32:
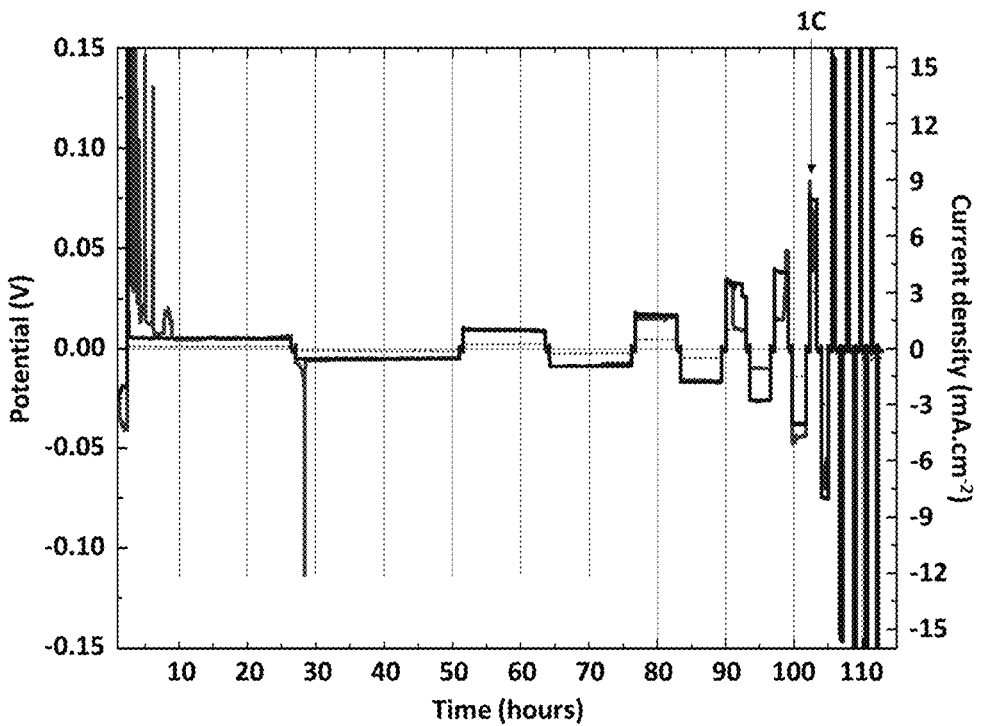
FIG. 32 is a graph of the current density and potential as a function of time for Cells 15 and 16, as described in Example 9.

FIG. 32 is a graph of the current density and potential as a function of time for Cells 15 and 16 described in the present example. Cells 15 and 16 were cycled between −0.15 V and 0.15 V at 1 C, with a current density of 3 mA/cm², and at a temperature of 35° C. The current density is represented by the dotted line.

Example 10—NMR Diffusion Study of Polymer Electrolytes

The NMR diffusion study of the polymer electrolyte lifetime was carried out for the plastic crystal compositions presented in Table 22.

TABLE 22

Synthesis of Plastic Crystals 32 and 33

| | | |
|---|---|---|
| Plastic Crystal 32 | Plastic Crystal 24 | 85 wt. % |
|  | Lithium salt (LiTFSI) | 5 wt. % |
|  | $Li_{1.3}Al_{0.3}Ti_{1.7}(PO_4)_3$ (LATP, Toshima) | 10 wt. % |
| Plastic Crystal 33 | Plastic Crystal 24 | 75 wt. % |
|  | Lithium salt (LiTFSI) | 5 wt. % |
|  | $Li_{1.3}Al_{0.3}Ti_{1.7}(PO_4)_3$ (LATP, Toshima) | 5 wt. % |
|  | PVdF | 10 wt. % |

Pulsed field gradient NMR diffusion measurement experiments were carried out for $^1H$, $^7Li$, and $^{19}F$ nuclei.

NMR experiments were carried out using a 500 MHz WB Bruker AVANCE NEO™ NMR spectrometer equipped with a Diff50 high power NMR diffusion probe and $^7Li$-$^{19}F$ and $^1H$-$^{19}F$ dual resonance radiofrequency (RF) modules.

The diffusion measurements were carried out at a temperature of 50° C. The gradient pulse was in the range of from 0.6 ms to 2.0 ms and the diffusion time was in the range of from 40 ms to 400 ms depending on the nuclei. The gradient strength was varied in 16 increments from 100 G/cm to 2500 G/cm.

The diffusion measurements were accompanied by $T_2$ relaxation experiments using a Carr-Purcell-Meiboom-Gill (CPMG) pulse sequence with an echo delay between 0.06 ms and 0.6 ms. Up to 64 echoes were recorded per experiment.

Signal intensity in NMR experiments exponentially decays after the excitation pulse:

$$I(t)=I_0 e^{-t/T_2} \qquad \text{Equation 2}$$

wherein, $I_0$ is the signal intensity immediately after the excitation, and $T_2$ is the characteristic time representing the interaction between neighboring nuclei. Long $T_2$ values correspond to mobile nuclei when internuclear interactions are averaged. In contrast, short $T_2$ values correspond to static nuclei.

Relaxation times represent information about the local environment of the observed nuclei, so they can serve as a tool for NMR signals assignment and deconvolution, even when their chemical shifts overlap. For example, the transverse and longitudinal relaxation times of the $^7Li$ NMR signal of LATP are reported by Arbi, K., et al. (Arbi, K., et al. Chemistry of materials 16.2 (2004): 255-262). They correspond to the times observed for LATP in the present example and enable the separation of lithium (and its diffusion coefficient) in LATP from lithium in the polymers.

The results for Plastic Crystals 32 and 33 are respectively presented in Tables 23 and 24.

TABLE 23

NMR diffusion study obtained for Plastic Crystal 32

| | CH$_2$ | | | | NH | FSI | TFSI | Li of LiTFSI | Li of LATP |
|---|---|---|---|---|---|---|---|---|---|
| T, °C. | D, m²/s | Ratio, % | D, m²/s | Ratio, % | D, m²/s | D, m²/s | D, m²/s | D, m²/s | D, m²/s |
| 50 | 6.1E−12 | 20 | 3.4E−14 | 80 | 1.3E−11 | 1.3E−11 | 1.2E−11 | 4.5E−13 | 5.5E−12 |
| 25 | 2.6E−13 | 20 | 3.1E−14 | 80 | 1.2E−12 | 1.1E−12 | 1.1E−12 | 8.1E−14 | 2.6E−12 |

As can be noted, the fastest protons in Plastic Crystal 32 were assigned to NH. The other protons could be separated into two phases (namely, the "mobile phase" and the "immobile phase") with relative ratio of 2:8.

The obtained values of the lithium diffusion coefficients in LATP are in a similar range to the lithium diffusion coefficients in LAGP previously reported by Hayamizu, K., et al. (Hayamizu, K., et al. Physical Chemistry Chemical Physics 19.34 (2017): 23483-23491).

TABLE 24

NMR diffusion study obtained for Plastic Crystal 33

| T, °C. | $D_{LATP}$, $10^{-12}$ m²/s | $D_{Li+}$, $10^{-12}$ m²/s | $D_{TFSI-}$, $10^{-12}$ m²/s | $D_{FSI-}$, $10^{-12}$ m²/s | $D_{NH}$, $10^{-12}$ m²/s | $D_{CH2}$, $10^{-12}$ m²/s |
|---|---|---|---|---|---|---|
| 15 | 1.9 | 0.76 | 0.48 | 0.54 | 1.2 | 0.061 |
| 20 | — | 1.6 | 1.1 | 1.4 | 2.0 | 0.54 |
| 25 | 2.7 | 4.7 | 3.6 | 4.3 | 4.9 | 1.4 |
| 35 | 3.9 | 7.6 | 6.0 | 7.2 | 8.2 | 2.2 |
| 40 | 4.6 | 9.3 | — | — | — | — |
| 50 | 5.8 | 13.0 | 10.8 | 13.9 | 16.8 | 6.3 |

The diffusion coefficients of $^7$Li, $^{19}$F and $^1$H are indicated in Tables 23 and 24. Two particle types with different diffusivities were identified for each nucleus: Li in LATP and Li⁺ associated with plastic crystal-LiTFSI mixtures; FSI and TFSI anions; main part of the plastic crystals (CH$_2$) and mobile protons that may be involved in hydrogen bonding (NH).

Figure 33:
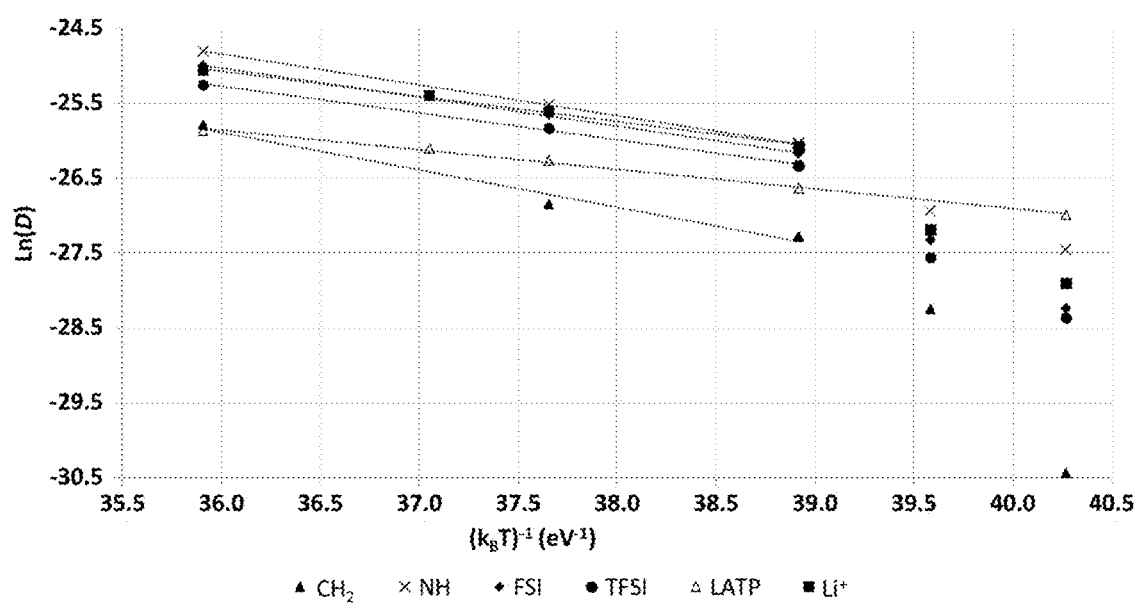
FIG. 33 shows Arrhenius plots of the logarithm of the diffusion coefficient (D) versus $1/k_BT$ showing the temperature dependence of the diffusion rates of $CH_2$ (▼), NH (X), FSI (♦), TFSI (●), LATP (Δ), and Li$^+$ (■), as described in Example 10.

FIG. 33 presents Arrhenius plots of the logarithm of the diffusion coefficient (D) versus $1/k_BT$ showing the temperature dependence of the diffusion rates of CH$_2$ (▲), NH (X), FSI (★), TFSI (●), LATP (A), and Li⁺ (■).

As can be seen in FIG. 33, the Arrhenius plot corresponding to Li in LATP is linear over the whole temperature range with a diffusion activation energy of 0.26±0.02 eV. In contrast, the Arrhenius plots of the ions associated with the plastic crystal-LiTFSI mixtures are linear at temperatures above about 25° C. The activation energy of Li⁺, TFSI⁻, FSI⁻ and NH are in the range of from about 0.34 eV to about 0.41 eV, and the activation energy of the plastic crystal-LiTFSI mixture is about 0.50 eV. At temperatures below 25° C., all diffusivities drop rapidly, which could be attributed to the phase transformation of the plastic crystals.

Numerous modifications could be made to any of the embodiments described above without departing from the scope of the present invention as contemplated. References, patents, or scientific literature referred to herein are incorporated herein by reference in their entirety and for all purposes.

What is claimed is:

1. An ionic plastic crystal comprising at least one delocalized anion paired with at least one guanidine, amidine or phosphazene organic superbase-derived cation.

2. The ionic plastic crystal according to claim 1, wherein the delocalized anion is selected from the group consisting of trifluoromethanesulfonate (or triflate) [TfO]⁻, bis(trifluoromethanesulfonyl)imide [TFSI]⁻, bis(fluorosulfonyl)imide [FSI]⁻, 2-trifluoromethyl-4,5-dicyanoimidazolate [TDI]⁻, hexafluorophosphate [PF$_6$]⁻, and tetrafluoroborate [BF$_4$]⁻ anions.

3. The ionic plastic crystal according to claim 1, wherein the cation is selected from the group consisting of guanidine, amidine or phosphazene organic superbase-derived cations of Formulae 2 to 8:

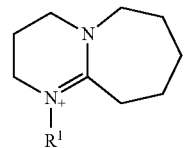

Formula 2

-continued

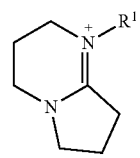

Formula 3

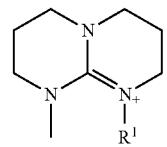

Formula 4

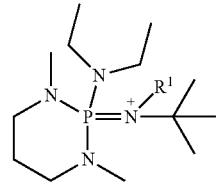

Formula 5

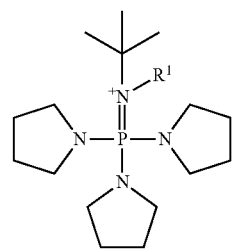

Formula 6

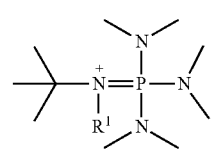

Formula 7

Formula 8

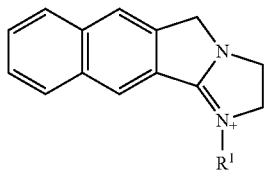

wherein, the ionic plastic crystal is a monocationic ionic plastic crystal and $R^1$ is a hydrogen atom or a linear or branched substituent selected from a $C_1$-$C_{10}$alkyl-acrylate, a $C_1$-$C_{10}$alkyl-methacrylate, a carbonylamino-$C_1$-$C_{10}$alkyl-methacrylate, a carbonylamino-$C_1$-$C_{10}$alkyl-acrylate, a carbonyloxy-$C_1$-$C_{10}$alkyl-methacrylate, and a carbonyloxy-$C_1$-$C_{10}$alkyl-acrylate; or the ionic plastic crystal is a multicationic ionic plastic crystal comprising at least two delocalized anions paired with at last two quanidine, amidine or phosphazene organic superbase-derived cations and $R^1$ is an unsubstituted or substituted organic bridging group separating at least two of the cations and is selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy) $C_1$-$C_{10}$alkylene, a linear or branched polyether, a linear or branched polyester, a $C_6$-$C_{12}$arylene, a $C_5$-$C_{12}$heteroarylene, a $C_3$-$C_{12}$cycloalkylene, and a $C_3$-$C_{12}$heterocycloalkylene.

4. The ionic plastic crystal according to claim 3, wherein the ionic plastic crystal is selected from ionic plastic crystals of Formulae 10 to 16:

Formula 10

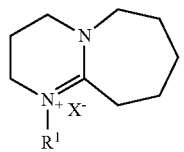

Formula 11

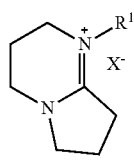

Formula 12

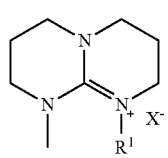

Formula 13

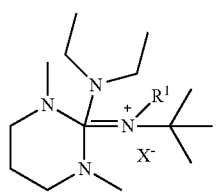

Formula 14

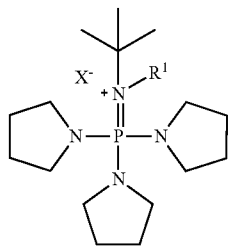

Formula 15

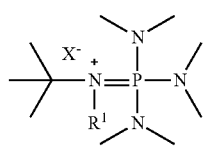

Formula 16

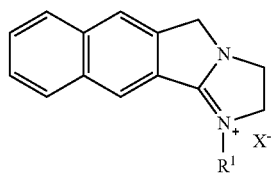

wherein,

X— is a delocalized anion selected from the group consisting of [TfO]⁻, [TFSI]⁻, [FSI]⁻, [TDI]⁻, [PF$_6$]⁻, and [BF$_4$]⁻; and the ionic plastic crystal is a monocationic ionic plastic crystal and $R^1$ a hydrogen atom or a linear or branched substituent selected from a $C_1$-$C_{10}$alkyl-acrylate, a $C_1$-$C_{10}$alkyl-methacrylate, a carbonylamino-$C_1$-$C_{10}$alkyl-methacrylate, a carbonylamino-$C_1$-$C_{10}$alkyl-acrylate, a carbonyloxy-$C_1$-$C_{10}$alkyl-methacrylate, and a carbonyloxy-$C_1$-$C_{10}$alkyl-acrylate; or the ionic plastic crystal is a multicationic ionic plastic crystal comprising at least two delocalized anions paired with at least to quanidine, amidine or phosphazene organic superbase-derived cations and $R^1$ is an unsubstituted or substituted organic bridging group separating at least two of the cations and is selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy) $C_1$-$C_{10}$alkylene, a linear or branched polyether, a linear or branched polyester, a $C_6$-$C_{12}$arylene, a $C_5$-$C_{12}$heteroarylene, a $C_3$-$C_{12}$cycloalkylene, and a $C_3$-$C_{12}$heterocycloalkylene.

5. An ionic plastic crystal composition comprising at least one ionic plastic crystal as defined in claim 1 and at least one additional component, at least one polymer, or a combination of at least one additional component and at least one polymer.

6. The ionic plastic crystal composition according to claim 5, wherein the additional component is an inorganic particle.

7. The ionic plastic crystal composition according to claim 5, wherein the polymer is:

linear or branched;
crosslinked;
a polyether-type polymer; or
a block copolymer composed of at least one lithium-ion solvating segment and at least one cross-linkable segment, the lithium-ion solvating segment being selected from homo- or copolymers having repeating units of Formula 32:

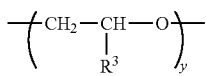

Formula 32 wherein,
$R^3$ is selected from a hydrogen atom, a $C_1$-$C_{10}$alkyl group, and a —($CH_2$—O—$R^4R^5$) group;
$R^4$ is ($CH_2$—$CH_2$—O)$_m$;
$R^5$ is selected from a hydrogen atom and a $C_1$-$C_{10}$alkyl group;
y is an integer selected from the range of 10 to 200,000; and
m is an integer selected from the range of 0 to 10.

8. The ionic plastic crystal composition according to claim 5, wherein the ionic plastic crystal composition is
(i) an ionic plastic crystal-based electrolyte composition,
(ii) comprised in a binder;
(iii) comprised in an electrochemical cell;
(iv) comprised in a supercapacitor; or
(v) comprised in an electrochromic material.

9. A solid electrolyte composition comprising an ionic plastic crystal as defined in claim 1 and at least one salt or at least one additional component.

10. The solid electrolyte composition according to claim 9, wherein:
the salt is an ionic salt selected from the group consisting of a lithium salt, a sodium salt, a potassium salt, a calcium salt, and a magnesium salt; or
the additional component is selected from the group consisting of ionically conductive materials, inorganic particles, glass particles, ceramic particles, plasticizing agents, and a combination of at least two thereof or is selected from NASICON, LISICON, thio-LISICON type compounds, garnets, in crystalline and/or amorphous form, and a combination of at least two thereof.

11. A solid electrolyte comprising a solid electrolyte composition as defined in claim 9.

12. An electrode material comprising an electrochemically active material and an ionic plastic crystal as defined in claim 1.

13. The electrode material according to claim 12, wherein the electrochemically active material is in the form of particles or is selected from the group consisting of metal oxides, lithium metal oxides, metal phosphates, lithium metal phosphates, titanates, lithium titanates, metal fluorophosphates, lithium metal fluorophosphates, metal oxyfluorophosphates, lithium metal oxyfluorophosphates, metal sulfates, lithium metal sulfates, metal halides, lithium metal halides, sulfur, selenium, and a combination of at least two thereof.

14. The electrode material according to claim 12, wherein the electrode material further comprises at least one electronically conductive material.

15. An electrode comprising an electrode material as defined in claim 12 on a current collector.

16. An electrochemical cell comprising a negative electrode, a positive electrode and an electrolyte, wherein at least one of the negative electrode, the positive electrode, and the electrolyte comprises at least one ionic plastic crystal as defined in claim 1.

17. An electrochemical cell comprising a negative electrode, a positive electrode and an electrolyte, wherein at least one of the negative electrode, the positive electrode, and the electrolyte comprises the ionic plastic crystal composition as defined in claim 5.

18. An electrochemical cell comprising a negative electrode, a positive electrode, and an electrolyte, wherein at least one of the negative electrode and the positive electrode is as defined in claim 15.

19. An electrochemical cell comprising a negative electrode, a positive electrode, and a solid electrolyte as defined in claim 11.

20. An electrochemical accumulator comprising at least one electrochemical cell as defined in claim 16.

21. A process for the preparation of an ionic plastic crystal as defined in claim 1, the process comprising the following steps:
(i) reacting at least one guanidine, amidine or phosphazene organic superbase with at least one proton source to form at least one complex including a protonated guanidine, amidine or phosphazene organic superbase-derived cation and a counterion; and
(ii) reacting the complex including a protonated guanidine, amidine or phosphazene organic superbase-derived cation and a counterion with at least one ionic salt.

22. The process according to claim 21, wherein:
steps (i) and (ii) are carried out sequentially, simultaneously or partially overlapping in time with each other; or
the quanidine, amidine or phosphazene organic superbase, the proton source and the ionic salt are mixed together and left o react; or
steps (i) and (ii) are carried out in the presence of a solvent; or
the proton source of step (i) is a first proton source and steps (i) and (ii) are carried out in the presence of a second source; or
steps (i) and (ii) are carried out in the presence of an activator, a stabilizer, or a combination thereof and the process further comprises forming a stabilized intermediary ion-neutral complex; or
steps (i) and (ii) are carried out at a temperature in the range from about 20° C. to about 200° C. upper and lower limits included; or
steps (i) and (ii) are carried out for at least 4 days.

23. The process according to claim 22, wherein the activator and/or stabilizer is a bis-silylated compound of Formula 17:

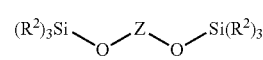

Formula 17 wherein,
Z is a substituted or unsubstituted organic group selected from a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy) $C_1$-$C_{10}$alkylene, a linear or branched polyether, a linear or branched polycarbonate, a linear or branched polythiocarbonate, a linear or branched polyamide, a linear or branched polyimide, a linear or branched polyurethane, a linear or branched polysiloxane, a linear or branched thioether, a linear or branched polyphosphazene, a linear or branched polyester, and a linear or branched polythioester; and
$R^2$ is independently and in each occurrence selected from the group consisting of an alkyl group, an aryl group, and an arylalkyl group.

24. The process according to claim 21, wherein the process further comprises at least of the following steps:
- a purification step;
- a functionalization step;
- a step of coating the ionic plastic crystal composition or a suspension comprising the ionic plastic crystal on a substrate;
- a step of driving the composition or suspension; and
- a crosslinking step.

25. A process for the preparation of an ionic plastic crystal as defined in claim 1, the process comprising the following steps:
- (i) reacting a guanidine, amidine or phosphazene organic superbase with an organic bridging compound to form a multicationic complex comprising at least two organic superbase-based cationic moieties separated by an unsubstituted or substituted organic bridging group and paired with a counterion; and
- (ii) reacting the multicationic complex with at least one ionic salt.

26. The process according to claim 25, wherein:
- the organic bridging compound comprises the unsubstituted or substituted organic bridging group and at least two anionic leaving groups; or
- the unsubstituted substituted organic bridging group is selected from the group consisting of a linear or branched $C_1$-$C_{10}$alkylene, a linear or branched $C_1$-$C_{10}$alkyleneoxy$C_1$-$C_{10}$alkylene, a linear or branched poly($C_1$-$C_{10}$alkyleneoxy)$C_1$-$C_{10}$alkylene, or linear or branched polyether, a linear or branched polyester, a $C_6$-$C_{12}$arylene, a $C_6$-$C_{12}$heteroarylene, a $C_2$-$C_{12}$cycloalkylene, and a $C_2$-$C_{12}$heterocycloalkylene; or
- the organic bridging group is 1,2,4,5-tetrakis(bromomethyl)benzene; or
- steps (i) and (ii) are carried out sequentially, simultaneously or partially overlapping in time with each other; or
- the quanidine, amidine or phosphazene organic superbase, the organic bridging compound and the ionic salt are mixed together and left to react; or
- steps (i) and (ii) are carried out in the presence of a solvent; or
- the step of reacting the quanidine, amidine or phosphazene organic superbase with the organic bridging compound is carried out in the presence of a base; or
- steps (i) and (ii) are carried out at room temperature; or
- the step of reacting the guanidine, amidine or phosphazene organic superbase with the organic bridging compound is carried out for about 4 days; or
- the step of reacting the multicationic complex with the ionic salt is carried out for about 3 days.

27. The process according to claim 25, wherein the process further comprises at least one of the following steps:
- a purification step; and
- a step of coating the ionic plastic crystal composition or a suspension comprising the ionic plastic crystal on a substrate.

28. A process for the production of an electrode material as defined in claim 12, the process comprising the following steps:
- (ii) preparing a carbon and binder slurry;
- (ii) preparing an ionic plastic crystal-based catholyte solution; and
- (iii) preparing an ionic plastic crystal, carbon, and binder slurry.

29. The process according to claim 28, wherein the step of preparing a carbon and binder slurry comprises dispersing the carbon in a binder composition comprising a binder.

30. The process according to claim 29, wherein the process further comprises a step of preparing the binder composition.

31. The process according to claim 28, wherein:
- the step of preparing the ionic plastic crystal catholyte solution comprises diluting the ionic plastic crystal and an ionic salt in a solvent; or
- the step of preparing the ionic plastic crystal, carbon and binder slurry comprises the progressive addition of the ionic plastic crystal catholyte solution to the carbon and binder slurry; or
- the process further comprises adding an electrochemically active material to the ionic plastic crystal, carbon, and binder slurry.

32. The process according to claim 28, wherein the process further comprises coating the ionic plastic crystal, carbon, and binder slurry on a current collector to obtain an ionic plastic crystal, carbon, and binder electrode film on a current collector.

33. The process according to claim 32, wherein the process further comprises at least one of the following steps:
- a step of drying the ionic plastic crystal, binder, and carbon electrode film; and
- a step of calendering the ionic plastic crystal, binder, and carbon electrode film.

34. An electrochemical accumulator comprising at least one electrochemical cell as defined in claim 17.

35. An electrochemical accumulator comprising at least one electrochemical cell as defined in claim 18.

36. An electrochemical accumulator comprising at least one electrochemical cell as defined in claim 19.

* * * * *